(12) United States Patent
O'Donoghue

(10) Patent No.: US 7,972,129 B2
(45) Date of Patent: Jul. 5, 2011

(54) COMPOUND TOOLING SYSTEM FOR MOLDING APPLICATIONS

(76) Inventor: Joseph O'Donoghue, Acton, MA (US)

( * ) Notice: Subject to any disclaimer, the term of this patent is extended or adjusted under 35 U.S.C. 154(b) by 768 days.

(21) Appl. No.: 11/521,716

(22) Filed: Sep. 15, 2006

(65) Prior Publication Data

US 2007/0063378 A1    Mar. 22, 2007

Related U.S. Application Data

(60) Provisional application No. 60/717,362, filed on Sep. 16, 2005.

(51) Int. Cl.
*B29C 39/00* (2006.01)
(52) U.S. Cl. ............ 425/388; 425/403; 425/405.1; 425/470
(58) Field of Classification Search .......... 425/4 R, 425/89, 90, 195, 388, 403, 407, 405.1, 405.2, 425/504, 508, 519, 94, 111, 128, 395, 406, 425/408, 45, 1.9, 470; 249/112, 115, 114.1, 249/117, 134; 264/101, 319, 320, 219, 266, 264/313, 315, 553, 571, 316, 511, 554
See application file for complete search history.

(56) References Cited

U.S. PATENT DOCUMENTS

| | | | | |
|---|---|---|---|---|
| 3,041,668 A | * | 7/1962 | Bonza et al. | 264/516 |
| 3,118,960 A | * | 1/1964 | Cook | 264/230 |
| 3,219,307 A | * | 11/1965 | Leeds et al. | 425/388 |
| 3,353,219 A | * | 11/1967 | Snyder | 425/405.1 |
| 3,431,331 A | * | 3/1969 | Pincus et al. | 264/46.4 |
| 4,051,296 A | | 9/1977 | Windecker | |
| 4,093,175 A | | 6/1978 | Putzer | |
| 4,134,942 A | * | 1/1979 | Mirr et al. | 264/418 |
| 4,482,515 A | * | 11/1984 | Buhler et al. | 264/102 |
| 4,496,131 A | * | 1/1985 | Yang | 249/78 |
| 4,518,341 A | * | 5/1985 | Suffa | 425/405.2 |
| 4,737,096 A | | 4/1988 | Poorten | |
| 4,923,539 A | * | 5/1990 | Spengler et al. | 156/79 |
| 5,260,014 A | * | 11/1993 | Holton et al. | 264/134 |
| 5,275,547 A | | 1/1994 | Brown | |
| 5,314,646 A | * | 5/1994 | Strobel et al. | 264/6 |
| 5,500,178 A | | 3/1996 | Hayashi | |

(Continued)

FOREIGN PATENT DOCUMENTS

DE    3837887 A1 *  5/1990

(Continued)

OTHER PUBLICATIONS

Property of Polyethylene.*

(Continued)

*Primary Examiner* — Joseph S Del Sole
*Assistant Examiner* — Dimple Bodawala
(74) *Attorney, Agent, or Firm* — Philip Koenig

(57) ABSTRACT

A compound mold or tooling system is designed to provide an alternative to conventional, expensive, metal molds for various plastics molding applications. The compound mold comprises a replaceable thin-walled liner, or skin-mold, defining the mold surface, temporarily bonded by vacuum means or mechanical means to a conforming backing-mold mold body supported by a rigid backing-plate. Both skin- and backing-molds are composed of suitable polymers with or without additives, fillers, reinforcements or other inclusions depending on mold requirements. The backing-plate contains standard features and fixtures common to all molds used in the particular process or of a particular geometry.

35 Claims, 6 Drawing Sheets

U.S. PATENT DOCUMENTS

| | | | |
|---|---|---|---|
| 5,746,874 A * | 5/1998 | Natarajan et al. | 156/285 |
| 5,989,492 A * | 11/1999 | Larsson | 419/36 |
| 6,174,481 B1 * | 1/2001 | Holowczak et al. | 264/225 |
| 6,461,480 B1 * | 10/2002 | Otakura et al. | 162/220 |
| 6,558,590 B1 * | 5/2003 | Stewart | 264/40.5 |
| 6,805,546 B2 * | 10/2004 | Hahn et al. | 425/405.1 |
| 6,958,105 B2 * | 10/2005 | Herrmann et al. | 156/245 |
| 7,524,389 B2 * | 4/2009 | Elbs et al. | 156/242 |
| 2003/0011104 A1 * | 1/2003 | Hock et al. | 264/316 |
| 2003/0094722 A1 * | 5/2003 | Matsuki et al. | 264/45.4 |
| 2004/0089965 A1 * | 5/2004 | Malfliet et al. | 264/46.6 |
| 2005/0008862 A1 * | 1/2005 | Joseph et al. | 428/408 |
| 2005/0196481 A1 * | 9/2005 | Spradling et al. | 425/174 |
| 2007/0108655 A1 * | 5/2007 | Aramburu et al. | 264/255 |

FOREIGN PATENT DOCUMENTS

| | | | |
|---|---|---|---|
| DE | 4313043 A1 * | 10/1993 | |
| EP | 43019 A1 * | 1/1982 | |
| EP | 1199406 A1 * | 4/2002 | |
| JP | 61169229 A * | 7/1986 | |
| JP | 05096643 A * | 4/1993 | |
| JP | 06091745 A * | 4/1994 | |
| WO | WO 9423917 A1 * | 10/1994 | |
| WO | WO 00/53400 * | 9/2000 | |

OTHER PUBLICATIONS

"Properties of Polystyrene (RUBBER)", university of Michigan.*

* cited by examiner

COMPOUND TOOLING SYSTEM FOR MOLDING APPLICATIONS

This application claims priority from provisional application for patent No. 60/717,362 filed on Sep. 16, 2005.

FIELD OF THE INVENTION

The invention concerns compound tooling systems for molding applications, and more particularly discloses a compound mold unit for use in plastics molding applications, and methods for using such mold unit.

BACKGROUND OF THE INVENTION

Conventional molding methods, particularly methods for injection molding of thermoplastics, generally involve the cycling of a single, usually expensive, hard, permanent mold very rapidly in conjunction with expensive molding equipment. Molds are usually made of steel or other metal alloys and are designed and economical only for large production runs. The high cost of mold production, as well as the high molding pressures used, impose size constraints on the mold and hence the size of the part which can be produced.

Thermosetting liquid resin injection or transfer molding methods generally use lower pressures with often less expensive equipment but tooling costs in processes using matched-die molds are also generally high. Lower pressures enable the use of larger molds and hence larger parts, within practical limits, may be produced. Lower-cost tooling made of soft metals such as aluminum as well as polymers or composites are also being produced but are usually used for testing purposes, proto-typing or in short production run applications. Such tooling, however, is used and well suited to the production of large parts using liquid resins, often with reinforcements, in a variety of molding processes.

In all cases where hard molds are used, mold geometry, and therefore, part geometry, are strictly constrained to ensure mold separation and part de-molding. Both require part draft and the latter often requires an ejector-pin system built into the mold. Heat is used in many processes (all thermoplastic molding and as a curing agent or accelerator in many thermoset processes) and thus shrinkage factors, part thickness, residual stresses etc., greatly influence mold design. The cure or solidification time of the material molded is critical to the efficiency of the process and places further constraints on both mold design and material selection. Steel or metal-alloy mold production is a time-consuming process and there is a considerable lag between mold design and part manufacture. While tooling and equipment costs are high, the molding processes in which they are used are highly efficient and labor extensive.

Plastics casting methods, on the other hand, are generally labor intensive with low rates of production, but tooling and equipment costs are low. Low-viscosity thermosetting plastics are mostly used as many thermoplastics have poor flow characteristics for this application though some hot-melt casting is carried out. Many molds are permanent or semi-permanent and can be made of a variety of materials and be of large size. Molds used in simple casting are open or vented to the atmosphere and filled by directly pouring the material, usually liquid resin, into the mold, resulting in parts with little or no internal stresses but dimensional accuracy is variable and voids are common. Voids may be eliminated by placing the filled mold in a pressure vessel and allowing the resin to cure in the pressurized atmosphere. Small and large hollow items are often produced by various specialized casting processes such as static, slush and rotational casting.

In many metal-casting processes, the molds are single-use and consumed in the process, the mold being destroyed to release the object molded. In these processes, the geometry of the part molded may be very complex as there are no mold separation constraints on part design. The molds used must be continuously produced and are usually made of inexpensive or re-usable materials. Molds used for casting, like all molds, define the negative shape of the object to be molded and are produced from solid positive master patterns or from double half-positives of the object and any other elements required in the mold. Master patterns are generally inexpensive to produce and may be made from a variety of materials. These patterns are often copied in a more suitable material to provide multiples of the tooling required to make the production molds. This tooling is generally inexpensive and may be produced rapidly, requiring far less up-front capital investment and time compared with tooling for molding operations but requires an ongoing mold production operation, essentially transferring much of the tooling costs to the production side of the manufacturing operation.

Some plastics casting processes use one- or two-part elastomer molds to mold a variety of thermosetting resins. These molds, being flexible, can handle complex shapes with undercuts etc., and produce multiple castings but the mold surface degrades with use and the mold must be replaced after a certain number of castings. The one-part molds are usually produced by pouring the activated elastomer over a pattern enclosed in a box-frame to produce a self-supporting mass of elastomer. Alternatively, the pattern may be covered with a thin layer of the elastomer which, when cured, is itself covered by a hard material to produce an open skin-mold supported against gravity by the conforming backing material (known as a mother-mold) to comprise a compound mold. The compound-type mold is the most economical as a minimum of elastomer is consumed in the process. Both types are laid flat in use and the object produced has an unfinished section.

Two-part molds are produced by embedding master patterns in clay to the parting line, enclosing in a box-frame and covering with elastomer. When cured, the box is inverted, the clay removed and the second mold half poured against the first. These mold types are usually flat-backed, self-supporting masses of elastomer clamped together between rigid plates and stood vertically. The molds have opening(s) on the top edge for filling and venting and produce a completely finished part.

All conventional fully closed molding processes involve the use of hard molds made of metal or other materials and such molds must be designed to allow their separation and part removal. A minimum draft angle in the part is usually required and undercuts cannot be tolerated unless molding flexible parts. The majority of molding processes in current use involve thermoplastics as the molding material due to ease of molding and material recyclability. Molding of thermosetting plastics is often difficult due to their adhesive qualities and the use of release agents is often required. In general, for most closed molding processes, molds contain one or more cavities with runners to conduct the molding material from the injection port to each cavity. The runners narrow and connect to each cavity through one or more gates which have as small a diameter as possible, depending on the viscosity of the material being molded and the size of the cavity. The runners and cavities are filled with a fluid molding material which solidifies to produce the part(s) attached to the runner system. The mold is then opened and the molding removed by hand or ejected from the mold by ejector pins. The part(s) may be cut away from the runner system at the gates while being ejected or afterwards or may be shipped still attached and cut away by the user. Both the ejector pins and the gates generally leave scars on the part, which are often undesirable. Also the high cost of metal molds often limits the size and number of cavities to a practical minimum with the required number of parts being produced by cycling the mold the required number of times.

The primary objective of this invention is to provide a new mold\tooling system, for use in various conventional and novel plastics and composites molding applications, that overcomes disadvantages of the prior art molding systems described above. This objective is realized in a compound tooling system, based on polymers as the primary tooling material, which divides the mold into separate parts, based on the different functions which the mold, as a whole, has to carry out in the course of any single molding cycle.

Every molding cycle consists of three basic steps, mold filling, material solidification and part removal, and therefore all molds are required to define the shape, facilitate filling and solidification and allow de-molding of the part. Predictably, molds typically comprise different sections, or zones, that focus on one or another of these functions, and it is a principal objective of the invention to separate the mold into parts in parallel with these functions. The shape-defining cavity geometry of any mold is unique while the necessity for support of that shape is common to every mold. However many molds in current use are supported by a simple flat backing plate and the mold body being supported both maintains the shape-defining cavity and also contains systems dedicated to filling, solidification and part removal. Metal molds incorporating such systems are expensive and size-limited but have the benefit of permanence; on the other hand, incorporating such features in an impermanent polymer mold would be uneconomical. It is therefore a principal objective of the present invention to provide a practical and economical polymer-based alternative to metal tooling for many applications, and to do so with few limits on part size or length of production run.

This objective is realized in a system whereby the shape-defining surface of the mold is a separate, replaceable and inexpensive part used in conjunction with the permanent mold body and backing-plate which, being permanent, make it economically feasible to add features or systems to aid in the molding cycle. The tooling of the invention combines features used in molding and in casting practices, incorporating certain advantages of each, while limiting certain drawbacks of both. Tooling production is designed to be rapid and mold size is limited only by practicality. Reinforcing materials, inserts etc., may be molded and the system used to produce composite components. The system may be used to produce reinforcement pre-forms which may be subsequently over-molded or co-molded with others to produce more complex composite parts. The invention has, therefore, the added objective of providing a tooling system which allows a Variety of manufacturing processes great versatility with regard to the shape, size and quality of the component which may be produced.

Compound mold design using mold units according to the invention is identical in many ways to conventional mold design since the same objective is sought in generally the same way. While the size of any conventional mold is chosen according to the size of the part or number of parts, the comparable compound mold will be based on the size of the appropriate standard backing-plate (where a standard system is used). The low cost of the compound mold of the invention, on the other hand, allows the production of a larger mold or of one with a higher number of cavities producing more parts per cycle. Heating\cooling has long been a problem with solid metal molds due to the impracticality of providing conformal systems and such systems may be uneconomical to install in polymer molds of limited life-span. In the compound mold of the invention these systems are easily and inexpensively installed in the backing mold which has an unlimited life-span.

While the master tooling may be produced by hand or by conventional or computer-aided machining, the invention has the further objective of providing tooling which can be produced directly by computer-aided design through various rapid proto-typing technologies. Rather than use the rapid proto-typing system for proto-typing purposes only, the part file may be modified to directly produce the master molds which may be finished and copied depending on production requirements. The design file may then be modified to produce the support tooling required for the system. The invention essentially seeks to greatly increase the utility and application of the various rapid proto-typing technologies available and greatly reduce the time required for tooling production. By reducing initial tooling costs and production time, and by transferring much of the tooling costs to production rather than capital, the invention seeks to make shorter production runs more economical especially as lower cost production processes may often be used.

A precursor of the present invention was a tooling system, here called the "prototype tooling systems", consisting of multi-cavity elastomer molds supported by rigid backing-plates, which established the advantage of using elastomers in the ease with which molds can be produced, and the ease with which these molds can be used to mold liquid resins. This "proto-type system" and its associated transfer molding process were developed to produce small, complex and detailed plastics parts and proved demonstrably capable of molding the types of parts for which they were designed, within certain size and geometrical limits. Beyond these limits, certain drawbacks of both a practical and economic nature become apparent, including dimension-loss across the parting plane due to mold compression, distortion of the cavities due to the inherent instability of the elastomer, and lastly, the comparatively large amount of elastomer used to produce a stable mold versus the amount actually consumed by the molding process. The compound tooling system of the present invention was therefore developed in part also to address and to overcome these drawbacks of the proto-type system.

The compound tooling system comprising this invention was designed to overcome these drawbacks and the key feature of the system is the vacuum-bonding of an elastomer skin-mold to the backing-mold. Since only a shallow surface layer of the elastomer mold is eroded during the molding process, the elastomer mold needs only to be slightly thicker than this erosion zone over the mold surface. The rigid backing-mold conforms to the skin-mold shape and supports it while the vacuum bond rigidizes it. The amount of elastomer used to make a mold is thus minimized and distortion of the cavities is eliminated. The elastomer skin-molds are easily moldable using hard polymer master molds. Dimension-loss due to compression is eliminated by modification of these master production molds so as to add elastomer to the mold mating surfaces sufficient to take up the compression. The clamping system holds the mold closed and sealed under adequate compression with no dimension loss while the backing-mold vacuum holds the cavities to design specification. The skin-mold and backing-mold are, in turn, supported by a flat, rigid backing-plate carrying standard features such as the clamping system and lifting hardware etc. and, being a necessity common to all compound molds, is designed to be one of a series of standard sizes. The custom skin and backing-mold may then be designed to suit one of a range of standard sized backing-plates, sufficiently comprehensive to accommodate any molding requirements.

SUMMARY OF THE INVENTION

The standard tooling unit of the system consists of three parts, the backing-plate, the backing-mold and the skin-mold. This is true regardless of whether the mold as a whole is one-, two-, or multi-part, and each mold according to the invention will, therefore, comprise one or more of these standard tooling units. The typical elastomeric compound mold consists of an elastomer skin-mold temporarily bonded to, and supported by a backing-mold and a rigid backing-plate. The backing-mold and the rigid backing-plate provide both general and local support, as well as rigidity, to the flexible skin which provides the final shape and surface finish to the compound mold. Bonding is preferably effected by vacuum acting through the backing-mold on the rear surface of the skin-mold. The typical closed-mold unit consists of the skin-mold halves bonded to, and sandwiched between, two backing-molds which are clamped together under adequate compression to seal the mold against filling pressures.

Deformation, or sag, of the skin-mold, and hence distortion of the mold cavity, is prevented by the vacuum bonding which is held at least for the duration of the molding cycle. When the molding cycle is complete, the vacuum bond is (typically) released to allow the flexibility of the elastomer to ease de-molding of the part(s). For the molding cycle, the compound mold is rigid like any conventional mold while the elastomer's flexibility gives it a part design and de-mold advantage over a conventional mold. The rigid polymer skin-mold may be mechanically fastened to the backing-mold as its rigidity will preclude an adequate vacuum seal. Fastening may be achieved by bolting through the mold mating surfaces onto threaded inserts molded into the backing-mold and\or by bolting through the backing-mold onto threaded inserts in the rear of the skin-mold. The skin-mold will remain fixed for the duration of its useful life in this case or it may be attached to rams which partly eject the skin-mold from its seat to facilitate de-molding operations.

Backing-plate:

The primary functions of the backing-plate are to provide support to the backing-mold, to hold the mold-halves together and to interface with all process equipment and systems. For any application, the backing-plate must be rigid enough to withstand the molding pressures used and, where additional external clamping pressure is applied, be composed of material with adequate compressive strength. Such considerations will dictate the choice of polymer as well as additives and reinforcements to be used. Reinforcing elements may be molded into the backing-plate and reinforcing ridges in appropriate patterns may be molded onto the rear of the plate. A clamping system may be mounted on the periphery of the plate, the active elements on one and passive on the other, and points of attachment to a supplementary external system may be mounted on the plate back. Mold lifting or handling hardware may be located as required.

Hollow tube-inserts or holes are molded in at certain locations to allow screw-mounting of the backing-mold and a key\key-way system is molded into both to allow accurate alignment. Depending on the molding process used, various systems connections may be required and these connection points are molded into the backing-plate edges or rear. These may include electrical heating elements, heating or cooling fluids, vacuum or compressed air or other systems. These systems connect internally through the backing-plate to the backing-mold, the connection points being molded into both in a standard arrangement. Fluid, compressed-air or vacuum connections may consist of simple o-ring seals while electrical connections may consist of plug and socket or simple contact points. The external connections may also be molded into the backing-mold.

In any molding process using this compound tooling system, transfer of the molds as well as accessory cure-cycle and de-molding equipment may be required, a major design intent being that multiple molds are continuously processed through the filling, curing and de-molding cycles. Standardization of mold size, and hence process and accessory equipment, will greatly facilitate the process. Standardization is based on the backing-plate's length and breadth while thickness may vary according to the requirements of different molding processes. Backing-plates may also be circular, solid or open ring, or consist of other regular geometric or irregular shapes, both open or closed. Virtually all part sizes and shapes may then be accommodated by a graduated series of backing-plate sizes and geometries. Larger backing-plates may be multiples of smaller sizes. All process equipment may then be designed to accept a standard size mold unit or be adaptable to a range of sizes and mold design and production may be based on the standard series.

In general, all molding processes, whether using thermoplastic or thermosetting materials, can be divided into two types, either high pressure or low pressure. The same backing-plate may be used for both types of process where the backing-plate on its own may be adequate for most low-pressure systems and may be augmented by an additional and external clamping press for the high-pressure types. Different molding processes involve different cure or solidification methods and these require different types of connection points in the backing plate. The standard backing-plate may include all the connection points required for all processes with only the appropriate ones connecting to the backing-mold for any given process. Large composite backing-plates may be produced for larger molds by mounting two or more standard backing plates to a standard, or non-standard, simple carrier plate which provides rigidity and strength but carries no connection points and few fittings. Mold systems may connect in series or take-off points may be molded into the backing-plate to allow the systems of multiple backing-plates to be interconnected.

Backing-mold:

The primary functions of the backing-mold are to support the skin-mold, to incorporate various process support systems and to interface with the backing-plate. By interfacing with the backing-plate, the backing-mold transmits the qualities of the backing-plate as well as conducting and distributing the various systems to the skin-mold. Since the backing-plate is designed with the appropriate rigidity and compressive strength required by the molding process, the backing-mold requires only a comparable compressive strength, though the backing-mold may also be modified with fillers, reinforcements or inclusions, etc., to enhance its rigidity or other qualities. The backing-mold is indexed to the backing-plate by a key\key-way or locator pin system or by any suitable means and, in the case of a standardized system, according to the standard pattern of such a system. The backing-mold may be attached by bolting through the backing-plate and onto threaded inserts molded into the rear of the backing-mold, the number and pattern of the bolts being adequate to transfer the rigidity of the backing-plate, as required. The backing-mold may be attached by various other means, depending on the molding process, such as clip-fasteners or catches or may be mounted permanently by adhesive bonding if required. Backing-molds may be made in single or multiple parts to mount to single or multiple backing-plates, with or without parallelism in the sectionality where multiples of both are used.

Electrical heating and fluid heating\cooling systems are used in the cure or solidification phases of many molding process in current use. Heat is often used to initiate and facilitate curing with many thermoset molding compounds and may be used to maintain plasticity of the material in the mold when processing thermoplastics. Cooling is generally used to solidify thermoplastics in the full mold and may be used to draw off heat in an exothermic thermosetting reaction or to cool down a cured and solid thermoset part to allow de-molding. These systems are installed in the backing-mold at or under the surface adjacent to the skin-mold depending on the type of skin-mold being used and on the type of system. Electrical heating elements may be molded into the backing-mold immediately below the surface and metal powders, such as copper or aluminum, may be added as a filler to the polymer to aid heat transmission. Fluid heating and cooling lines may be similarly molded into the backing-mold surface but where a rigid skin-mold is used these systems may take the form of channels in the surface of the backing-mold.

Because the backing-mold is highly conformal to the skin-mold, so too are these systems and they may be easily modified according to part wall thickness and other factors. System lines may be focused or dispersed to suit the part geometry and any system may be broken up into a number of systems within the backing-mold each connecting to the system ports or to a manifold molded into the backing-mold and connecting to the ports. For large molds, in particular, such a system may allow more even heating or cooling and a more rapid response to fluid temperature changes. Such systems may also be designed to control heating or cooling, both temporally and spatially or directionally, to allow greater control on curing and solidification. Such control may allow complex part geometries to be molded while conferring the ability to neutralize or reduce the associated stresses typical of such parts.

The backing-mold also includes the means of attaching the skin-mold and such means will depend on the type of skin-mold used. Flexible skin-molds are affixed to the backing-mold by vacuum and this vacuum may be reversed to supply compressed air to assist in de-molding operations. The backing-mold may also include a type of ejector system designed for use with the flexible skin-mold. The rigid skin-mold is mechanically affixed to the backing mold and may remain so for the duration of its useful life, the mold being similar to any typical conventional mold. An ejector system designed for use with rigid skin-molds may also be included and the components of the system may be molded into the backing-mold and\or the backing-plate.

The external system connection points carried by the backing-plate connect to standard locations on the plates' inner, or front, surface which mate with their appropriate counterparts in the rear face of the backing-mold. For fluid, vacuum or air systems, such connections may take the form of push-on types or simple open ports with o-ring seals may suffice, while for electrical connections, contact points or plug and socket types may be used. A secondary bolting system may be required around the joints and gaskets may also be used. While the general design intent with regard to standardization is that the backing-mold connect to external systems only via the backing-plate, connection-points to such systems may be molded into the backing-mold itself, as an alternative, or in the case where the standard backing-plate lacks a particular connection point for a certain system or in the case of very high-relief molds.

Skin-mold:

The primary functions of the skin-mold, whether flexible or rigid, are to define the shape and surface finish of the mold cavity. In two-part molds the skin-mold will also define the mold mating surfaces, or parting line, and carry the mold alignment guides and cavity filling systems. The skin-mold consists of a thin layer of material, the rear surface of which mates precisely with the backing-mold to which it is temporarily affixed and the front face of which defines the mold surface. The skin-mold is of minimally sufficient thickness to perform its functions and may be of variable thickness over its area. Thickness may also vary among different types of skin-molds depending on their material composition. The contours of the rear surface of the skin-mold and hence the backing-mold closely follow that of the skin-mold mating surface, but may consist of a somewhat simplified version of it, with all fine detail, projections, undercuts and surface texture, etc. eliminated. The skin-mold may carry molded-in alignment guides on both surfaces, for both accurate mating of mold halves and mating of skin-mold with backing-mold.

A typical mold may contain one or more cavities, a material injection port, a runner\feed system and a vent\vacuum system and port. Because of the compound nature of these molds, the molding material must be injected directly in-between the skin-molds and not contact either the backing-mold or plate. The injection port may be located at the mold perimeter, where material is injected at the parting line and be positioned at the top, bottom or sides of the mold, depending on requirements or the nature of the process being used. The mold vacuum or vent ports will be similarly located at the parting line in positions dictated by the injection port. Injection may also be accomplished through the backing-plate and backing-mold by extending either skin-mold out through both in a narrow tapered form, in a similar way to many conventional processes. In this case vacuum or vent ports may be placed at the mold parting line at various locations around the perimeter. This arrangement may be reversed with the vacuum or vent port central and with one or more injection points at the mold perimeter.

Flexible Skin-mold:

The flexible skin-mold may be composed of an elastomer or a flexible polymer, the limit to flexibility being of a practical nature. The flexible skin-mold, to qualify as such for use in the system, must be locally soft enough to allow the minimum deformation necessary to achieve a seal under the vacuum pressure used to secure it to the backing-mold. The skin-molds may be made of any suitable elastomers of varying hardness and flexibility to suit the application and be either thermosetting or thermoplastic, with or without additives or fillers, etc. The thermosetting silicones, as used in the proto-type molds, have very high heat resistance and good natural release qualities while thermoplastic vinyls may be re-cycled. Flexible skin-molds may also consist of a normally hard polymer made flexible by use of a suitable co-polymer. The degree of flexibility of the elastomer or polymer used will depend on both the size and complexity of the parts being molded, while the thickness of the skin-mold will also influence its flexibility. Some parts may require a high degree of local flexibility, particularly when molding undercuts, while large simple parts may require only a low degree of general flexibility.

Matching mold cavity alignment is maintained by a key and key-way system consisting of individual keys placed selectively around each mold cavity and elsewhere over the surface of the mold halves, as necessary. Accurate lateral alignment between the skin-mold and each backing-mold is accomplished by placing a reflecting key\key-way system at the interface with additional keys behind each cavity, where key location is less selective. A large continuous key-way\seal is placed around the mold perimeter to aid in coarse skin-mold alignment and, under compression, to seal the mold against the vacuum-evacuation or injection pressures, the seal being modified at the mold ports depending on the molding process used. This perimeter key-way\seal is reflected, and is fully continuous, in both skin-mold\backing-mold interfaces to seal each interface against the bonding vacuum which holds the skin-molds in place.

Mold cavity stability is maintained by the vacuum-bonding of the elastomer skin-mold to the backing-mold. Bonding may be effected in two ways. The perimeter key-way\seal contains apertures or grooves which connect, via a port, within the backing-mold to a vacuum connection molded into the backing-plate. When the grooves or apertures are evacuated, the key of the skin-mold is held tightly in the key-way of the backing-mold and the perimeter sealed. The individual key-ways and general surface of the backing-mold are also similarly grooved and these grooves connect to a second vacuum connection via a second port. As with the perimeter key-way\seal, the backing-mold surface may contain fine apertures which connect within the backing-mold to a manifold, or void, and thence to the vacuum connection. When the mold is mounted and sealed at the perimeter, the vacuum acting through the grooves or perforations firmly holds the keys in the key-ways and the rear surface of the skin-mold to the backing-mold. The volume of flexible polymer or elastomer used can then be minimized and any practical cavity shape or size can be accurately held through the molding operation. The grooves and apertures are held fine enough that the skin-mold will bridge either with no distortion. For de-molding operations, the vacuum bond is typically released to facilitate part removal, allowing undercuts etc., to be readily molded.

Rigid Skin-mold:

The rigid skin-mold is composed of a hard polymer, with or without additives or fillers, etc., which is mechanically fastened to the backing-mold. Fillers, such as metal powder etc., may be added to material to aid in heat transmission during the molding process. When affixed to the backing-mold, the skin-mold is a replaceable liner and the mold as a whole is similar to a typical conventional mold. Unlike the flexible skin-mold, undercuts etc., cannot be molded and positive draft must be maintained as for any conventional mold. Skin-molds may be composed of either thermosetting or thermoplastic materials suitable to the process used and material being molded. Alignment guides, for both accurate mating of mold halves and alignment with the backing-mold, are carried by the skin-mold but, because of its rigidity, the requirements are less stringent. The skin-mold carries the mold filling systems, mold ports, etc., but in processes where the molds are disconnected from the filling equipment during the mold cycle, there are more constraints on port locations and filling methods. The skin-mold is screw-attached to the backing mold, either from behind through the backing-mold or through the skin-mold face onto the backing-mold or it may be affixed to a type of ejector system to facilitate part de-molding.

DETAILED DESCRIPTION OF SELECTED EMBODIMENTS AND METHODS

Figure 1:
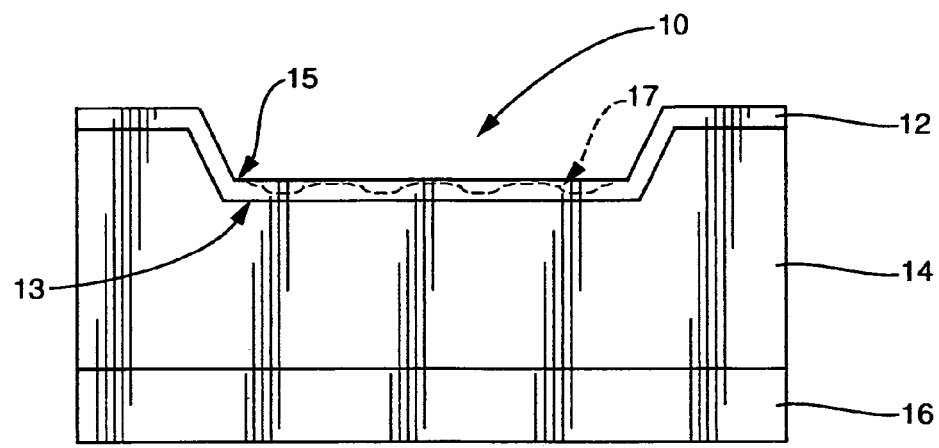
FIG. 1 is a cross-sectional view of a mold unit according to the invention.

In a tooling system according to the invention, the standard mold unit, or mold half in the case of matched molds, consists of a three-piece compound mold, the backing-plate, the backing-mold and the skin-mold.

The backing-plate is preferably one of a standard menu of backing-plates of various sizes and shapes suited to various sizes and shapes of molds depending on the general size and geometry of the part to be molded and carries standard features such as mold clamping systems, process connections, and the like. The backing-plate is designed to be rigid enough to withstand all molding and clamping pressures etc., its design also including whatever is required to integrate the mold into the molding process used, except actual cavity filling systems.

The backing-mold is a conforming section which mates with the backing-plate according to a standard system of guide pins or keys and is mechanically attached by any suitable means. The backing-mold may be solid, syntactic or semi-hollow with fillers and extra reinforcements as well as inclusions or molded-in systems depending on the molding process. Such molded-in systems may consist of electrical heating elements or heating and cooling lines for use with fluids or, alternatively, such heating\cooling lines may take the form of channels in the surface of the backing mold. These systems are highly conformal to the cavity and connect internally to the backing-plate which carries the connections to the external sources.

The skin-mold consists of a thin layer of material, with or without additives, which mates precisely with an associated backing-mold. The skin-mold comprises the mold surface, or mold matching face in the case of matched molds, and defines or includes cavities, runner systems etc., as well as mold alignment guides. The system utilizes two types of skin-mold depending on the molding application, either a flexible polymer such as an elastomer (or polymer with a flexing or softening agent added as a co-polymer) or a rigid, hard polymer.

While the backing-molds and plates are preferably permanent fixtures, the skin-molds are generally impermanent and are, essentially, replaceable mold surfaces, each having a life-span determined by their material composition, molding application and the material being molded. The flexible skin-molds have application to the molding of low viscosity liquids utilizing generally lower pressures, such as various types of thermosetting resin molding, while the rigid skin-molds have more application to molding processes utilizing higher pressures typically required for thermoplastics. There is, however, the potential for considerable overlap as both types may be used in a variety of applications.

The typical elastomeric compound mold consists of an elastomer skin-mold temporarily bonded to, and supported by a backing-mold and a rigid backing-plate. The backing-mold and the rigid backing-plate provide both general and local support, as well as rigidity, to the flexible skin which provides the final shape and surface finish to the compound mold. Bonding is preferably effected by vacuum acting through the backing-mold on the rear surface of the skin-mold. The typical closed-mold unit consists of the skin-mold halves bonded to, and sandwiched between, two backing-molds which are clamped together under adequate compression to seal the mold against filling pressures. Deformation, or sag, of the skin-mold, and hence distortion of the mold cavity, is prevented by the bonding which is held at least for the duration of the molding cycle. When the molding cycle is complete, the vacuum bond is (typically) released to allow the flexibility of the elastomer to ease de-molding of the part(s). For the molding cycle, the compound mold is rigid like any conventional mold while the elastomer's flexibility gives it a part design and de-mold advantage over a conventional mold. The rigid polymer skin-mold may be mechanically fastened to the backing-mold as its rigidity will preclude an adequate vacuum seal. Fastening may be achieved by bolting through the mold mating surfaces onto threaded inserts molded into the backing-mold and\or by bolting through the backing-mold onto threaded inserts in the rear of the skin-mold. The skin-mold will remain fixed for the duration of its useful life in this case or it may be attached to rams which partly eject the skin-mold from its seat to facilitate de-molding operations.

Broad latitude is allowed in the creation of non-standard tooling based on the principles of the system. As stated, skin-molds may be of two general types, either flexible or rigid, the distinction between them dictating their method of attachment to the backing mold. The backing-molds are generally rigid and composed of hard polymers as the primary material, their design and composition being modified to suit the molding process as necessary; however for certain applications a backing-mold comprising a compressible layer may be employed. The backing-plates are rigid, composed primarily of polymers, and designed to be standard components with as wide an application as possible. Both backing-molds and plates may include fillers, additives, reinforcements, etc., as well as a variety of molded-in systems and other fixtures and fittings. While the tooling system is based on polymers, other materials such as metals, wood, plaster, ceramics, etc., may be used in place of polymers for both backing-molds and plates in some applications. In general, most molding is carried out using two-part, matched-die molds and such will be considered as typical in describing the compound tooling system.

Figure 2:
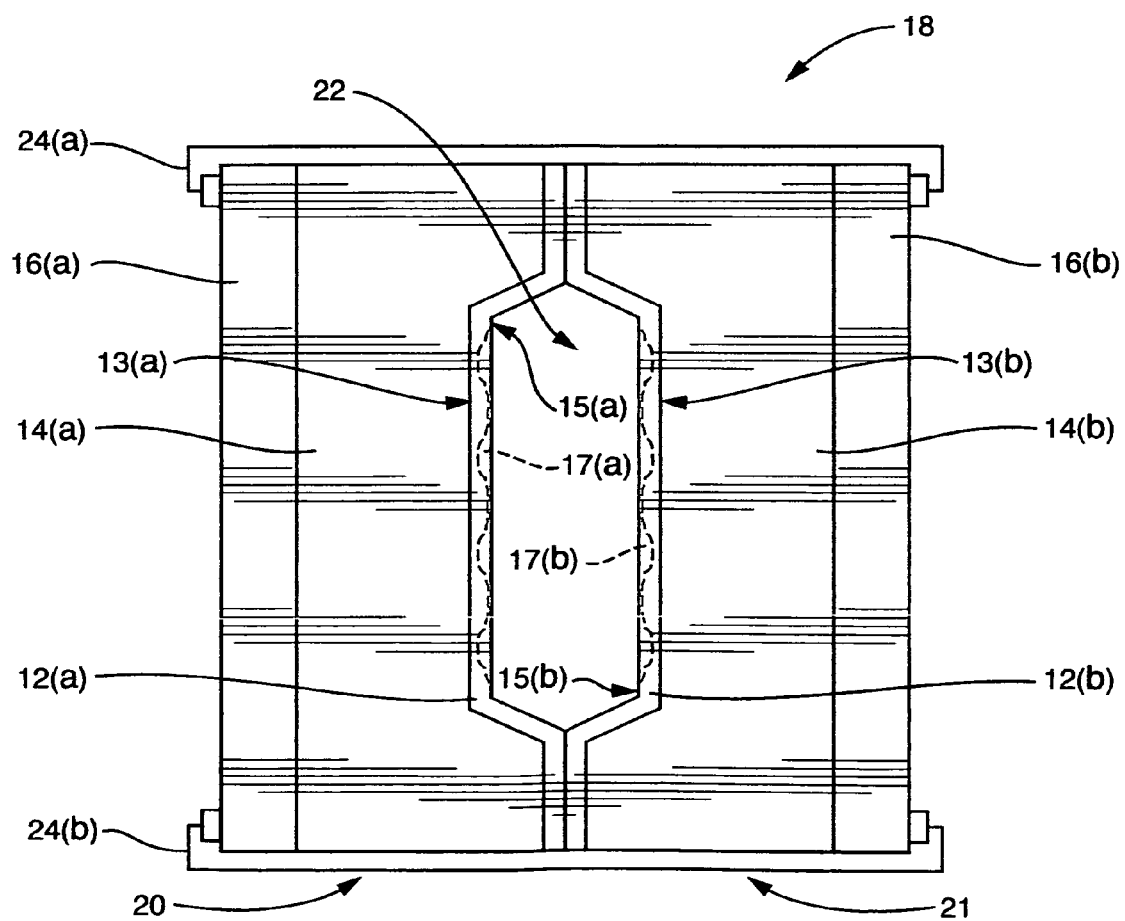
FIG. 2 is a cross-sectional view of a two-part compound mold according to the invention.

FIG. 1 illustrates the essential components of a basic mold unit 10 according to the invention. It comprises skin-mold 12, supported by backing-mold 14, which is in turn supported by rigid backing-plate 16. Mold unit 10 as shown may serve as shown as an open mold, but the basic mold unit as illustrated may also be combined to form an element of a two-part mold, as illustrated in FIG. 2, or indeed as a basic element of a multi-part mold. Skin-mold 12 is preferably releasably bonded to backing-mold 14 by one or more vacuum means, such as are diagrammed in detail in FIGS. 3 and 4.

Referring to FIG. 2 there is shown a two-part compound mold 18 including a first mold unit 20 and a complementary and opposing second mold unit 21. Each of said mold units comprises the basic elements of a skin-mold 12, backing-mold 14 and rigid backing-plate 16. A fillable mold cavity 22 is defined by the interior contours of the front surfaces of the respective skin-molds; as illustrated in detail in FIG. 10 said mold cavity further comprises, at the interface of the skin-molds, a variety of conventional closed mold elements not shown on FIG. 2 that are essential to the filling of the mold, or useful in the de-molding operation, including mold material injection ports, runners for the transport of mold material, gates, sprues, vent ports and the like.

Clamping means 22 and 24, which serve to securely clamp mold units 18 and 20 prior to the filling of the mold cavity, are carried by the backing plates, and may take any conventional form.

In the compound mold of the invention the skin-mold of a mold unit is preferably releasably bonded to a backing-mold by vacuum means. Referring to FIG. 2 there is shown a cross-section of a mold unit 30. Skin-mold 32 is shown bonded to backing-mold 34, which is in turn supported by backing-plate 36. Skin-mold 32 comprises a perimeter margin 38, on the rear surface of which a continuous circumferential ridge forms a keyway adapted to interlock with a complementary keyway furrow 42 in the front surface 44 of backing-mold 34. A first vacuum means, adapted to seal the perimeter of skin-mold 32 to backing-mold 34, includes a first vacuum source port 46 connected by a channel 48 to an array of interconnected fine grooves 50 disposed along the surface of keyway 42.

Figure 3:
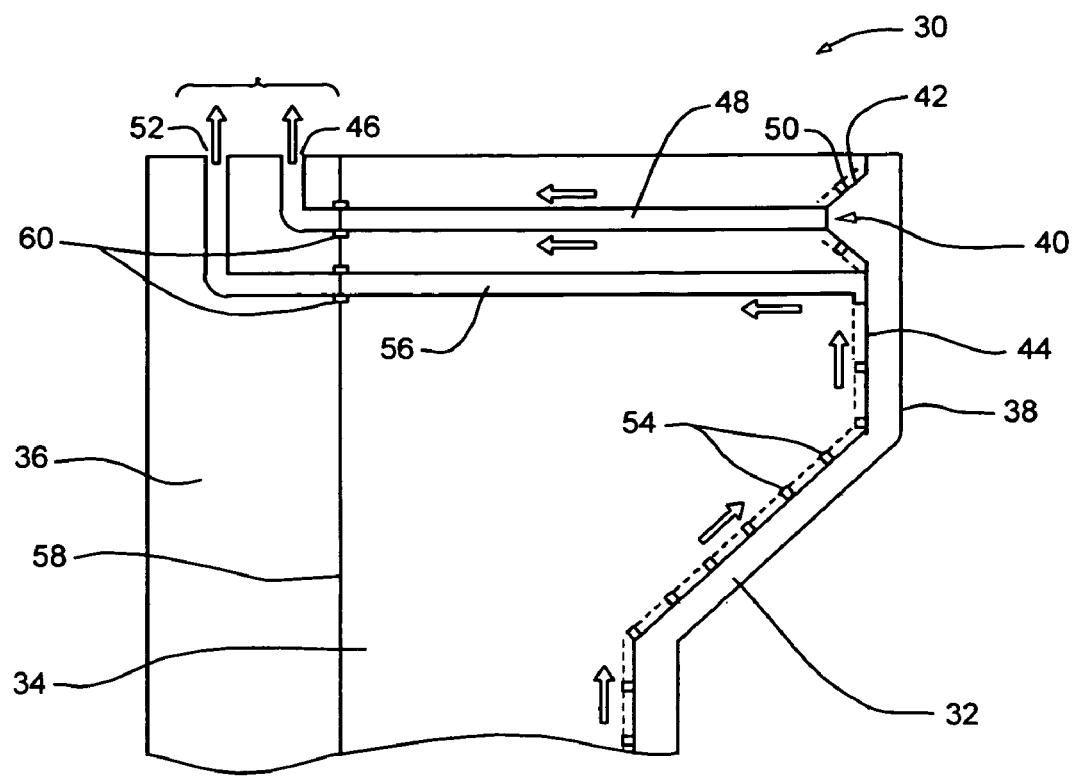
FIG. 3 is a cross-sectional view of a portion of a mold unit, illustrating the bonding of skin-mold to back-mold with two separately actuated vacuum means.

A second, independently actuated vacuum means serves to releasably bond an interior portion of the rear surface of skin-mold 32 to backing-mold 34. Said second vacuum means comprises second vacuum source port 52, an array of interconnected fine grooves 54 disposed on the front surface of backing-mold 34, in a space interior to and within skin-mold perimeter margin 38, and a channel 56 connecting said second vacuum source port to said array of fine grooves 54. As illustrated in FIG. 3, vacuum transport channels 48 and 56 may extend through the rear surface 58 of backing-mold 34, via compression seals 60(a) and 60(b), into backing-plate 36 to vacuum source ports 46 and 52 carried on backing-plate 36.

Figure 4:
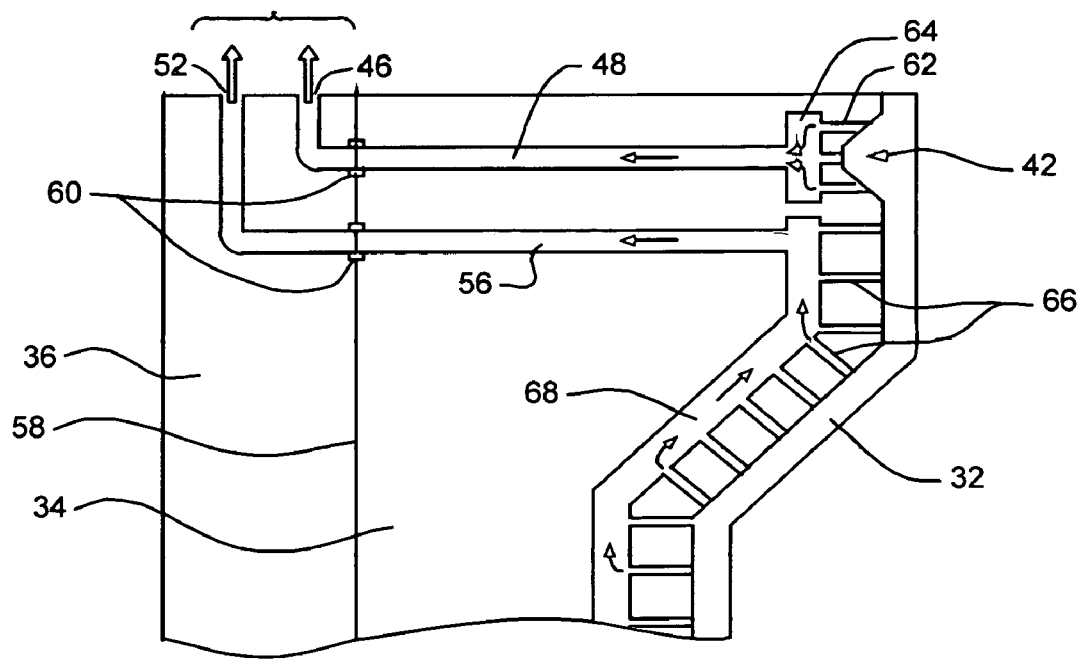
FIG. 4 is an alternative embodiment of the mold unit of FIG. 3.

FIG. 4 illustrates a variation in the type of vacuum means employed, wherein the arrays of fine grooves illustrated in FIG. 3 have been replaced by arrays of perforations, connected to manifold means in turn connected to vacuum source ports. With all other part identifications as numbered in FIG. 3 there is shown in FIG. 4 a perimeter seal established by a first vacuum means comprising a first array of perforations 62 exiting at backing-mold perimeter keyway 42 and connected to a first manifold 64, in turn connected via channel 48 to vacuum source port 46. Also, and similarly to that shown in FIG. 3, a second vacuum means serving to bond the central portion of skin-mold 32 to backing-mold 34 comprises a second array of perforations 66 disposed in the front surface 44 of backing-mold 34 is connected to a second manifold 68, which is in turn connected by channel 56 to second vacuum source port 52.

As described in greater detail below, various means for de-molding a two-part mold according to the invention may be used. In particular reversible vacuum means may be employed to assist the de-molding operation in such compound molds. Thus, referring to FIGS. 3 and 4, the use of reversible vacuum sources in the illustrated molds enables the provision of either a vacuum pressure or a positive pressure to those selected portions of a skin-mold serviced by said vacuum means. Application of a positive pressure from second vacuum source port 52, while maintaining the perimeter seal established by applying and maintaining a vacuum pressure from first vacuum source port 46, will result in ballooning the central portion of skin-mold 32 away from back-mold 34 and assist in the de-molding of any molded objects.

Figure 5:
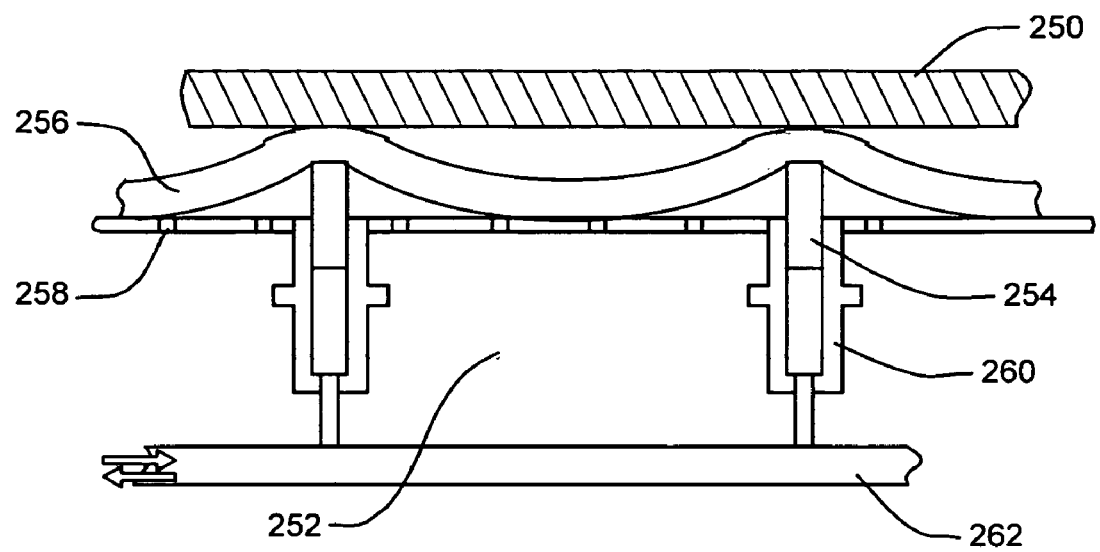
FIG. 5 is a diagram of backing-mold de-molding means for use with flexible skin-molds.
Figure 6:
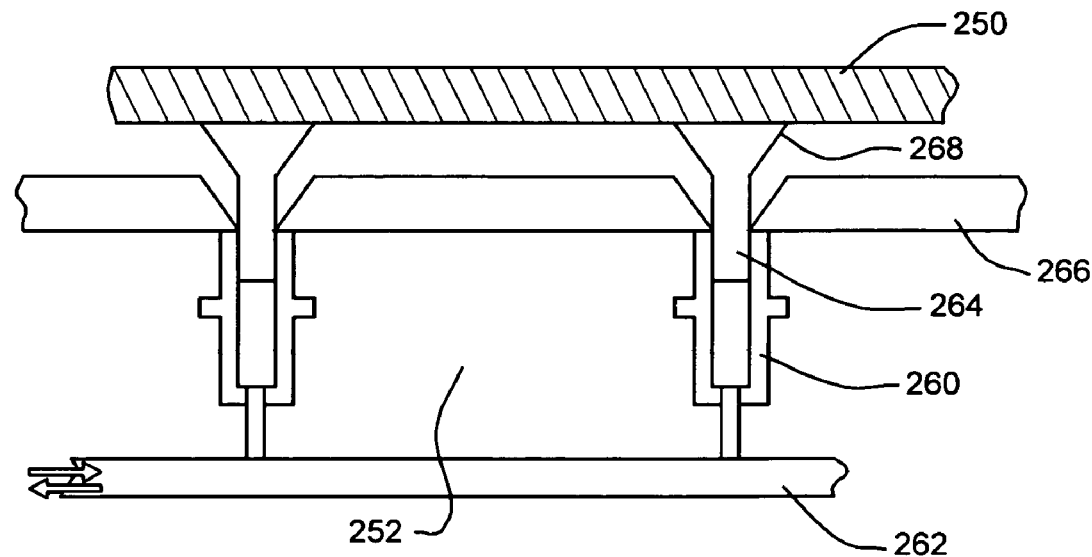
FIG. 6 is a diagram of backing-mold de-molding means for use with rigid skin-molds.

De-molding operations may also be assisted by the use of mechanical de-molding components, such as the pressure-powered mechanical means illustrated in FIGS. 5 and 6. Referring to FIG. 5 there is illustrated a cross-sectional diagram of a mold detail in the course of a de-molding operation: a molded part 250 is being pushed away from the front surface of back-mold 252 by the outward movement of moving rams 254(a) and (b) against the rear surface of a flexible skin-mold 256, other portions of said skin-mold remaining bonded to back-mold 252 by retained vacuum pressure applied to an array of interconnected fine grooves 258 upon said front surface of back-mold 252. Moving rams 254(a, b) are seated in stationary cylinders 260(a, b) disposed at selected positions over the front surface of back-mold 252, and connected via a manifold 262 to an independently actuated, reversible vacuum source (not shown). Employing such an embodiment of a mold unit according to the invention, a molded part may be de-molded by the application of a positive pressure to said stationary cylinders, thereby driving moving rams 254(a, b . . . n) to detach the molded part away from the skin-mold and the back-mold, and, following the de-molding operation, skin-mold 256 may be reseated against the front surface of back-mold 252 by reversing the pressure flow from the reversible vacuum source and now applying a vacuum pressure to stationary cylinders 260(a, b . . . n), to draw said moving rams back within the body of back-mold 252.

For applications employing a rigid skin-mold, a de-molding system as illustrated in FIG. 6 may be used. In this embodiment moving rams 264(a, b . . . n), extend through apertures in a rigid skin-mold 266 and preferably have a broadened head portion 268 adapted seat flush with the front surface of said skin-mold when at rest or under conditions of vacuum pressure in manifold 262. To effect a de-molding operation, the application of a positive pressure within manifold 252 causes moving rams 264 to move outward and to force the now-solid molded part 250 away from the front surface of skin-mold 256. Upon reversal of pressure in manifold 252, to a vacuum pressure, moving rams 264 return to a seated position with their head portions 268 again flush with the front surface of rigid skin-mold 256.

Figure 7:
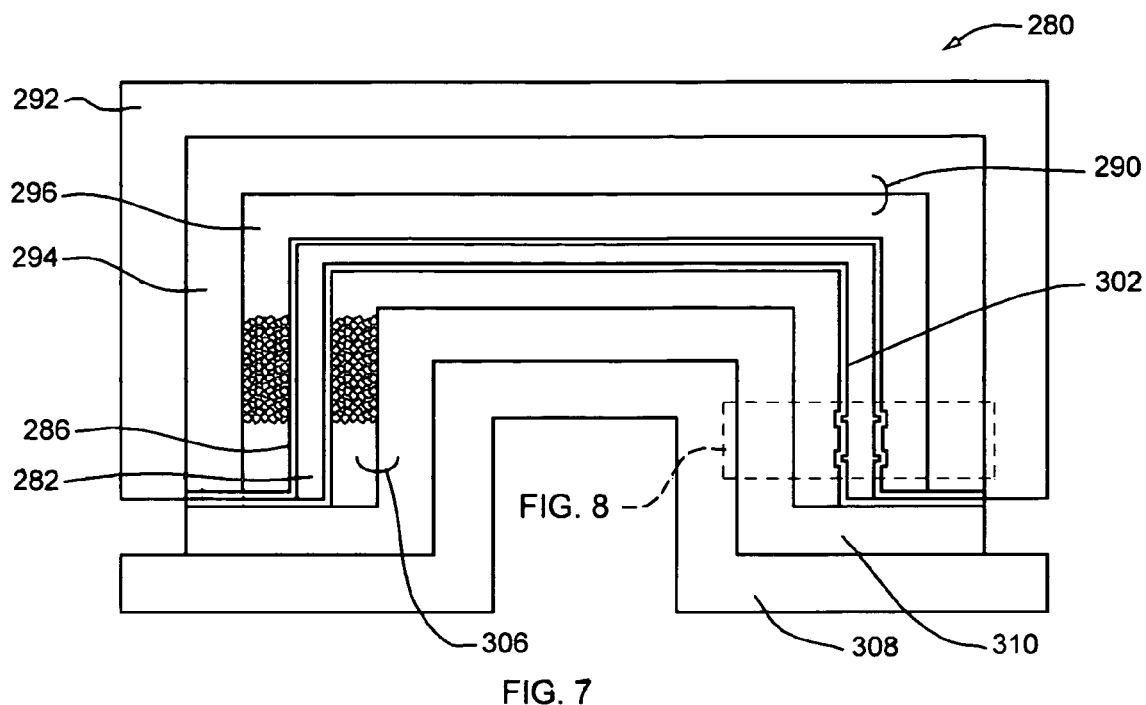
FIG. 7 is a diagram of a two-part compound mold comprising a compressible backing-mold layer.
Figure 8A:
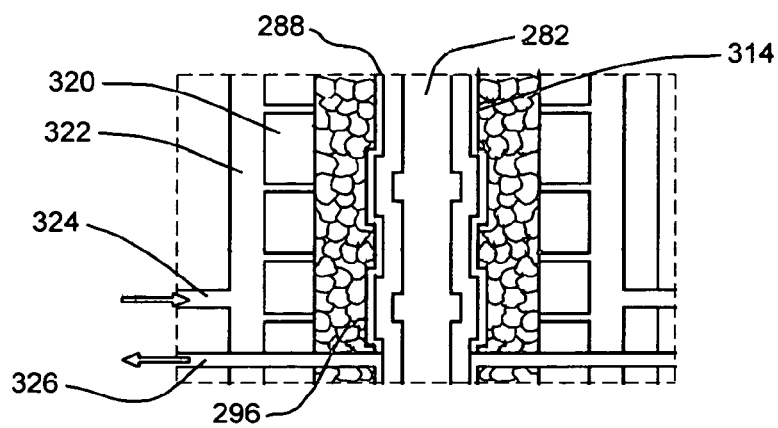
FIG. 8 (a, b) is a detail view of a portion of the FIG. 7 diagram.

FIGS. 7 and 8(a, b) illustrate a two-part compound mold embodiment of the present invention wherein the backing-mold of each of two complementary mold units comprises a compressible foam material layer for use in assisting de-molding operations. Referring to FIG. 7, there is illustrated a cross-sectional diagram of the principal components of a two-part compound mold 280 surrounding a fillable mold cavity 282: a first mold unit 284 has a U-shaped cross-section showing a skin-mold 286 held via vacuum pressure (as shown in FIG. 8, a detail from FIG. 7) against the front surface 288 of a compound backing-mold 290 supported by a rigid backing-plate 292.

Compound backing-mold 290 of first mold unit 284 comprises three superimposed layers, including a rigid rear layer 294 directly supported by the front surface of backing-plate 292, an intermediate layer 296 comprising a sealed container of compressible open cell foam material and having a rear surface bonded to and supported by the front surface of said rigid layer 294, and a rigid, grooved surface layer (visible in FIG. 8) that is bonded to the front surface of said foam layer and forms the front surface 288 of said backing-mold. Second mold unit 300 has an N-shaped cross-section but its components are analogous to those of first mold unit 284: a skin-mold 302 is held via vacuum pressure (again, as shown in FIG. 8) against the front surface 304 of a compound backing-mold 306 supported by a rigid backing-plate 308.

Compound backing-mold 306 of second mold unit 300 also comprises three superimposed layers, including a rigid rear layer 310 directly supported by the front surface of backing-plate 292, an intermediate compressible foam layer 312 the rear surface of which is supported by and bonded to the front surface of said rigid layer 310, and a rigid, grooved surface layer bonded to the front surface of said foam layer that forms the front surface 314 (as visible in FIG. 8) of said backing-mold.

As seen in FIG. 8, a detail view taken from section A-A' of FIG. 7, the compressible foam layer 296 of compound backing-mold 290 of mold unit 284 comprises, at the surface which is supported by the rear rigid layer of said backing-mold, a vacuum system including a perforated rigid face plate 320, a manifold 322, and a conduit 324 to independently actuated, reversible vacuum means, whereby a vacuum pressure can be applied, and reversed, to the layer 296 of open-celled compressible foam material. (As shown in FIG. 8, the front surface of foam layer 296 is bonded to a rigid front surface layer 288, which comprises an array of interconnected fine grooves connected via conduit 326 to an independently actuated vacuum source (not shown) for bonding skin-mold 302 to backing-mold 290, in the manner illustrated also in FIG. 3).

Figure 8B:
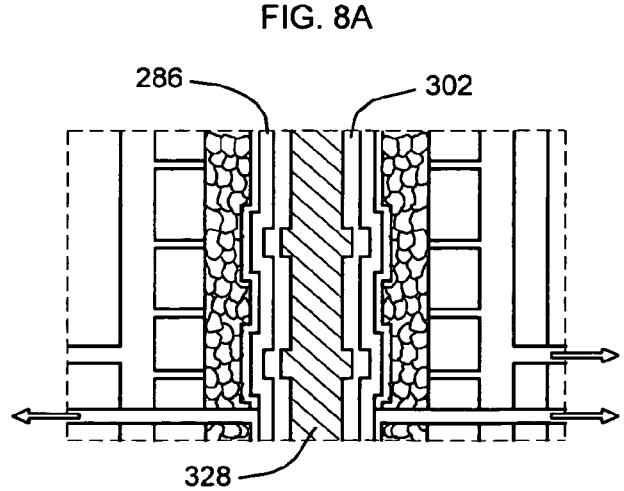

Referring to FIG. 8(b), there is illustrated a de-molding operation for mold 280, whereby the application of vacuum pressure to the vacuum systems of the foam layers of backing-molds 290 and 306 effects a compression of said foam layers that draws opposing skin-molds 286 and 302 away from now-solid molded object 328.

In certain embodiments of the present invention the backing-mold is provided with the precise contours of the fillable mold cavity, including all ancillary components such as sprues, runners and the like, and the skin-mold used is a very thin sheet of material, which may be inherently flexible or which may be stretchable or deformable under specific conditions. A very thin, highly flexible such sheet may thus be made to adhere to the precise contours of a pre-shaped backing-mold under vacuum pressure using a mold unit design as shown in FIGS. 3 and 4, possibly with the addition of heat energy supplied by controllable heating elements disposed in the backing-mold in the vicinity of its front surface.

Figure 9A:
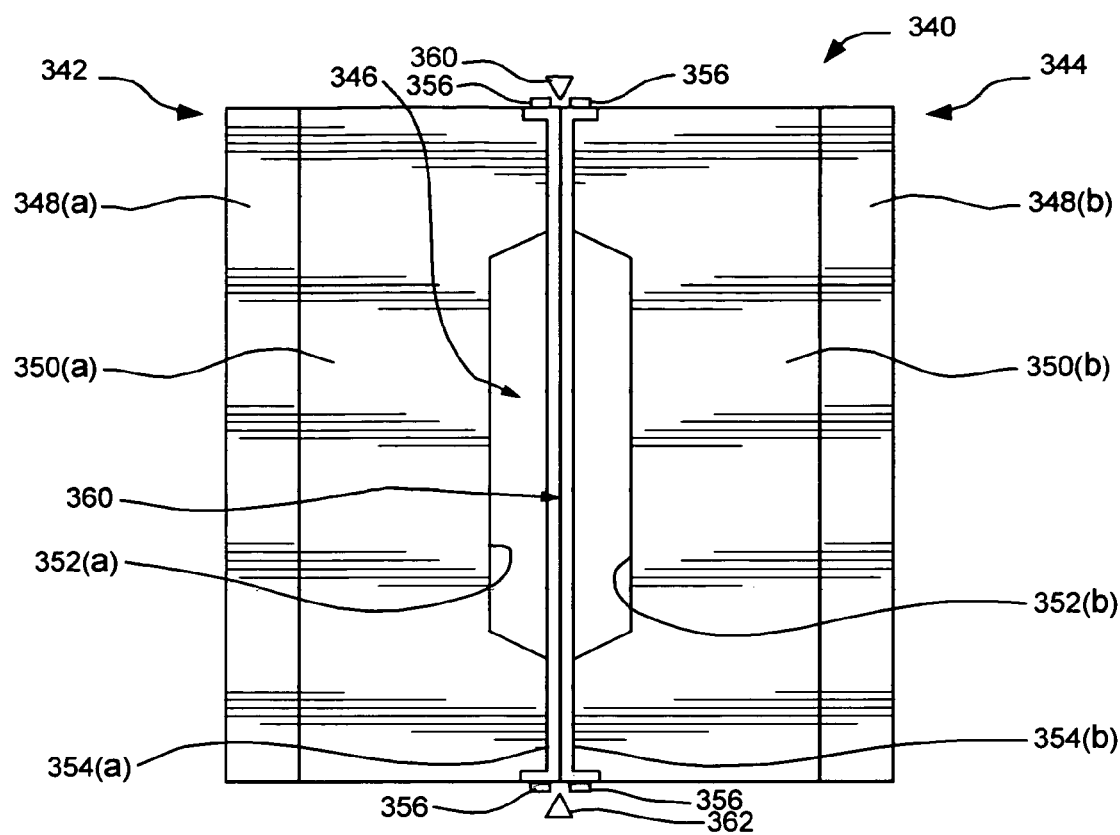
FIG. 9(a, b) are diagrams of a two-part compound mold embodiment adapted to stretch-form a thin sheet skin-mold to backing-mold contoured surfaces, illustrating the operation of said mold.

A further example of such an embodiment in the form of two-part compound mold is illustrated in FIG. 9(a, b). In this embodiment, the mold design permits vacuum pressure to be applied at the respective backing-mold surfaces, to draw each of two thin sheet skin-molds towards a said backing-mold, and positive pressure to be applied between said two thin-sheet skin-molds at the parting line, to fill the mold cavity and allow each skin-molds to balloon towards its assigned backing-mold. Referring to FIG. 9(a) there is illustrated a two-part compound mold 340 comprising a first mold unit 342 and a second mold unit 344, surrounding a fillable mold cavity 346. Each mold unit comprises (as enumerated with respect to mold unit 342) a backing-plate 348 and a backing-mold 350. The front surface 352 of backing-mold 350 is contoured to precisely define the negative shape of the object or objects to be molded in mold cavity 346; in addition said front surface of backing-mold 352 comprises vacuum means, structurally as shown in FIGS. 3 and 4 (and not shown here), that operate over the mold cavity surface of said backing-mold. A skin-mold 354 composed of a thin elastomer membrane is disposed as a flat surface across the front surface of backing-mold 352 and secured by clamps 356 at the perimeter of said backing-mold. Components directly analogous to those here enumerated with respect to first mold unit 342 are found in opposing second mold unit 344, which is mated to first mold unit 342 at parting line 358. Mold 340 further comprises at said parting line at least one fill port 360 connected to an air pressure source (not shown) and one vent port 362. Clamp means (also not shown) are carried by backing-plates 348(a) and 348(b) for clamping said mold units together.

Figure 9B:
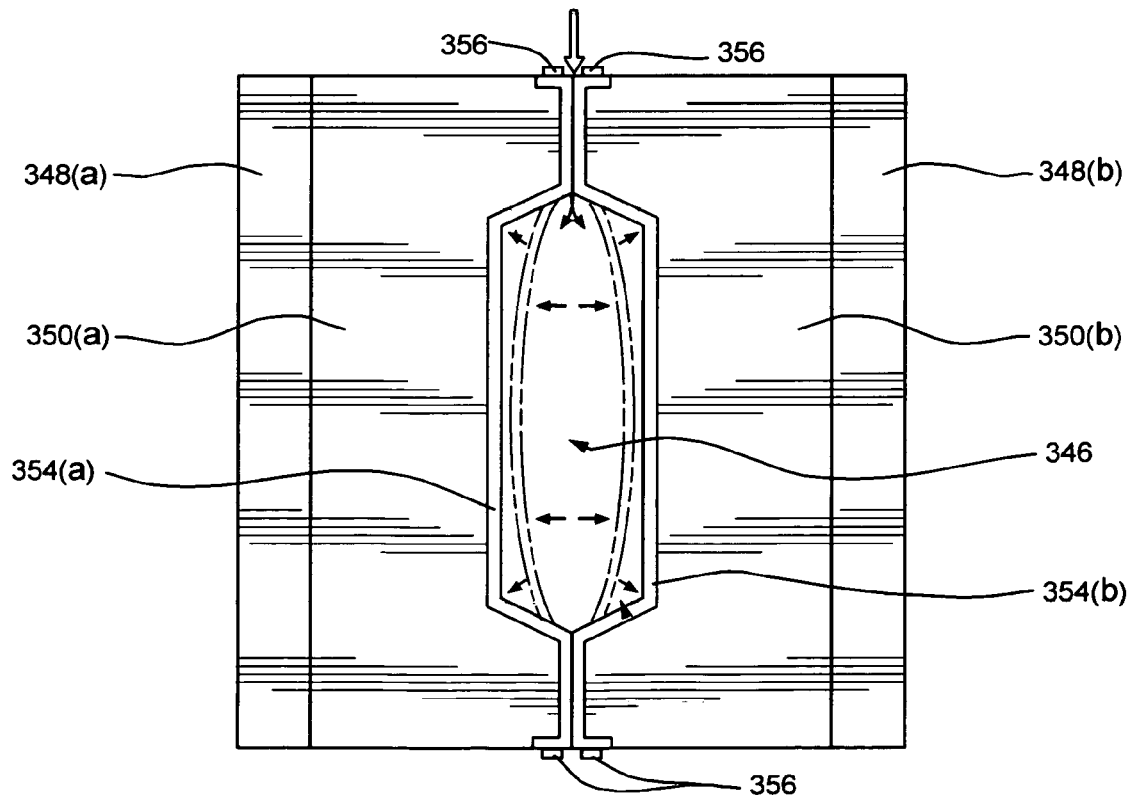

Now referring to FIG. 9(b), upon the closing and clamping of mold 340 the vacuum means that service the grooved surfaces of backing-molds 350(a, b) are actuated, and simultaneously air pressure is fed via vent port 358 into mold cavity 346, thereby drawing each of elastomer membrane skin-molds 354(a, b) towards Rs associated backing-mold, and causing said skin-molds each to be precisely stretch-formed onto the front contoured surface of its associated backing-mold. On the completion of this skin-mold positioning process, mold material is introduced into mold cavity either through fill port 360 or through a separate material injection port, as vent port 362 is opened to allow the displacement of the air initially introduced into mold cavity 346. Preferably, upon solidification of the mold material in mold cavity 346, the vacuum means applying a vacuum to the front surfaces of backing-molds 350(a, b) are reversed upon the un-clamping and opening of mold 340, thereby causing skin-molds 352(a, b) to be pushed away from said backing-molds and assisting the de-molding of the molded material.

Figure 10:
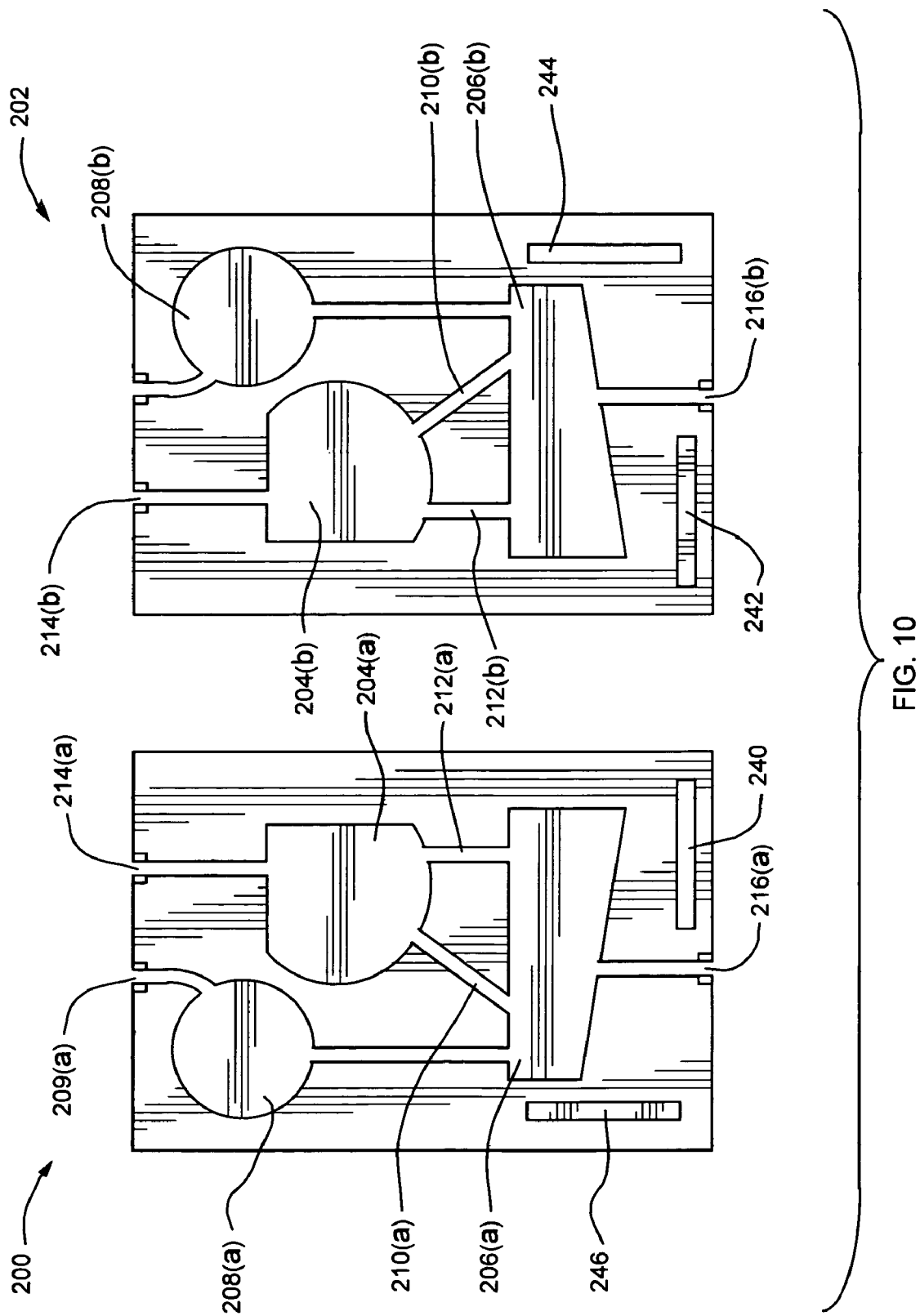
FIG. 10 illustrates the opposing mating surfaces of the two skin-molds of a two-part compound mold according to the invention.

Referring to FIG. 10 there is illustrated the outer or front surfaces of two complementary skin molds as employed on opposing mold units of a two-part compound mold according to the invention. FIG. 10 illustrates in a general way the intimate correspondence of components on the mating surfaces of the two skin molds in such a mold, as a system comprising injection ports, fillable mold cavities, sprues, channels, runners, gates and still other components is positioned at the interface of the two skin molds. Each structural element of each of said components is effectively partitioned between the two skin molds, to be rejoined into a functional component upon the closing and clamping of the mold. This figure is an diagram to illustrate the congruence of skin-mold mating surfaces and does not necessarily represent a workable mold.

In FIG. 10, a first skin-mold 200 bonded to a first mold unit, not shown, is matched with a second, complementary skin-mold 202, which is bonded to a second mold unit, not shown, said first and second mold units collectively forming a two-part closeable compound mold. As shown on FIG. 10 said mold comprises a separate portion for each skin mold of two fillable cavities respectively defining the negative shape of an object to be molded, and of the associated components needed to effect the successful filling of these cavities with molding material. At the parting line of the mold, however, the mating surfaces of the respective skin-molds and are mirror images of one another, with all component boundaries on the mating surface of one skin-mold being exactly matched by a complementary, mirror image complement on the mating surface of the opposing skin-mold. Thus the surface boundary of portion 204(a) of a first fillable cavity which is comprised within skin-mold 200 has a mirror image in the surface boundary of complementary portion 204(b) of said first fillable cavity comprised within opposing skin-mold 202; likewise for the surface boundary of a second fillable cavity portion 208(a) on skin-mold 200 and the matching, mating surface boundary of portion 208(b) of said second fillable cavity within opposing skin-mold 202.

Similarly to the above mold components, runner portions 210(a) and 212(a) on first skin-mold 200 have matching runner portions 210(b) and 212(b) on second skin-mold 202; a mold material injection port is comprised of a first portion 214(a) on first skin-mold 200 and a complementary, matching portion 214(b) on second skin-mold 202. A vent (or vacuum evacuation) port is comprised of a first portion 209(a) on first skin-mold 200 and a complementary, matching portion 209(b) on second skin-mold 202 that join to form a vent port that permits the mold cavities to be vented during the mold filling operation. Conventional additional components such as sprues and gates, that may be also be disposed within the mold design, are discussed below, and are not shown.

An overflow reservoir cavity is shown in FIG. 10 apportioned between a first reservoir cavity portion 206(a) carried by first skin-mold 200 and a second reservoir cavity portion 206(b) carried by said second skin-mold 202, said reservoir cavity portions having boundaries at the mating surface of said skin-molds that are mirror images of one another and that will join to form a complete reservoir cavity upon the closing of the mold. Said overflow reservoir is designed to receive mold material as may be needed to complete the filling of the mold material cavities upon the cooling and consequent shrinking of the mold material initially injected in said cavities; to maintain the mold material in the overflow reservoir in a fluid condition as the mold material solidifies in the mold cavities, independently controlled heating means, such as heat coils (not shown), are preferably embedded in the backing-molds that supports the skin-molds, at positions adapted to heat the overflow reservoir independently of the fillable cavities.

Reservoir cavity portions 206(a, b) are connected via runner portions to an overflow material reservoir pressure port divided between pressure port portion 216(a) on first skin-mold 200 and complementary pressure port portion 216(b) on the surface of second skin-mold 202. Preferably said pressure port is pressure reversible and may serve as a mold vent port in the course of the mold material filling operation, ensuring the filling of said overflow reservoir following the filling of said first and second mold cavities with mold material. When all mold cavities have been initially filled with mold material, the application of air pressure in said pressure port ensures that any shrinking of mold material in said first and second mold cavities is compensated by an inflow of mold material from the overflow reservoir into said cavities.

To assure lateral alignment of the complementary skin-molds 200 and 202, and therefore the lateral alignment of all components positioned at the interface of the skin-molds, including any fillable mold cavities, said skin-molds carry interlocking key/keyway means. As illustrated by way of example on FIG. 10, first skin-mold 200 carries keyway 240 adapted to interlock with key 242 carried by second skin mold 202, and second skin-mold 202 carries keyway 244 adapted to interlock with key 246 carried on first skin-mold 200.

Tooling Production

The compound tooling components used in systems according to the invention are derived from master patterns or master molds, made by various methods, from which elastomer or compound molds are, in turn, made and used to produce the permanent and impermanent production tooling. While the backing-plate and backing-mold are composed of hard polymer materials with additives, inserts, reinforcements etc., the skin-mold may be composed of elastomers or hard polymers with the method of attachment to the backing-mold varying accordingly. The hardness or flexibility of the skin-mold may therefore vary across a wide spectrum from highly flexible to very rigid as per the particular molding requirements and different types of skin-mold will be appropriate to different types of molding processes as well as molding materials. However, different types of skin-mold may be used in similar processes and with similar materials. The backing-mold, and the backing-plate also, are designed having in mind the molding process and material to be used and may include systems to aid in solidification and part de-molding while the backing-plate also carries systems, features or elements required to interface with the external systems and equipment of the molding process used.

Since this tooling system is based on the use of polymers and elastomers as the tooling materials and the tools are used to mold polymers and elastomers, then the tools themselves may be produced using polymer and elastomer master tooling. Master patterns (or master molds) of each of the components of the tooling unit are first required. While for certain applications such as proto-typing, short-run or very large components, a single compound mold may be produced directly, the system is designed for long-run production with efficiency being achieved through the use of multiple, low-cost tools continuously cycling through the process, the number of tools required being dictated by the total individual mold cycle time divided by the mold filling time, the filling apparatus being in continuous use and the fill time defining the production rate. The system therefore requires a secondary tool production process, since for any molding operation, a fixed number of backing-plates and backing-molds will be required for use with any number of consumable skin-molds, depending on the life of the skin-mold and the production run.

The basic tooling unit of the system is the three-part compound mold unit, or mold-half, with a standard backing-plate supporting a custom backing-mold and skin-mold. A matched-die mold is required to produce each component and such a mold may consist of a conventional-type mold made of a hard polymer or a compound mold made of elastomer, supported and vacuum-bonded to a rigid backing-plate or an elastomer-skinned compound mold. These generator molds may be made from master patterns or produced directly by machining etc., and are size standardized in parallel with the production molds. Since each backing-plate is standard-sized and used with an indefinite number of molds, it is produced using a permanent generator-mold. The backing-mold is required in more limited numbers and may not warrant the production of the elastomer-skinned compound mold. The elastomer production skin-molds are produced from solid polymer molds while the rigid polymer skin-molds are made using either solid polymer molds, or solid elastomer (or elastomer-skinned) compound molds.

For any compound mold, four surfaces must be defined, the rear surface of the backing-plate, the backing-plate\backing-mold interface, the backing-mold\skin-mold interface and the skin-mold front surface. These four surfaces define the three components of each mold unit and hence the geometry of each of the three generator-molds required. Since each backing-plate is a standard, its rear surface and the backing-plate\backing-mold interface are standard for all molds of a class size and hence three of the generator mold halves are, therefore, also standard for all molds in the class size. The backing-mold\skin-mold interface defines the surface of the second half of the backing-mold generator mold as well as one half of the mold needed to produce the skin-mold, the actual mold mating surface itself defining the second half. While the interface surfaces are precisely mating positive-negative reflections of one another, they may be modified as required to better suit their roles in both the tooling system and the molding process used.

The master tooling for the system, therefore, consists of three matched-die type molds to produce each compound mold unit. A total of six molds are therefore required to produce the basic double tooling unit comprising a typical closed mold. The mold defines only the shape of each component and incorporates any elements required to facilitate the molding-in of inserts for system connections, ports, clamping, transfer, part joining etc. Modifications to the interface surfaces will also be included, where appropriate, in the respective dies such as where threaded inserts are included in the rear of the backing-mold or where the rear surface of the skin-mold is smooth while the mating surface of the backing-mold is grooved or channeled. Molding-in of heating and cooling systems may require the use of secondary elements such as clips, braces or frameworks to which the systems can be attached and which are incorporated into the matrix of the mold component. For various reasons, each component of the mold may be produced in two or more stages using two or more molds, particularly where different materials are required in different zones of the component or to focus certain qualities or for other reasons. The master tooling for the system may be produced by a number of methods.

In the first method a master pattern of the backing-plate is produced from which a two-part mold, polymer or elastomer with backing-plate, is derived. This mold can be copied and used to produce any number of plates. Since the inner surface of the backing-plate is the positive of the rear surface of the backing-mold, this positive becomes one negative mold surface of the backing-mold master mold. These three dies are then standard to all molds of a class. The three custom dies are derived by working back from the mold surface itself. Master patterns of the required molded parts are used to produce a master production mold, defining the mold cavities, runner systems, mold mating surfaces, etc. Each half of this mold is used to produce a positive of the mold matching surface and constitutes one half of the skin-mold master production mold. A thin layer of material is then added over this surface to represent the skin-mold itself and the upper surface of this layer is the master pattern of the skin-mold\backing-mold interface. A solid impression of this surface is then taken from which is derived the second half of the skin-mold master production mold. This solid impression is then modified as required to produce a positive of the backing-mold surface which is, in turn, used to derive the second half of the backing-mold master production mold. Each of these mold halves may be used as master patterns themselves to produce an elastomer or hard polymer mold to allow their reproduction.

The second method is identical to conventional mold production where the master molds are produced by direct machining of blocks of polymers or other materials. Any suitable polymer or soft metal, etc., may be used and these are, in general, easily, and therefore rapidly, machined and polished. Many tooling polymers exist which are well suited to the molding of elastomers as well as polymers and regardless of the material the mold is machined from, any mold or die may easily be copied using a more suitable polymer. Currently-used computer-aided design and machining systems may rapidly produce the series of molds required by appropriate modification of the original part design file. Using these systems, with suitable polymers, there is, essentially, only a practical limit on the size of mold which may be produced.

The third method of mold production is by use of computer aided design in conjunction with one or another of various rapid proto-typing technologies, such as 3-D printing, laminated object manufacturing, stereolithography or solid ground curing, among others. This method, in a similar way to CAD\CAM systems, allows a direct connection between part design, mold design, and mold production as these systems can be used to directly produce the master molds or prototype master molds which can be copied using more suitable tooling polymers. Computer aided design through rapid proto-typing technology can, theoretically, translate directly, quickly and relatively inexpensively to virtually any required production rate of any required production run. The CAD file of the solid part may be modified to produce the series of polymer tools required to produce the basic compound tool used in the process. The rapidity of these various proto-typing processes and CAD\CAM systems is such that the basic tooling for the process may be produced in a matter of days and rapidly duplicated, as per production requirements.

While conventional and computer-aided machining systems in current use are often of large size and capable of machining very large components, or molds, the various rapid proto-typing systems are generally of small size. The primary usage of such systems is in producing proto-types of parts intended to be injection-molded, typically in thermoplastics. They are also used to produce short runs of test or sample parts or master patterns from which elastomer molds (typically an RTV silicone rubber) are derived and used to produce the short part runs. Because these systems build the part in layers, this results in a striated texture on the surface of the part. This texture may be removed by sanding and polishing to provide a smooth surface. As there is no apparent theoretical or practical obstacle to the scaling up of these systems, such scaled-up systems may be used to produce large master molds for use in this compound tooling system. By indexing the build platform of these systems to the bed or platen of a computer-aided machining system, or by combining a rapid-proto-typing system with a machining system sharing a common platen, the master mold may be rapidly built, or slightly over-built, using the rapid proto-typing system and subsequently machined to final size and polished by the machining system, with both systems controlled by the same mold design file.

In general, mold size is theoretically limited only by practicality or the size of the pressure vessel or autoclave, if used. Regardless of the method used to produce the molds, larger master molds can be produced sectionally and the sections joined together. Large one-piece skin-molds may be used with sectional backing-mold\plates assembled for each cycle. For large or complex and multi-faceted components, both skin- and backing-mold\plates may be produced sectionally and assembled and disassembled for each molding cycle, in a manner similar to concrete-forming techniques. In such cases, and again, in a similar way to concrete-forming, a secondary mold bracing and support system may be used to maintain mold stability, particularly against injection or evacuating vacuum pressures. Such a secondary system would then also carry secondary mold clamping and assembly system components. Since the system was designed primarily for use with various relatively low pressure molding or casting processes, molding pressures are not high and usually temporary for many applications so that such a secondary system may be required for bracing only during the mold filling operation and hence be part of the static process equipment through which the molds are cycled.

Backing-plate

The primary function of the backing-plate is to provide support to the compound mold and is therefore required to have high rigidity and compressive strength. For many types of low and medium pressure molding processes, backing-plates molded from plain, filled or reinforced polymers will be adequate. Additional reinforcing materials in the form of fibre mat, fabric, wire mesh or solid and oriented elements such as rods, bars or tubes, etc., may be included to enhance the strength of the plate. Solid reinforcing elements within the plate may cross-connect between perimeter clamping attachment points the better to distribute the clamping pressure over the area of the mold. Fillers may be included in the matrix to enhance compressive strength and rigidity. Any backing-plate may be mounted to a secondary plate or bracing system to enhance its strength or to reduce the inherent strength requirements of the backing-plate itself.

In general, backing-plates will be molded using thermosetting resins due to their more suitable qualities, ease of molding with reinforcements etc., and particularly their low shrinkage. Many thermosetting resins cure at ambient temperature with little or no shrinkage regardless of the thickness of the component being molded. Additives may be used with most resins to reduce shrinkage, but any shrinkage factors must be taken into account in plate and mold design. Where various elements are being molded into the backing-plate, frames, composed of the matrix resin, may be used to hold such elements in their required positions in the molds. These frames may be molded using compound molds making up elements of the tooling production system or simple elastomer molds custom-made for a particular custom backing-plate. Thermoplastics may also be used to produce backing-plates but attendant shrinkage factors must be taken into account and reinforcements and inclusions, etc., may not be as easily incorporated into the matrix.

To produce the typical backing-plate therefore, inserts such as system connection points, clamp attachment points, lifting, transfer points, etc., as well as all other items are installed in the mold. The mold, whether solid or compound, is closed and filled with the appropriate resin and set aside to cure or placed in a pressure-vessel or autoclave if necessary. Once cured, the plate is removed and all hardware attached. Opposing elements of the clamping system may be identical or, if not, one plate receives the active elements and the other the passive. The clamping system is designed to be adjustable both to allow for varying backing-mold depth and clamping pressure. The backing-plate is then ready to receive any suitable backing-mold to be attached by through-bolting etc. The mold halves may then be mounted to the processing equipment by means of the appropriate attachment points molded into the plate depending on the molding application.

While the general design intent of this tooling system is that the tooling be composed of polymers due to ease of production, economy, etc., the backing-plates, being standard fixtures to all molds of a class and therefore permanent fixtures, may be made of metals. Such plates may be produced by casting, machining or fabricating or a combination of such methods. Hardware and systems connection points as well as ports, alignment guides, etc., may be machined into the plates. For very large standard or custom backing-plates, fabrication from metals may be most suitable and system connection points may be included in the backing-plate or the backing-mold.

Backing-mold

The primary function of the backing-mold is to support the skin-mold and it is essentially a conforming section between the standard backing-plate and the custom skin-mold, transferring the appropriate properties or qualities of the backing-plate to the mold surface or matching face. For open molding, simple support is required while for closed molding applications, transfer of compressive forces as well as support are required. The backing-mold is therefore molded in a material whose compressive strength meets or exceeds the anticipated compressive forces of the molding process. For many applications, and especially those using elastomer skin-molds, such compressive forces are relatively low and many suitable polymers exist from which the backing-mold may be made. For high pressure injection or compression-type processes, rigid skin-molds are more suitable and compressive strength will be a major consideration. While other materials may be used, and for the same reasons as pertain to the backing-plates, the backing-molds will, in general, be molded of thermosetting resins suitable for the molding application. The backing-mold will also incorporate the various systems and attachment hardware to securely fix the skin-mold to itself so as to provide both general and local support to the skin-mold.

The primary function of the backing-mold is therefore accomplished by its shape and its material composition, the latter being most critical where high pressure is involved. Secondary functions may then be taken into greater consideration in material selection and mold production. The major secondary function of the backing-mold is process support and the backing-mold may incorporate systems that facilitate mold filling, material cure or solidification and part removal. Heating systems in the form of electrical elements or fluid lines are embedded under the surface of the backing-mold and designed to provide even, or focused, heat to the skin-mold and through it to the mold cavity. In any molding operation the heat may be used in the first instance to cause or maintain fluidity in the molding material to facilitate filling and heating elements or lines may be more concentrated along sprue or runner systems than around the cavities. When the mold is full, general heat may be used in thermoset plastics molding to initiate or accelerate cure of the material while for the molding of thermoplastics, cooling fluids are pumped through the system to solidify the material. Single or multiple systems may be incorporated within a single mold to selectively control the heating or cooling processes. Such multi-systems may connect to external systems either individually or via a manifold and valving system to allow their manipulation and may so connect through the backing-plate or directly from the backing-mold.

The mold needed to produce the backing-mold may be composed of a hard polymer or a supported elastomer and include elements to accurately hold any systems or hardware that will be molded-in as inserts. The heating or cooling systems will closely follow the surface geometry of the backing-mold to provide highly conformal systems and the distribution of the system lines or elements will be such as to provide the optimal amount of heating or cooling at any point in the mold. Spacing or concentration of system elements may be increased or decreased depending on part thickness or geometry etc. These conformal systems may consist of either wires for electric heating or bendable metal or polymer tubing for fluids. A tool to form the systems to shape may be produced from the backing-mold design file by modification of the backing-mold\skin-mold interface to provide a solid surface with guides or routes over which the wires or tubing may be formed to shape. This tool may be produced by any of the various rapid proto-typing processes. To hold the system to shape and in the correct position in the mold, frames, to which the systems are attached, may be obtained by taking a succession of cross-sections across the modified design file, and, again using rapid proto-typing, produce simple elastomer molds to replicate the number of frames sufficient for the number of molds being produced. These frames are molded from the same plastics as the matrix resin of the backing-mold, installed in the mold which is modified to hold them securely, and the systems are then attached.

Because of the method of vacuum-bonding of the flexible skin-mold and the necessity for full support over its entire surface, embedded systems must be used with flexible skin-molds but may also be used with rigid skin-molds. Alternatively, when using rigid skin-molds, heating and cooling systems may take the form of channels molded into the surface of the backing-mold and be produced by modification of the interface design file. These channel systems follow the same design parameters as the embedded systems with regard to spacing, etc., as well as allowing for multiple systems within a single mold. For both types of system, a primary requirement is rapid heat transmission to and from the mold surface through the skin-mold. Heat transmission may be improved by adding highly heat-conductive metal powder to the matrix resin containing as high a concentration as possible in the surface layer and around the systems. As these systems occupy a shallow zone at the surface of the backing-mold and heat transfer is necessary only across this zone, the backing-mold may be produced in two stages. The surface zone, carrying the systems along with suitable heat-transmitting fillers in the polymer matrix, may first be molded using an intermediate die, with the remaining body of the backing-mold, including suitable heat-insulating additives in the matrix, being subsequently molded onto or against this layer. The backing-mold may be composed of multiple layers by extending this method further as required. By using a second intermediate die the insulating layer can be molded to the minimum necessary thickness and the remaining body of the backing-mold molded against it.

The difference in skin-mold type and method of attachment will govern the part removal or ejection system, if any, that may be used. For the flexible skin-mold, reversal of the vacuum will inflate the skin-mold away from the backing-mold and may suffice for part de-molding. An ejection system, similar in form to the conventional pin-type, may be molded into the backing-mold. This system may consist of miniature pneumatically operated rams located at appropriate points over the surface of backing-mold and connected internally to a manifold which is, in turn, connected to the external source. These rams act on the rear of the skin-mold and through it on the part. The ejection rams and other components are molded-in as inserts in the backing-mold and held in position by a means similar to, or combined with, the framework used to hold the various other systems. For the rigid skin-molds which are mechanically attached to the backing-mold, no ejector system may be included. An ejector pin system, the pins acting through holes in the skin-mold may be feasible if an adequate seal can be achieved at each penetration. Such pins may be screwed onto the rams through the skin-mold and have countersunk heads with elastomer seals. Alternatively, each entire skin-mold may be fixed to a ram system which ejects both skin-molds and the part a short distance out from the molds to allow external de-molding assistance.

Skin-molds

The primary function of the skin-mold, whether rigid or flexible, is to define the shape of the mold surface, including the cavities, runner and vent systems as well as injection and vacuum or vent ports. The skin-mold, therefore, defines the shape and surface finish of the part(s) and facilitates the mold filling operation. While the skin-mold may be extended back through both the backing-mold and plate to allow filling through the body of the compound mold, the design intent is that filling be accomplished through, or at, the parting line between skin-molds. Mold injection and vent\vacuum ports will be located at suitable points on the perimeter of the mold. A sprue, or main channel runs from the injection port to the cavity or to a runner network which connects to each cavity while, for many molding processes, a second channel system will connect from each cavity to a vent system which connects to a main vent running to the vent port. Some molding processes use vacuum to evacuate the mold or assist in mold filling and the vent system, in this case, connects to a vacuum source via the vent port.

The skin-mold also comprises the mold mating surfaces and alignment guides in the form of a key\keyway or pin-and-socket type system, for example, may be molded into the skin-mold surface. A similar system may be molded into the rear face of the skin-mold to ensure accurate alignment between the skin-mold and backing-mold. While the flexible skin-mold requires no attachment hardware, the rigid skin-mold may require threaded inserts molded-in to secure it to the backing-mold. Alternatively, holes may be molded in the skin-mold through which it is fixed to backing mold or to an ejection system molded into the backing-mold. Whether flexible or rigid, the skin-mold may have materials added to its matrix to enhance certain properties such as heat transfer. Metal powders may be added to both types for this purpose in a similar way to the backing-mold. Because such additives may interfere with, or mar, the surface finish of a mold, a thin layer of virgin material may initially be required to be applied to the mold, in the form of a gel-coat, allowed to harden and the mold subsequently filled with the same skin-mold material plus additives. The skin-mold is produced in a two-part mold composed of solid polymer, which is more suited to flexible skin-mold production, or a compound mold of elastomer with backing-mold\plate, which is more suited to rigid skin-mold production, though either type of mold may be used to produce either type of skin-mold. Since both skin-molds are consumable, the type of master mold selected will depend on the projected production run as well as practicality.

Rigid Skin-mold

Thermoplastics may have some application but, being generally unsuitable, the skin-mold is composed of a thermosetting polymer, or blend, suited to the molding application in terms of the heat and pressure being used in the process. Shrinkage factors, if any, must be allowed for in the mold design as well as the impact of any additives to those shrinkage factors, just as for the backing-mold and plates. The master mold is used to produce the required initial number of skin-molds, after which a supply of replacement molds may be produced immediately or on an as-required basis. In many molding applications, the rigid skin-mold will have a life-cycle much longer than a comparative flexible skin-mold and mold replacement is carried out manually.

The definition of a rigid skin-mold is somewhat loose as it pertains to whether the mold may or may not be vacuum-bonded as are the flexible skin-molds. Many rigid skin-molds will have a certain degree of flexibility which may be utilized to assist de-molding. Generally, the rigid skin-mold will have a high compressive strength and be suited to higher pressure molding processes. Since such processes usually involve high temperatures also, these skin-molds may be required to be molded of high heat resistant polymers which are also often high cure-temperature polymers. Heating systems, as described for the backing-mold may be required and in such a case, then a compound mold, using a skin- and backing-mold may be required for its production. Since few rigid skin-molds are generally required (compared to the flexible) and elastomer molds are easily produced from polymer masters, the rigid skin-molds may be produced in a low-pressure, high temperature molding process using a single elastomer-skinned compound mold.

Flexible Skin-mold

The flexible skin-mold may be composed of either an elastomer or a flexible polymer, ie. a polymer with a softening agent added as a co-polymer. In either case, the skin-mold must be locally soft enough to allow a vacuum seal to ensure bonding to the backing mold. Beyond this limit, the skin-mold may be considered rigid. The flexibility is measured by the hardness of the material of which the skin-mold is composed and the choice of material will depend on a number of factors, primarily part geometry and size. Again, while thermoplastic elastomers or polymers may be used, thermosetting materials may often be more suitable for practical reasons. Certain elastomers cure with virtually zero shrinkage, such as addition cure silicones, and can withstand very high molding temperatures. Elastomers and flexible polymers, particularly ambient curing types, are easily molded using solid polymer molds, which themselves are easily duplicated using elastomer molds derived from them. In this way, because many flexible skin-molds will have a limited life-span, multiple mold-generating master molds may be used to ensure a continuous and adequate supply of skin-molds.

The flexible skin-mold is best produced using a two-, or multi-part, solid polymer master mold into which the activated elastomer or polymer is injected and allowed to cure. When cured, the mold is opened, the skin-mold removed and seated on the backing-mold. Vacuum is initiated and the skin-mold bonded to the backing-mold. Skin-mold replacement may be automatically carried out by virtue of the vacuum-bonding system. The skin-mold\backing-mold interface is a simplified reflection of the mold mating surface with positive draft maintained everywhere and surface detail, texture, etc., eliminated. This will tend to ensure that when the mold is opened, the mold half defining the interface surface will release first from the skin-mold which remains attached to the actual mold-surface-defining mold half. The backing-mold may then be brought to mate with this surface, the vacuum initiated and the skin-mold bonded to the backing-mold and detached from the master mold half. In a production environment, when multiple skin-mold replacement is required, the compound molds are diverted from production and cycled through such a process. The compound molds then return to the production system and the skin-mold production molds return to the production support system. The skin-molds may all be replaced at one time if equal numbers of support molds are utilized or replacement may be staggered if not.

Mold Design

The skin-molds define the mold cavities and mating surfaces just like any conventional mold and also include the filling and vent ports. Because the system is designed to allow the use of multiple molds cycling through the filling process, and therefore disconnect from that process for the cure or solidification phase, the ports must be designed or located to prevent backflow of material. The orientation of the mold for the fill process will influence port location and internal or external valves may also be used. While the rigid skin-molds may mold undercuts in flexible materials, the converse is true of the flexible skin-molds and such ability is enhanced by virtue of the separation of the skin-mold from the backing-mold during de-molding operations. The rigid skin-molds require precise mating surfaces to ensure complete mold closure whereas the flexible molds are sealed by compression of the elastomer and hence far less precision is required.

Backing-plate

The backing-plate is designed to be a standard component applicable to a wide variety of molding processes. Its chief functions are support and as the interface between the mold and the process equipment. The backing-plate may be designed according to a standard or as a custom plate for a particular mold. For typical molding operations, the plate may be rectilinear while for other applications its geometry may reflect the geometry of the parts being molded. Circular, or ring-shaped, plates may be used to produce open circular objects while semi-cylindrical plates with circular end-plates may be used to produce pipes or closed cylinders, etc. The plates may be designed to carry the mold closure and clamping system and\or connections to an external system which is part of the process equipment. The backing-plate carries the connections to any external systems and, in order to grant the plate the maximum application, connection points are included for all types of systems. Connection points may be located at plate edges or centrally in the rear of the plate. The actual molding process will determine which of the systems are to be used and appropriate connections are included in the backing-mold.

Backing-mold

Backing-mold design will depend to a great extent on the material being molded as well as the molding process used and the type of skin-mold. Molding materials are generally referred to as resins, either thermosetting or thermoplastic, and are in a fluid state during the mold filling operation. For injection and transfer type molding processes, the resins may be either already in a fluid state, as liquid resins, or fluidized by heat externally to the mold prior to filling, while for compression and some other types, the solid or semi-solid material is fluidized in the mold. The general and specific resin type will determine the heating and cooling requirements of the mold. For the heat-fluidized materials, whether thermoplastics or thermosets, heat may be necessary to maintain fluidity of the material through the mold filling operation. Cooling as well as heating is required for all thermoplastic molding while for many thermosetting plastics heat only is required as a catalyst or accelerator. Many thermosetting plastics cure at ambient temperatures involving an exothermic reaction and no additional heat is required. Cooling is necessary for thermoplastic solidification and may be used to cool heat-catalyzed thermosetting plastics or to draw off heat from exothermic reactions to control the reaction rate.

The appropriate systems will be included in the backing mold according to the geometry of the part and the material molded. Such systems may be singular for small molds but may be divided into a number of sub-systems for larger molds to allow greater efficiency. Such multiple systems may connect to a manifold source molded into the backing-mold or the plate. Systems may also be designed to selectively heat or cool different zones of a mold and these systems may be controlled by a valving system on the manifold. By these means, cooling rates and directions may be controlled. Specialized systems such as the latter may be molded into the backing mold or be separate pieces of equipment which connect to multiple connection points molded into the backing-mold. Since the use of multiple molds eliminates the cure cycle time from the overall mold cycle time, these systems may be designed to manipulate the cure or solidification process to achieve optimum part and molding quality without regard to time pressures. By allowing for differential and directed heating and cooling as well as variability in the rates of same, the system design may be optimized in parallel with optimum part design, thereby reducing the potential for the often necessary part design compromise common in conventional molding. Reduced cycle-time pressure also allows higher than minimum molding temperatures to be used for a particular material. Higher temperatures translate into lower material viscosity and hence lower injection or transfer pressures are required to achieve mold filling while hot molds also prevent premature solidification of thermoplastics. Insulation layers in the backing-mold reduce heat requirements and increase efficiency whether heating or cooling.

The type of skin-mold will determine the physical nature of these systems as the flexible skin-mold requires an embedded system while the rigid skin-mold may utilize surface channeling or a similar embedded system. While the skin-molds closely follow or reflect the backing-mold surface, skin-mold thickness may vary to ensure positive draft for easy seating and unseating of the skins. The mold systems must be modified to account for any such variations. The backing-mold will also include the de-molding system, if any, and the active elements are molded into the backing-mold and connected to an energy source depending on their type. Such systems may be activated by electrical, hydraulic or pneumatic means and connect to the external source via the backing-plate or directly via the backing-mold. In the case of the rigid skin-mold, no system may be included, a system that partially ejects the entire skin-mold to allow external assistance may be used or a system similar to conventional ejector pins, acting through the skin-mold may be used. For the flexible skin-mold which is held in place by vacuum, the part may be removed by hand, with external assistance, or skin-inflation with or without an ejector system may be used.

Rigid Skin-mold

Compound molds using rigid skin-molds are similar in many ways to conventional molds and are subject to many of the same geometrical design constraints. Draft is necessary to allow mold separation and part removal. However, the ability to tailor the heating and cooling systems and thus achieve better control over cure or solidification, and hence shrinkage, means that much greater latitude is allowed in some aspects of part design. By controlling heating and especially cooling in a more selective way, residual stresses due to differential shrinkage may be avoided. Part wall thickness variations and other geometrical features which may cause cracking, sinking or warping may be tolerated to a greater extent by more tailored cooling. Design will, however, still depend to a great extent on the material molded, the molding temperature and the shrinkage to be expected. Since the skin-mold is composed of a polymer, the difference in co-efficients of thermal expansion between it (even when using additives) and the polymer material molded will be much less than that for a typical metal mold. The rigid skin-mold may be used in a variety of processes such as injection and transfer molding and in compression molding up to the limits of the compound mold's compressive strength. To allow mold transfer and prevent leakage during cycling, non-return check valves may be installed and remain attached at the mold ports, or the mold may be processed standing on one edge with the ports located at the top edge such that when pressures are relieved after filling, no backflow prevention is required.

Flexible Skin-mold

One major difference between the flexible skin-mold and any hard mold type is that the mold closing pressure causes some compression of the material and some distortion occurs. The clamping or press system is designed to apply even pressure to the mold mating surfaces to seal the mold under minimum compression. Any compression may cause some dimension loss across the mold parting line and such loss must be accommodated during mold design. Where the mold is produced from a master pattern, the pattern may be made with extra thickness but some lateral distortion may result from over-compression of the mold keys. Alternatively, a design-thickness pattern may be used and allowance be made by modification of the polymer master mold derived from it. Material is eroded from the mating surfaces of the master. This has the effect of adding material to the production mold mating surfaces sufficient to take up the compression. Material is removed such that there is maximum erosion is at the parting line and a minimum at the keys. The result is that the mold cavity is tightly sealed at the parting line, while the key\keyways mate perfectly with no distortion and hence the cavities are held at design tolerance across the parting line. Where the master mold is produced by conventional or computer-aided machining or by a rapid proto-typing method, this modification may be designed into the mold.

Mold design constraints for the flexible skin-molds are generally not as rigid as for most hard mold designs. Because of the inherent flexibility of the molds, greater flexibility is allowed in mold design, particularly with regard to undercuts and parting line location. The system can accommodate undercuts within limits and can easily mold shallow and moderately thick parts with no draft angle and with an off-set parting line. Small, detailed parts of varying geometries can be molded, as demonstrated by the proto-type molds, and which serve as a very small-scale example of the capabilities of the system. The larger the part the easier it is to mold regardless of the geometry and the tooling system is theoretically well suited to the molding of both small and large parts of widely varying geometries and complexity. Unlike conventional molding methods, de-molding forces are non-uniform and may be directionally selective, allowing mold cavities to be optimally oriented in the mold. Because of the draft maintained between the skin-mold and backing-mold, the skin-mold separates easily and this draft then provides room which facilitates lateral movement of the flexible material. When the bonding-vacuum is released the skin-mold may easily flex over undercuts up to a certain limit.

To ease de-molding, however, draft is advisable as for any typical conventional molding operation and internal draft is necessary for deep hollow parts. Very deep-draw solid and hollow parts with steep draft angles may be molded but demolding is more difficult the smaller the part. Mold design is constrained by the necessity for backing-mold support over the parts cavities and individual elements of the cavities. Deep narrow holes or highly re-entrant parts may thus not be feasible below a certain size or of a certain geometry depending on the self-supporting qualities of the elastomer used. Release agent application is also a consideration in mold geometry design. The proto-type system was developed for use with thermosetting polyurethane plastics and using silicone elastomers as the mold material. While silicones exhibit natural release properties, the curing reaction of the thermosets will gradually reduce these properties and erosion of the mold occurs, usually resulting in failure of the mold during de-molding. The use of release agents will extend mold life but the more complex the mold, the more difficult application becomes. Mold design will influence mold life in that mold life is related to the mold surface area in contact with the curing resin and hence intricate molds will have a shorter life-span.

While most hard-mold molding operations involve the use of two-part matching molds, for highly complex parts with undercuts or projections, multi-part molds are often used. While the flexible skin-molds described herein have a very high tolerance for undercuts, there are limits which can be overcome only by the same method. For part complexity beyond the limit of a two-part compound mold, multiple-part molds must be used and must be designed with a secondary assembly system to allow the manufacture of such parts. The assembly system is carried by the backing-plates and the skin-molds, because of their flexibility and strippability, may or may not reflect the sectionality of the backing-mold\plate assembly. This system may also be used for large deep draw or sharply re-entrant parts where a draft angle is undesirable. Backing-plate and mold parts may be made to hinge relative to one another and thus produce the draft necessary for demolding. Parts with an external draft angle of zero or with undercuts may be produced by this method. Parts with an internal draft angle of zero or with internal undercuts are also possible but full separation of the backing-mold and manual stripping of the skin-mold may be required.

In liquid resin molding, the low viscosity material is usually injected, or transferred, into the mold under low pressure, drawn in by vacuum or introduced by a combination of both, acting simultaneously or in sequence. Using adequate heat externally and internally to the mold, the viscosity of many fluidized thermosets or melted thermoplastics may be reduced sufficiently and so maintained to allow their being processed similarly. Being flexible, elastomers have a high tolerance for shrinkage or differences in coefficients of heat expansion but, because they usually have a lower co-efficient of heat transfer compared to other polymers, heating and cooling cycles may take comparably longer. The higher cycle time may necessitate the use of a greater number of molds to off-set the increase. Regardless of the molding material, injection and vacuum port location and design will depend on the method and equipment used and the injection and vacuum or vent nozzles may remain attached to the mold during the cure cycle, sealing the mold against back-flow. The elastomer skin-mold may be used in conventional liquid resin processes as well as new processes, the design of the injection and vacuum\vent ports modified as necessary.

The molds are designed to be processed through the system and connect and disconnect to the filling equipment with cure and de-mold cycles occurring remotely. The mold injection and vacuum ports may both be located on the top edge of the mold, centered on the parting line, and designed to temporarily seal to the injection and vacuum nozzles. Alternatively, since the mold is made of elastomer, these ports may be located elsewhere and designed to open to admit both nozzles and seal on retraction. Such ports, regardless of location, may also be designed as one-way valves to seal against vacuum or pressure or to maintain same after nozzle retraction. For casting purposes, open or self-sealing ports may be used depending on the type of casting process being used. Each variation on the mold filling process may require modification of the injection and vacuum ports along with an attendant change to the process equipment.

In general, the material injection port may connect via a sprue and runners to one or more cavities via one or more gates just as in most mold designs, the sprue and runners being removed from the finished molding as is usual. Alternatively, because the molds are flexible, what is here termed a 'live gate' may be used in certain applications. In this modification, the runners are not connected to the cavity but stop slightly short, leaving a thin single, or double, flap of elastomer, the live gate, between the end of each runner element and the parts cavities. During injection, the vacuum\pressure causes the elastomer flap(s) to deform, and the gate opens to admit the molding resin into the cavity. When the mold is full and the vacuum\pressure released and stabilized the gate closes, disconnecting each cavity from the runner elements. The part(s) may thus be molded separated from the runner system with no gate scars and ready for use or post processing.

The use and design of live gates will depend on the hardness of the elastomer used as well as the viscosity of the resin being molded. Elastomer degradation is also a consideration when molding thermosets as the geometry of the gates may be such as to cause erosion failure at the gates of an otherwise useful mold. If used in a highly complex mold with a low life expectancy, or if high quality, scar-free, ready to use parts are required, this may not be a consideration. The molding of thermoplastics will depend on their viscosity and the ability of the live gate to pinch-off the thermoplastic feed. Thermoplastics, however, due to their unreactive nature, will have little or no corrosive effect on the elastomer. For large parts, the live-gate offers the advantages of obviating the need for the difficult cutting of the comparably large gates as well as the reduced possibility of premature failure at said large gates. For smaller parts and multi-cavity molds, the live gate system is more suitable for use with automatic or assisted de-molding, in conjunction with vacuum holding and transfer tooling (to be described in a later section). With flexible skin-molds, an ejector pin system, as such, is not used but, as mentioned previously, a system similar in concept may be used to effect assisted or fully automated de-molding.

General Variations:

Partial Skin-molds

Both types of skin-mold may be designed to comprise the entire mold surface, as has been described, where the skin-mold defines the cavities, runner systems as well as the mold matching faces and takes the form of a contiguous layer covering the mold surface. Skin-molds may also be designed to form only those mold surfaces in contact with the molding material, along with an additional surrounding margin to ensure a seal, and thus take the form of inserts installed into the backing-mold, while the backing-mold itself forms the mating surface with alignment guides, etc. Using this method, the amount of skin-mold material consumed in the process is minimized. For small molds with one or more cavities and little space between or around them, this method may not be economical or practical, but for large molds with one or more large or irregularly-shaped cavities, the area of excess skin-mold may be of economic significance. To ensure a proper seal, the skin-molds may be made with a slight extra thickness at the margins so that when the mating surfaces of the backing-molds meet, the margins are put under extra compression. A continuous key\key-way may be included in the margins to provide an extra seal or flash-dam.

Generic Skin-molds

In the case of the flexible skin-molds, a generic approach is allowed which is similar to a process known as "elastomeric molding" where thin elastomeric membranes are placed over the mold halves with reinforcing material between them. The membranes sandwich the reinforcing material which is then formed to shape when the mold closes. Resin is then injected between the membranes to produce reinforced plastics. In its application to the compound tooling system, the skin-mold may consist of a plain elastomeric membrane placed over the backing-mold's surface, clamped around the perimeter, and stretch-formed to shape by the bonding vacuum. The grooves or perforations may require modification to a size small enough to ensure that the thin membrane does not deform into them and conversely, the membrane must not be so thin as to deform into the smallest practical groove or perforation. When the molding cycle is complete and the mold opened, release of the bonding vacuum in both mold halves will cause the membranes to spring back and automatically eject the part. Since the concept is based on the use of stock membrane, no surface detail or texture, other than that provided by the backing mold through the membrane is possible, though textured membrane stock may be produced if required.

Flexible Compound Backing-molds

While the flexible skin-mold mounted to a rigid backing-mold can easily mold parts with zero or negative draft up to a certain limit, positive draft is, in general, required and is a necessity for very deep-draw parts. This flexible compound mold variation is designed to overcome these limitations, to a certain extent, by giving the backing-mold the ability to create draft after the part has been molded. This is accomplished by constructing a compound backing-mold consisting of a rigid body with a soft collapsible layer between it and a standard flexible skin-mold. This layer consists of an open-celled elastomeric foam bonded to the rigid backing-mold body and with a bonded or integral contiguous elastomeric surface skin. This surface skin is grooved as for the standard backing-mold to allow vacuum-bonding of the skin-mold in the usual manner.

The foam layer is connected via multiple tubes or ports to a manifold in the rigid portion of the backing-mold which is in turn connected to a vacuum and air source. Initiating a vacuum causes the foam to collapse and, along with the vacuum-attached skin-mold, pull away from the molded part, creating the draft necessary for separation and part de-molding. The tubes or ports are arranged and appropriately spaced throughout the body of the backing-mold. The foam layer may be of even or variable thickness depending on the geometry of the part. For mold stability, the rigidity of the elastomeric foam may be maximized based on the size and geometry of the part and the amount of collapse required. Stability may be enhanced by pressurizing the foam during mold filling to counter the weight of the material and, in situations where the material is subject to post-pressurization, the foam may also be counter-pressured to resist deformation and maintain mold geometry. The compound backing-mold may be used in the standard two-part mold as well as in multi-part molds and take the form of a collapsible core in the production of open hollow objects. Sharply-defined internal and external undercuts up to the limit of collapse may easily be molded as well as open or semi-closed parts with parallel interior and exterior walls.

Where the mold is very large, and flat extensive surfaces are required, the foam layer, on its own, may not be rigid enough to maintain such flatness during the molding process. The standard foam-layered backing-mold is modified with a second, thin, rigid layer over the foam layer, and immediately under the skin-mold. This rigid layer occupies most of each mold surface but stops short of the edge on each face. The edges, and thus the corners, are defined by foam sections, the surfaces of which are even with the surfaces of the rigid layers to form the complete backing-mold surface, to which the skin-mold is bonded in the usual way. During de-molding, the collapsing foam layer draws the rigid layers back from the surfaces of the molding and simultaneously pulls the corner sections away, collapsing them into the area between the ends of the rigid section. The skin-mold is pulled into the corners with the foam corner sections, and the effect is, essentially, to shrink the mold in on itself, providing the clearance for removal. Alternatively, the rigid layer may be mounted onto a set of pneumatically, or otherwise, operated rams, similar to the ejector pins described earlier, and regularly spaced over each mold face. This method may provide greater stability and precision, while the corners would be occupied by the same foam sections. During de-molding the rams may be arranged to act sequentially to cause a peeling action, rather than a direct draw, so as to facilitate release of very large moldings.

Molding and Casting Operations

Since all plastics materials fall into one of two broad categories, either thermosetting or thermoplastic, plastics molding methods may be described in terms of their application to either type of material. The major difference between the materials is in their reaction to heat, with the thermoplastics becoming fluid when heated and solid when cooled, while the thermosets become solid by chemical reaction and, once set, cannot be re-softened by heat. Both materials must be in a fluid state for molding and therefore all thermoplastic materials must be heated to melting, or close to it, while thermosetting materials may be provided already in a liquid state or be fluidized by heat-induced lowering of their viscosity. Many molding processes are used with both types of plastics with modifications to suit the material type while other processes are suited only to one type or the other. The compound tooling-system may be divided into two categories also, based on skin-mold type, and there will be considerable overlap in application. The method of use of the system, therefore, may be described in terms of how either type of skin-mold may be applied, in various conventional and new processes, to the molding of either type of plastics material.

Each skin-mold is initially mounted to its backing-mold in the appropriate way. The rigid skin-mold is mechanically secured directly to the backing-mold or to an ejector system by means of screws through the backing-mold or through the skin-mold. Where an ejector-pin system acts through holes in the skin-mold, the skin-mold is attached to the backing-mold through the mold mating surface and\or from the rear through the backing-mold. To affix the flexible skin-mold, a vacuum source is first connected to the mold perimeter key-way vacuum port. The grooves or apertures are evacuated thereby sealing the skin-mold\backing-mold interface at the perimeter. A vacuum source is connected to the surface vacuum port and the surface grooves or perforations evacuated, bonding the skin-mold to the backing-mold. The vacuum sources are disconnected, (the connection automatically sealing) leaving the skin secure, and the mold halves are clamped together. Each mold is now like any conventional mold, is ready for filling, and is integrated and connected to the various systems as required for the molding process used.

The design of the skin-mold and particularly, the backing-mold with its included systems, is appropriate to both the molding process and the molding material. While the compound mold may be used singly in place of a standard mold in currently-used processes and may be designed for use with existing, unmodified equipment, the tooling was designed to be used in multiples, the number of molds depending on the solidification or curing-time of the plastics resin. Various process arrangements with regard to mold cycling may be used, depending on mold size, filling, curing and de-molding methods and equipment. The molds may be transferred through various process stations, connecting and disconnecting to different systems as necessary, or elements of the processing equipment may transfer between stationary molds. The process may be manually, partially- or fully-automatically operated. Molding processes are usually defined by the method used to fill the mold and the tooling system may be used in a variety of processes, many of which may also be used to produce reinforced plastics, or composite, components.

Molding Operations

The major difference between molding and casting is that, in molding, force of some kind is used in the mold filling part of the operation. A typical molding cycle, called the time cycle, is composed of four basic steps, fill time, dwell time, freeze time and dead time. The fill time is time taken to fill the mold and blends into the dwell time which is the length of time the filling force or pressure must be maintained on the material in the mold. In most molding processes, the bulk of the equipment is devoted to this part of the cycle. The freeze time is the solidification or cure-time and the dead time is the time required to open the mold, remove the part and close the mold. Secondary or accessory equipment is used for these latter parts of the cycle, with the mold filling equipment remaining essentially idle. In some processes, the full time cycle is very short and the equipment is essentially running continuously, while for others, particularly those using materials with a long freeze time or when molding large parts, some of the equipment, either for filling or accessory, may be idle for a considerable part of the overall molding time cycle.

The various molding processes themselves are generally distinguished and defined by the method used to fill the mold with the fluid material. The molding material may be provided in a natural fluid form, fluidized immediately prior to filling or fluidized during the filling operation. In general, the term fluid may refer to a plastics material that is in a state anywhere from a low viscosity liquid to a soft formable solid and in some cases, the process may be more accurately described as forming in a mold rather than strictly molding. Since the compound tooling system is simply an alternative type of mold, it may be utilized in most, if not all, conventional molding processes currently in use. The compound mold may be designed to be either a direct substitute for a conventional mold and used singly with or without modifications to the process equipment or it may be used in multiples with appropriate redesign of the molding process and the process equipment. The tooling system also allows variations on existing processes to be designed as well as some new processes made possible by the nature of the tooling system itself.

Since molding processes are defined by the method of filling the mold and these methods involve the filling equipment up to the end of the dwell time, the design and application of the compound tooling system may first be described in terms of mold filling and its method of use in conjunction with various types of filling equipment in the different molding processes. Dwell time, however, as understood to involve the filling equipment, does not pertain to all processes and, once the mold is full, the pressure supplied by the filling apparatus may not be required or may be applied by other means. Some processes may require that the pressure be maintained for part or all of the freeze time and such pressure may or may not equal or exceed the original fill pressure. Actual dwell time, therefore, may vary from zero to an amount equal to the dwell plus the freeze time. The freeze time is the cure time in the case of thermosets and the cooling and solidification time in the case of thermoplastics. The dead time of a cycle will vary depending on the de-molding method used. Since the system was designed to utilize multiple molds cycling through filling, solidification and de-molding phases, the system may be described in terms of molding, solidification and de-molding processes. The design of any compound mold, therefore, depends primarily on the material being molded and the molding process used.

Molding Processes

The actual molding process is narrowly defined here as that portion of the total molding cycle which takes or makes a fluid material and, utilizing some type of force or pressure, high or low, fills the mold with the material. The molding process begins with the material in its normal ambient-temperature state and ends at the point where the force or pressure applied by the mold-filling equipment is removed. This point may be reached before, during, or after the dwell time and is the point at which the mold may be disconnected from the filling equipment. The molding process is then complete and the mold transferred to the solidification process. The mold-filling equipment, therefore, consists of all the equipment necessary to prepare the material and cause it to fill the mold. The molding process may also include the mold itself, where the mold is active, or includes systems designed to facilitate the filling operation.

Compression Molding

Because of the high pressures involved in compression molding, compound molds using rigid-skins are considered most suitable but flexible skinned-molds may be used where pressures are low, where some 'give' in the mold surface is desired or where pressures are relieved prior to the solidification process. The compound mold is used in the conventional way where the charge is loaded into the mold cavity and the mold is closed to form the material to shape. The material is heated by the mold to fluidize it and both thermoplastics and thermosets may be used. Either type of material may be pre-heated to the maximum allowable temperature prior to its placement in the mold, the mold then providing the extra heat necessary to cause the material to flow in the mold under the pressure supplied by the closing mold. A conformal heating and cooling system is included in the mold, as previously described, giving precise temperature control and, with an insulating layer behind it, a minimum amount of heat is used in the process.

For relatively simple shapes, an unformed, or roughly formed, slug of the material may be placed by hand or extruded into the mold cavity and subsequently molded. However, for more complex shapes, a preforming compression mold may be used to form the charge to a shape more conducive to better material flow and distribution in the mold. Such a preforming mold may be used to aid preheating and produces an accurately-shaped charge designed to evenly fill the mold. The pre-forming mold may be a rigid or flexible-skinned compound mold and, where very large parts are required, the generally low cost of the compound molds may allow the production of a sequence of preforming molds where the charge is taken from unformed slug to finished product in a series of steps, the preform being automatically transferred between molds by vacuum tools, (described in a later section) which hold the molded preform to shape during transfer. Materials for compression molding usually take the form of powdered or putty-like compounds as well as filled and reinforced sheet-type materials. Sheet materials may be molded directly or preformed and trimmed and multiple layers of such sheets or preforms may be molded together. When the mold is full, and where multiple molds are used, it may be clamped and transferred for the cure or solidification cycle. The mold may remain connected to the heating, cooling, or other systems throughout the process to allow temperature to be adjusted rapidly as required.

Injection Molding

Injection molding is used with both thermoplastics and thermosets and in this process, the material is fluidized outside the mold, injected under pressure and subsequently solidified. Solid raw materials are used which are liquified by heat in the injection equipment. High pressures are used and both equipment and molds are generally expensive. Currently-used systems are highly automated with low cycle times and hence high production rates. Molds are usually made of tool steel or suitable alloys and, for economic reasons, the high cost of molds and equipment usually necessitate large production runs. Proto-type molds are sometimes produced from soft metals or suitable polymers or composites. These molds have a short life-span but do demonstrate that the use of hard polymer molds is feasible in the injection molding process and hence the compound tooling system may be adapted for use in such processes. The major requirement of the system is that the compound mold be capable of withstanding the typically high pressures associated with the process. The injection molding process itself may also be modified in various ways to suit or facilitate the use of the compound mold.

Thermoplastics

The typical thermoplastic injection molding cycle consists of melting the material in the injection cylinder, followed rapidly by high-pressure injection, cooling to solid and part ejection. The temperature of the charge of molding material is therefore raised to the minimum necessary to achieve the minimum fluidity necessary to effect injection by the high pressure applied. Each phase of the cycle time, including cooling, is therefore minimized to allow the most efficient use of the mold and equipment. Because of the high injection pressures used, comparably high mold clamping pressures must also be used. Each injection molding machine has a maximum charge size which it can inject and hence, for any particular machine, there are clamp capacity and mold size limitations and the injection molding process is, in general, limited to relatively small parts, the maximum charge, or shot, size of the largest injection machines being approx. 10 Kg., while the average is a fraction of this amount. Injection pressure requirements, and hence the clamping pressure, may be reduced by reducing the viscosity of the fluid by pre-heating it to its maximum allowable temperature. Lower injection pressures may also be used if speed of injection can be given a lower priority. By maintaining the mold runners and cavity at a temperature sufficient to maintain the melt in a lower viscosity state, the speed of injection may be reduced without fear of material freeze-up. By extension, and by modifying the injection equipment to inject successive charges into the same mold, larger molds may be used.

While a suitably-designed compound mold of the type comprising this invention may be used as a direct replacement for a conventional or prototype mold, the use of multiple compound molds with conformal heating and cooling systems makes it possible to separate the phases of the molding cycle and to modify any particular phase with regard to the cycle as a whole. Since the process is built around the high-cost injection equipment, the most efficient process is one where this equipment is in continuous operation. The mold-filling phase of the cycle is therefore the most important and, by cycling multiple molds through filling to remote cooling and de-molding, the filling phase defines the cycle time and production rate. Divorcing cooling and de-molding from the injection equipment reduces the time pressure on filling and thus the longer fill times associated with lower injection pressures or multiple shot injection are off-set or neutralized. In general, the potential application of the compound tooling system to injection molding is in the low or high-volume production of larger components not feasible by current methods and\or the economical production of smaller components on a short-run basis. Given that mold tool steel is considerably more durable than any tooling polymer or elastomer, surface detail and finish using compound molds may be of poorer quality or degrade quickly due to mold wear, a factor which relates to friction during mold filling and hence injection pressure.

For any injection molding process using the compound mold, the material is first heated to a suitable temperature to generate a fluid of a certain viscosity. The melt is then injected into the mold. Unlike most injection molds, where the injection point is centrally located to ensure equidistant material flow to all parts of the mold, the nature of the compound mold design, as described previously, is more suited to injection at the parting line. The heated mold maintains the material's fluidity and the runners and gates are designed to facilitate even flow to all parts of the mold while the application of the injection force is designed accordingly to prevent blow-out or back-pressure. When full, the injection nozzle is withdrawn and the mold transferred for the cooling phase. To eliminate the dwell time and prevent back-flow from the mold, a check-valve may remain attached at the injection port. Alternatively, a separate cooling zone may rapidly freeze the material in the sprue adjacent to the injection port, thus sealing the mold. If a flexible or elastomeric skin-mold is used, a self-sealing valve may be designed which the injection nozzle forces open and which seals against back pressure on nozzle removal.

Most molds require venting and a vent port is often included which is also used in certain processes for vacuum evacuation or fill assistance. In an injection molding application, the vent port may be used for venting as the mold fills or to evacuate the mold prior to filling. Injection force is applied until the mold is full and released until nozzle retraction. The pressure balances across the injection and vent ports, with attached check-valves if necessary to prevent leakage in the case of over-pressured molds. Pressure may also be balanced at atmospheric and injection or vent ports located on the top edge of the mold will require no check-valves. In certain molding processes, high pressure is post-applied through the ports to the material in the mold to eliminate voids and this technique may be applied to injection molding where the compound mold allows a high degree of control on heating and cooling. After injection, the material may be maintained as a fluid by the heat until pressure sources are connected to the ports and the material is sufficiently pressurized in the mold, whereupon cooling is initiated. The pressure, in conjunction with the highly-controllable cooling system allows shrinkage to be controlled and compensated for. The heating\cooling system may be designed as a multiple system to selectively cool the mold. By cooling the mold from bottom to top, the material will solidify against the mold walls and shrink downward and as the system is designed in accordance with part wall thickness, the cooling front may be made to advance evenly upward. The pressure acting through the vent forces the material that is still-fluid down to make up the shrinkage loss. The vent may connect through an over-fill reservoir to the mold cavity, this make-up system being cooled lastly by its own sub-system.

Thermosets

Similar techniques are used in the injection molding of thermosets, the major difference being in the method of solidification of the material in the mold. The process begins with solid raw material which is fluidized by heat and injected into the mold under pressure. The material is then heated further to effect cure. The heat must be controlled to ensure that the temperature of the material remains below the cure threshold prior to, and during, injection whereupon it is elevated to effect cure. Any molding material used will therefore have a minimum heat-induced viscosity which must be taken into account in mold and process design and will influence various aspects of the injection cycle in a similar way to thermoplastics. Cure cycle times for thermosets may vary from seconds to hours and the use of multiple compound molds are particularly suited to this application in that any number of relatively inexpensive molds may be used based on the cure time to ensure continuous operation of the molding equipment. When the mold is full it is transferred from the fill station to the curing station. The system may be designed in such a way that the mold may remain attached to any heat or pressure\vent\vacuum sources during filling or disconnect from such systems at the fill station and re-connect at the cure station. As described above for thermoplastics, the use of multiple molds allows a certain degree of freedom to apply to the various elements of the mold cycle and similar variations on injection and techniques using post-pressure, etc., may also be used in molding thermosets.

Extrusion-Injection Molding

The extrusion process utilizes essentially the same equipment as that used in the injection molding process but provides heat-fluidized material on a continuous basis rather then the single shot, or charge, at a time, typical of injection molding. Extrusion equipment may therefore be used to supply fluid molding material on demand to fill any size mold adequately clamped and capable of withstanding the pressures involved. As stated above, a combination of high heat and lower speed of injection into the hot mold should contribute to reducing pressure requirements. While extrusion equipment typically supplies material continuously, it may be modified to supply a metered volume of fluid which may be adjusted to suit various mold sizes. A separate mold clamping press may be used to hold the mold, sized and pressure-rated to suit. After filling and pressure release, the mold is transferred out of the clamping system for solidification or cure and replaced by the next mold in the production line.

Since it is more practicable to fill the compound mold through the parting line, and hence through the mold edge, molds will, in general be positioned vertically and filling, regardless of the location of the injection port, will be accomplished from bottom to top. In general, lowering injection pressures, as described above, may result in greater void formation and rather than post-pressurize the material to eliminate any voids, the mold may be pre-pressurized through the vent port and the material injected against this pressure, forcing it to fill the mold evenly, preventing voids and suppressing the escape of volatiles while having little impact on material viscosity.

Transfer Molding

Transfer molding is similar in principle to injection molding in that the solid raw material is fluidized outside the mold and subsequently injected, or transferred, into the mold cavity. The fluid material is formed or deposited in a cylinder and a piston-like plunger transfers the material into the mold. The process is mostly used with thermosets but thermoplastics may be used. The compound tooling system, using either flexible or rigid-skinned molds, is suited to the process as molding pressures are generally low compared to typical injection molding. The transfer cylinder has a maximum charge capacity depending on the molding machine size but with modifications to the equipment and maintaining material fluidity in the mold, multiple charges may be injected to fill larger molds. Molds may be vented, evacuated, or pre-pressurized, as described above for injection molding. The injection port may be located anywhere on the mold edge, but placement on top may facilitate pressure balancing and obviate the need for check-valves. With the flexible skin-molds, self-sealing valves may be used capable of withstanding any injection over-pressure or post-pressurization applied. The transfer molding process is a low-pressure variation on the injection molding processes described previously and the conformal heating and cooling systems of the compound molds along with their low cost allow them to be similarly applied.

Liquid Resin Molding

Liquid resins are thermosetting molding materials whose normal (at ambient-temperature) state is a liquid. Resins are generally provided as chemical systems of two, or more, parts which are mixed together prior to molding, and polymerize by catalyst and\or heat. Some systems cure at elevated temperatures, requiring the addition of heat, while many cure at ambient temperature by an exothermic reaction. A wide range of formulations are available for molding and material viscosity is generally low compared to heat-fluidized compounds. Pressure required for molding is therefore comparably lower and large and intricate molds are easily filled. The low viscosities also make liquid resins very suitable for the molding of reinforced plastics due to their ability to wet-out fabrics etc. The compound molds of both skin types may be used in various processes, both currently-used as well as some new types or variations of the existing types.

Reaction Injection Molding

Either compound mold may be used in reaction injection molding and reinforced reaction injection molding processes where the liquid materials are atomized and mixed by high-pressure impingement in a chamber outside of the mold and subsequently injected under low pressure into the mold. The compound mold may be used as a direct substitute for a conventional mold where rapid-reacting resins are used and cycle times are short. With any necessary modifications to the mold filling and venting methods and ports, and by processing multiple molds through the filling system, various other, slower-reacting formulations may be used efficiently and the application of the molding process may thus be broadened. High temperature-cure resins may be used and the molds may be heated close to, or at, cure temperature prior to injection. Molds may be vacuum-evacuated and injection accomplished by atmospheric pressure only.

Resin Transfer Molding

This process is essentially low-pressure injection-molding of liquid resin where activated resin is forced into a mold under low pressure. Molds are normally vented to allow air to escape. This process is often used in conjunction with vacuum evacuation of the mold to prevent voids due to bubble entrapment. Injection may be effected by conventional low-pressure, piston-type, transfer equipment, speciality injection machines, manual or automated metering and dispensing equipment or by simple vacuum pressure. The compound tooling system prototype molds were developed for use in a variation of a vacuum-assisted process where the mold is first evacuated and the activated resin subsequently injected, by atmospheric pressure, from a reservoir attached to the injection port. Both types of compound molds may be used in the process with variations to both the molds and the methods allowing greater efficiency and wider application.

Since liquids and lower pressures are used and the mold is filled through the parting line, the process is facilitated by locating mold ports on the top edge. The injection and vacuum\vent ports are arranged a distance apart on the upper edge with the injection port internally connected to the base of the cavity system and the vacuum to the top, to ensure proper venting. The filling apparatus carries both injection and vacuum nozzles which automatically engage and seal to the ports for the fill cycle, automatically disengaging when complete. Either a new mold then moves into position or the filling apparatus moves to a new mold location. The filling apparatus may be designed to carry multiple nozzles to fill a set number of molds simultaneously. After injection, both ports may remain open to the atmosphere and the mold may be set aside or transferred to a pressure-vessel for the cure-cycle. Pressure sources may be connected to both ports to pressurize the material in the mold, as described previously.

A variation of the typical process may utilize the flexibility of the elastomer to produce a self-sealing vacuum and injection port. Both nozzle and port designs are modified such that the nozzles engage and force open self-closing valves at each port. When the mold is evacuated, the vacuum nozzle retracts as the mold is sealed. The resin is then injected into the evacuated mold and the nozzle is subsequently retracted, the mold again sealing. The advantage of this system is that it allows the filled mold to be over-pressured to reduce, or eliminate, voids and may obviate the need for post-pressurized curing. Such over-pressurization will depend on the mold closure, or clamping, pressure as well as the compressive strength of the elastomer used.

A further variation of the process, termed 'Pressure-Counter-Pressure Injection Molding' is one where the mold is first pressurized instead of evacuated, and the resin injected at a higher pressure (as described briefly above for injection molding). The counter pressure will force the incoming resin to completely fill the mold evenly from bottom to top, preventing void formation and race-tracking of the resin to the vent. This has particular application to composite production where the pressure will force the liquid resin into the interstices between reinforcing fibers. The pressures are adjusted to suit the materials used and the counter-pressure is regulated and retreats before the advancing resin. Mold and port designs are similar to those used for transfer molding, as outlined above, and the process may obviate the need for post-pressurization.

Casting Operations

Casting is simply molding without the use of pressure in the filling phase. The material is generally poured, under atmospheric pressure, into the mold. The mold may be heated, cooled and\or post-pressurized as described for molding operations. Both thermoplastics and thermosets may be used but because pressure is not used, material viscosity will have a major influence on material selection. Many thermoplastics and thermosets are unsuitable for casting due to their high viscosity. The various liquid resins, many of which have a very low viscosity and cure at ambient temperatures, are well suited to a number of casting processes while some specialized processes have been developed to cast various other types of plastics materials, some of which were themselves developed especially for casting applications. The compound tooling system in the form of one-, two-, or multi-part molds may be used in many conventional casting processes.

Casting Processes

Simple Casting

Simple casting of plastics generally involves the use of thermosetting liquid resins of the same types as used in transfer or other molding methods as described previously. The resins are liquid at room temperature and many cure by exothermic reaction. Heat-fluidized and heat-cured resins may also be used and the liquid is simply poured into an open or closed compound mold which includes heating systems as necessary. Closed molds are vented to allow air to escape and fill and vent ports are located at the top of the mold. The filled molds may be post-pressurized to eliminate voids. Hot-melt casting is essentially simple casting using any suitable thermoplastics instead of liquid thermosetting resins. The material used must have the minimally low viscosity required to allow pouring and filling. Heated molds may be used to maintain fluidity. The filled mold may be post-pressurized with a reservoir used to make up shrinkage loss and cooling may be controlled in a selective fashion as described previously.

Slush, Static and Dip Casting

In these processes, used to produce hollow objects, heat is used to fuse the material to the mold wall. The compound mold offers the advantage of an inexpensive, internally heated mold and obviates the need for an oven. Cooling may be effected more rapidly and the mold applied to the vibrational micro-lamination process to produce reinforced hollow plastics items.

Rotational Casting

Because of the typically long time cycle in these processes, the inexpensively-duplicated compound mold may have wide application. By connecting the heating and cooling systems to their sources through the axes of rotation, the need for an external heating and cooling system is eliminated and the mold response time as well as the overall cycle time is reduced. Molds may be used to produce open or closed hollow objects using thermoplastics or thermosets.

Solidification Processes

Plastics materials in their fluid form solidify by two different processes. Thermoplastics, being melted to fluid by heat, solidify simply by subsequent cooling. Thermosets, whether liquid or heat-fluidized, become solid plastics by means of a chemical reaction involving cross-linking of the molecules of their ingredients. This chemical reaction is the cure cycle, and curing agents which aid or accelerate the cross-linking (polymerization) process are often used with or without the use of additional heat. Curing processes take two forms, those requiring the addition of heat, endothermic reactions, and those which give off heat during cure, exothermic reactions. The use of a conformal heating and cooling system in the backing-mold allows precise temperature and heat control on the cooling or curing of the plastics. Shrinkage is a major factor in most plastics molding, due both to solidification and further cooling to ambient temperature. The co-efficients of thermal expansion of different mold and molding materials must be considered in mold design but due to their similar composition, such differences may not be great and easily accommodated.

Whether molding thermoplastics or thermosets, a singular mold may be used in a manner similar to conventional molding where the mold is cycled at the fill station as rapidly as possible. The mold remains mounted to the equipment and cooling and heating systems remain connected to the mold throughout the cycle. Where multiple molds are used, the molds are cycled through the fill station and, when full, are transferred while the next mold moves into the filling position. The mold will include its own clamping system which may be adequate to resist filling and post-filling pressures or may be held in a separate clamp at the filling station to resist the excess filling pressures whereupon it is transferred either with or without an additional clamp. Cooling\heating systems, as well as post-pressurization air, may connect and disconnect at the filling station and re-connect after transfer or may remain attached to a single system throughout the cycle where a turntable-type arrangement is used. The cooling or heating processes used in the solidification of the material is programmed and controlled at the source for each mold at its stage of the cycle.

Cooling of Thermoplastics

The primary advantages the compound molds have over conventional molds are their low cost, ease of duplication and conformal heating and cooling systems. These conformal systems provide even cooling and solidification of the material and serve to reduce, or eliminate, stresses due to differential shrinkage. The low cost allows large as well as small molds to be used and the ease of duplication takes some time pressure off each phase of the cycle. The conformal heating and cooling systems further ease the design and use of large molds as the design of such systems are easily tailored for optimum cooling. To provide more even cooling for larger molds, cooling systems may be divided into any number of subsystems, with each cooling a section of the mold simultaneously. Systems may also be designed to cool sections of the mold sequentially to cause shrinkage to accumulate in a direction which results in no stresses or in which shrinkage may be compensated for, as described previously.

The standard cooling system consists of lines or channels at, or under, the surface of each backing-mold, the lines, or channels, of a size and spatial density appropriate to the thickness of the part and hence the amount of cooling required at any point. While the system may connect to the cooling fluid source at a standard location on all molds, the fluid may be conducted from the connection point through the backing-mold to feed the actual cooling system, or sub-systems, at any point of the backing-mold sub-surface. The mold may be cooled from one side to the other, from bottom to top or radially from the center. Cooling of all fluid thermoplastics materials has two components, cooling from liquid to solid followed by further cooling of the solid to ambient temperature. Part and mold design typically take the cooling and attendant shrinkage factors into consideration based on the normal requirements of rapid cooling for rapid mold cycling. Mold duplication obviates the requirements for high speed to a certain extent and slower cooling will tend to reduce stress build-up.

Slower and selective cooling also allows shrinkage to be off-set, or neutralized, by make-up material being drawn or forced into the mold cavity. A mold may be provided with a multiple system composed of horizontally arranged zones designed to cool the mold from bottom to top, one zone at a time, with the upper zones, including the top one for a fluid reservoir with runners, maintaining the material in a hot, fluid condition. As the material cools and solidifies against the mold walls, the still-fluid center is drawn down by shrinkage and the make-up material is drawn down with it and\or forced from the reservoir by pressure. This cooling method, because it may virtually eliminate solidification shrinkage, may eliminate many of the stresses associated with such shrinkage and allows parts with thick section or differential wall thicknesses to be molded of suitable thermoplastics. The method is also well suited to producing parts of long length with regular or irregular cross-section. The molds may be arranged vertically and the cooling system used to cause most shrinkage to occur in the direction of the axis, which can be compensated for, while at the same time eliminating all or most shrinkage stress at right angles to the axis.

Curing of Thermosets

Thermosets, in general, are cured by heat energy, or chemically by a catalyst which cause the polymerization of the molecules of the material to occur. Heat is often used to accelerate the cure of the catalyzed chemical systems and curing of thermosets is therefore carried out with or without the addition of heat. Most heat-fluidized materials and many liquid thermosets are cured by heat alone and many liquid systems exist which are cured by catalyst at ambient temperatures. Thermosets that cure by catalysis give off heat during the exothermic chemical reaction involved in their cure and this heat aids in their cure. Cure times vary greatly and depend on the chemical formulation of the system. Once cured, the parts are usually hot but are generally solid enough to be removed from the mold, which is done at the earliest to minimize mold cycle time. Hot parts are often placed in cooling jigs to avoid warping and many are post-cured in heated environments to improve certain qualities. The conformal heating\cooling system of the compound mold may be used to provide cure-heat tailored to the geometry of the molded part, followed by post-curing and cooling in the mold. The use of multiple molds reduces cycle time pressure allowing parts to be more fully processed, whether high-temperature cure or ambient-temperature cure.

High-Temperature Curing

When full, the mold is transferred from the fill station and the temperature of the heated fluid raised to that required for curing. The temperature is maintained for the required length of time, depending on the material, whereupon it may be reduced prior to de-molding. The heating system is designed, as described previously, in accordance with part geometry and wall thickness to ensure even cure throughout the part. Shrinkage is less of a factor in molding thermosets and many materials shrink very little, or not at all, during the actual solidification process with some shrinkage attendant upon cooling to ambient temperature. What shrinkage does occur during the cure phase is generally less than that for thermoplastics but must be accommodated. Differential skin- and backing-mold as well as part expansion and shrinkage factors must be considered. The elastomers, by their very nature, can accommodate these factors much more readily than the rigid skin-molds and the silicones, in particular, can withstand the higher cure temperatures and higher shrinkage related to certain molding resins. Tailored cooling at an appropriate rate, based on the part geometry, will tend to eliminate stresses in the molded part and the combined cure, post-cure if any, and cooling time will dictate the number of molds required for an optimal cycle.

The part may be post-cured and\or cooled in the mold to ambient temperature prior to de-molding but, because post-curing would tie up the mold for a considerable amount of time and, if cooled, the mold would then need to be re-heated for the next cycle, the mold's temperature may only be reduced to that required for filling, the part being de-molded while hot and transferred to a jig for post-cure or cooling. Since the filling and curing phase involve a relatively limited mold temperature differential compared with cooling to ambient and to a lesser extent, post-curing, the heat requirements for the actual molding operation, as well as the number of molds and support system elements, may be minimized by separating post-cure and cooling from the molding cycle. Jigs are often used to hold parts for cooling and post-curing to prevent warping etc., and such jigs may be inexpensively produced from any suitable materials as the pressures and temperatures are generally lower than those involved in molding. Jigs may be designed like molds and supply the post-cure heating or cooling internally or simply hold the part for external application.

The jig may consist of a modified copy of the mold and contain a heating\cooling system. Each half of this jig is a one-piece solid copy of all, or part, of each half of the compound mold and may be derived from the master molds by combining the appropriate elements of the master mold set to produce the jig-making mold. The jig may also be produced using a mold generated by modifying the master mold design files. The total mold cycle time will dictate the number of jigs required to maintain continuous mold operation. The jig may be in general surface contact with the part and have a conformal heating\cooling system at, or embedded under, the surface in a manner similar to the molds themselves or the jig design may be modified to contact the part at certain locations leaving a system of interconnected voids or air space over the general surface of the part. Contact points match across the jig halves and are located appropriately to hold the part as required to avoid warping, etc. This type of jig may contain no heating\cooling systems and may simply hold the part while it cools in air. Cooling or heating fluids may be passed over the surface of the part or the jig and part may be placed in a post-curing oven or a hot or cold bath.

Ambient-Temperature Curing

Ambient-temperature cure thermosets are all liquid resin systems cured for the most part by catalysts, or initiators, acting in concert with promoters. Some systems cure using electrical or light energy but these are generally used for special applications other than the typical molding processes. In catalyzed reactions, exothermic heat is produced which aids the polymerization of the resin. Cure time varies depending on the chemical formulation but very rapid reaction times of the order of seconds or minutes are common as well as slower cure rates requiring many hours for other systems. The faster the reaction, the lower the number of molds required and in some cases a compound mold may be used singly in place of a conventional mold. Shrinkage may also be a factor with ambient-temperature cure resins, generally the faster the reaction, the greater the shrinkage to be expected. Many slower-curing liquid resins shrink little, some virtually zero, and this results in lower stresses in parts, regardless of geometry, mass or differential wall thickness. As in the case of other molding materials, the flexible skin-mold can more easily accommodate any differential shrinkage while the rigid skin-mold will, in general, have a coefficient of thermal expansion closer to the molding material than a typical conventional metal mold.

While additional heat is not required to initiate or maintain the reaction, in order that the exothermic heat generated be devoted to assisting the reaction, the molds may be warmed prior to material injection so as not to draw off such heat in the early stage of the polymerization process. Once the reaction is in progress, the addition of heat via the conformal system may be suspended at the point where the reaction is producing adequate heat exothermically. The heat generated by the reaction is dependant on the chemical system used as well as on part thickness, or mass, and may, in certain cases, be excessive to the point of impeding the process, or having an otherwise adverse effect on the molded part. In such cases, it may be advantageous to draw off the excess heat by using cooling fluids passed through the conformal systems. By this method, the reaction rate may be controlled, as desired, to optimize the process and the part produced, multiple molds being used to assure the required production rate. When the cure cycle is complete, the part may be cooled in the mold, removed and cooled in air, or transferred to a jig, as described above, for the cooling or post-cure phase of the process.

Pressure-Curing

An often serious problem with many molding processes using many types of materials is the formation of voids, whether they are the result of incomplete filling of the mold or due to gas bubbles in the material. Venting or vacuum-evacuation of the mold may often suffice to prevent their formation. However, in many cases, these measures may be inadequate and higher pressure is required either during filling or during solidification to ensure that any voids that form during the filling process are eliminated then or during the cure or solidification cycle. Pressure may be applied at the fill station by the filling equipment and be maintained by same or by check-valves at injection and vent ports during solidification. Vacuum de-gassing of liquid resins may suffice for other processes, but post-pressurization of the fluid material in the mold prior to solidification is often the only effective means available to produce void-free parts.

The objective of post-pressurization is to force the material to completely fill the mold by essentially crushing all voids, air or gas bubbles out of existence. Pressure may be applied to the material through the open mold ports to act directly on the fluid, in the case of the typical closed mold or in certain open-mold processes (pressure- and vacuum-bag) the material may be covered by a flexible membrane and the pressure acts over the surface to consolidate the material. In the typical processes using closed molds and as described previously, the pressure may be applied in two general ways. Either the entire mold is placed in a pressure-vessel and cured in a pressurized atmosphere or the pressure is applied directly to the ports and the mold designed and clamped in such a way as to be capable of resisting the applied pressure. In this latter case, the design of the backing-plate and clamping system along with the pressure connections to both ports are based on the pressure required to achieve void elimination with regard to that mold's geometry and the material being molded. The mold may be mounted in a secondary supporting press to reduce the inherent strength requirements of the backing-plates and clamping system and for safety reasons. While a standard mold may be used in a pressure vessel, the use of what is here termed a pressure press may require some mold redesign, apart from strength-enhancement, to facilitate its use in such a pressure press, which, theoretically, should be less expensive to construct and operate as well as more adaptable than a pressure-vessel.

Pressure-Press

The pressure-press takes a form similar to a typical press, comparable to a large vise, and operated by a ram or screw (or multiples of same). The plates of the press and the mold backing-plates are designed to be compatible so that the press plates hold and apply pressure evenly over the surfaces of the backing-plates. Connections to the ports capable of withstanding the pressure may take a number of forms. When the molds are closed prior to filling, a connecting stub with a flange may be pre-inserted and trapped between the mold halves, the flange forming the pressure seal. The pressure source is then connected to the stub. The nozzles of the pressure sources may also seal to the open ports, simply by compression, being forced against them by the equipment carrying the nozzles. Connectors may also be mounted onto the pressure-press which engage the ports and to which the pressure sources are subsequently connected. Such methods ensure that a minimum of pressurized fluid is required in the process. The conformal heating\cooling systems act as required to cause solidification of the pressurized material in the mold and all systems may be controlled at the press equipment which constitutes a solidification station through which the molds are cycled from the filling station.

While the press equipment may easily be designed and constructed to resist the pressures applied to the mold, these pressures must also be resisted at the mold parting line or plane. Mold mating surfaces may include an interlocking tongue-and-groove type of joint designed to prevent blow-out and a compression seal may be included in a trench around the perimeter of the mold or cavity. This seal may be inflatable, and inflated to a pressure sufficiently high to resist the fluid pressure. Where flexible skin-molds are used, an interlocking joint may be used to which excess material is added by design to increase the Compression of the material and enhance the seal, and joint geometry may be modified to better resist the internal mold pressure. Flexible material will vary in its ability to withstand mold pressurization, both over the surfaces and at the parting line, and the hardness and compressive strength of the material must be suited to the intended pressure levels. Many materials are available which are capable of withstanding the typical pressure used, of the order of 50 to 100 psi. or greater, with little if any deformation and, where a softer material along with a higher pressure are required, the alternative of the pressure vessel may be used.

Pressure Vessel

Where a pressure vessel is used, the filled mold is transferred into the vessel, the vessel is closed and pressurized, usually by air or gas. Where heat is required, a hot gas is used and\or the vessel is heated by some means. Since the pressures are equal inside and outside the mold, there is no danger of leakage due to the pressure. Large components, particularly composite items are produced in this way and the method virtually ensures a void-free molding. Pressure vessels are sized according to the mold used and the amount of free space in the vessel dictates the amount of pressurized gas and heat required. The pressure acts through the mold openings or against the surface, as stated above, but the heat must penetrate the mold to act oh the material. The interior of the vessel may be blocked out to conform as closely as possible to the shape of the mold and thereby reduce the volume of pressurized fluid required as well as focusing the heat close to the mold to aid in transfer. The compound tooling system, using standard-sized molds, regardless of the part geometry, simplifies blocking installation and the conformal heating\cooling system may be used to obviate the need for vessel heating. Where the compound tooling system is used with multiple molds, multiple pressure-vessels may be required as well as an automated loading and unloading system to facilitate transfer.

Vessel size may be standardized to mold size and vessels may be capable of handling a number of sizes as well as multiple molds and the number of vessels required will depend on the number of molds used and cure-time of the resin. Replaceable blocking systems may be used to adapt the vessel interior to suit the mold size or multiple mold arrangement. A pneumatically, or otherwise, operated ram with a replaceable platform to suit different mold sizes or multiple mold arrangements may be mounted within the vessel. The platform extends and retracts to ease mold transfer. Motive power for the ram may be supplied through a penetration in the vessel door or other appropriate location. Where multiple molds with multiple pressure vessels are used, mold transfer may become rather cumbersome. In many molding processes, particularly low-pressure types using liquid resins, the filling apparatus is light and maneuverable, often hose attached, and it may be more efficient to move the singular filling equipment rather than the often large and\or multiple molds. The same molding process, therefore, may be based either on the pressure vessel locations as multiple molding stations while the filling apparatus moves or the molds may move between fixed and separate filling and curing stations.

Heating or cooling may be supplied to the mold within the vessel by two general means, either indirectly by the vessel or directly by the conformal systems. Molds may be designed with interconnected cavities under the surface (similar to the jigs described previously) and open at the mold sides. The vessel may be heated by the pressurized fluid or by an internal heating element or multiple elements mounted to the vessel or to the blocking. The heat may simply penetrate the mold via the void system by conduction or natural convection or it may be fan-assisted by means of one or more circulating fans mounted in the vessel. Power for the heating elements and fans is supplied through a penetration in the vessel door or elsewhere. Where the conformal systems are used, these are supplied through connections mounted on the door. The external sources connect to the door via flexible hoses to allow the door to move, while inside the door may be mounted a manifold connector to allow a number of molds to connect to the source. Each individual mold within the vessel is connected to the manifold also by a flexible connection-piece and molds may also be interconnected. The vessel may then be pressurized using the minimum of compressed air and heating and cooling is carried out efficiently by the conformal systems, reducing the energy requirements to a minimum.

De-molding Operations

When the mold is ready for part removal, it is opened in place at the fill or solidification station or transferred to, or through, a dedicated de-molding station where it is opened either by hand or automatically. The part may be removed manually from the mold, be removed by special equipment external to the mold or be ejected from the mold by a mold ejection-pin system. Any suitable method may be used in the case of the compound molds but the type of skin-mold will determine the nature of any ejector-pin type system used. The nature of the compound mold also allows, or necessitates, some unconventional de-molding methods to be used. Compound molds using flexible skin-molds are considerably different to conventional molds, whereas those using rigid skins are very similar in design and use to the typical conventional mold. Various methods may be used for either type of skin-mold and these methods may or may not involve the release of the skin-mold from the backing-mold and be manual, partly or fully automated.

Rigid Skin-molds

Molds are opened by releasing the clamps or press, as the case may be, and separating the mold halves. Generally, one mold half is removed while the part remains attached to the second half. The part may then be dislodged and removed by hand as is common to many processes. In many mold designs, care is taken to ensure that one mold half more readily releases from the part than the other and de-molding operations are based on this principle. The mold may be arranged vertically and the part dislodged and removed, or horizontally and the part lifted out. Removal may be assisted by a vacuum tool which is brought to mate with the part in the mold, the vacuum initiated and the part removed by the tool. If necessary to assist removal of a tightly fitting part or one with undercuts, such a tool may be fitted with miniature rams around the perimeter such that when the tool has mated and attached, the rams may be extended to push against the face of the mold thereby pushing the tool back and extracting the part. This vacuum tool (described in a later section) is derived from a modified copy of the appropriate master tooling and may be used in a variety of de-molding methods and for subsequent part transfer and processing.

An in-mold ejector-pin system may also be used which is essentially similar in concept to such systems used in conventional molds but differs in operation. This system consists of pins located at appropriate points in the mold to act on the part and\or the sprue and runner elements. The pins take the form of rams, operated pneumatically or otherwise, the actuator section being molded into the backing-mold while the pin is then attached, and acts, through the skin-mold. In order to ensure that molding material does not leak through the pin penetrations, each pin may be designed with a countersunk head that, when retracted, sits flush with the mold surface and seals tightly against a corresponding depression in the skin-mold. An elastomeric o-ring seal may be included if necessary. When the skin-mold is mounted to the backing-:mold, it is secured in place and the pins are attached to the rams through the skin-mold. The pins may be attached tightly by screw-threads which will necessitate a slot or socket etc., in the pin-head for tool purchase and so will result in embossed scars on the part. If on a visible area of the part, these scars may need to be removed during finishing or the sockets may be capped or otherwise filled to prevent scarring.

A second type of part ejector system may be used where the entire skin-mold is partially ejected from the backing-mold by a similar system of rams. In this variation, the rams of one or both mold halves all act simultaneously to push the skin-mold(s) a short distance out from the backing-molds, pushing one or both mold bodies back at the same time. One ram system may then be pulsed and\or vibrated to free the part from the skin-mold, and subsequently retracted to reseat itself in the backing-mold. Once released, this mold half may be removed to allow access to the part or the other ram system may be pulsed as before to release the part and allow it to be removed by hand or otherwise. This system is installed in the backing-mold where the rams are screw-attached to threaded inserts molded into the rear of the skin-mold and is simpler than the ejector pin system but may be suitable only for relatively simple molds, if unassisted by vacuum tooling. If assisted by vacuum tooling, the tooling may be braced with counter-rams to resist the force of the mold's ram system as it retracts the skin-mold from the part.

Flexible Skin-molds

As with the rigid skin-molds, the mold is opened by various means, one half of the mold being removed with the part attached to the other, as is typical for most molding operations. The part may then be manually removed from the mold half by lifting or stripping. The part geometry may include undercuts and manual removal techniques may be adapted to suit the geometry and accommodate such undercuts etc. The perimeter bonding-vacuum may be maintained while the surface vacuum is released to facilitate flexing of the skin-mold during de-molding, after which the skin-mold is reseated by the vacuum. For manual de-molding of any type or size moldings, and regardless of complex geometry etc., the perimeter seal and backing-mold surface vacuums may both be released, the backing-mold, with plate, removed and the skin-mold peeled by hand. The skin-mold is then re-mounted and bonded to the backing-mold as before. This procedure is then repeated for the second mold half using a vacuum-tool or jig to hold the part during peeling, if necessary. This method may be suitable for short-run production to keep mold and equipment costs low or for highly complex molds as manual de-molding will ensure optimum peeling forces and multiple peeling directions best suited to mold and part design as well as mold maintenance.

Whether de-molding is manual, assisted, or automatic, one design intent, is that the skin-mold\backing-mold perimeter seal may be maintained unbroken through the life of the mold. A vacuum source, which can be reversed to provide compressed air, is connected to the skin-mold surface-bonding vacuum connection. Air is supplied to release the vacuum and inflate the skin away from the surface while simultaneously drawing the backing-mold away from the skin-mold. The inflating skin-mold will expand and curve back from the center to peel away from the part. For simple moldings without undercuts, inflating the skin will be sufficient to break the molding bond and cause the skin to release from the molding. Once released, the vacuum is re-initiated to draw the skin back against the plate.

For complex molds, and especially those with deep draws and undercuts, inflation of the skin-mold combined with backing-mold\plate retraction may be insufficient to effect release. In this type of mold a system of push-pins is used and the skin-mold is only partly inflated or may not be inflated but held to the backing-mold through de-molding. These pins are pneumatically or otherwise-operated rams, as described previously, molded-in at appropriate locations in the backing-mold. These pins act on the rear face of the skin mold and hence on the molding. Mold retraction is partly driven by the pins and support pressure is simultaneously supplied to the pins by the backing-mold. During de-molding, the pins are extended and push against select part and runner locations, thus pushing the backing-mold\plate away from the skin-mold but also pushing the molding against the second mold half. The pins, or rams, are each connected to a manifold, embedded in the backing-mold, and which is connected to an air source. The pins are blunt and rounded so as to cause no damage to the part or skin-mold.

In the case where there is no skin inflation, the mold releases directly while stretching at each pin location. The elastomer flexes over undercuts etc. Where there is partial inflation, the skin-mold is subsequently drawn, by vacuum, back against the plate and away from the molding while the extended pins hold the molding in place. The former system is suited to moderately complex molds while the latter, allowing greater latitude for movement of the flexible skin-mold, is suited to more complex molds. In both cases, the skin stretches over and around the pins and releases from the molding. The pins then retract back to the plate and the skin-mold reseats itself on the backing-mold. The pins may act on the part and\or the runner system as necessary and the system is capable of automatically de-molding highly complex parts with intricate surface detail, undercuts as well as threaded elements, including inserts.

To remove the part from the second mold half, simple inflation of the skin mold may be sufficient for the release of simple moldings and the molding drops clear or is removed by other means. A system of pins may be used as before, which simply ejects the molding from the mold. For low relief parts where the draw does not exceed pin extension, both pin systems may operate simultaneously and on retraction, the part drops clear or is removed. To facilitate de-molding, a vacuum tool may be utilized as described previously. The tool firmly holds the part against the peeling, or other de-molding forces, allowing the part to be removed from the second mold half, (or vice-versa) as described above. The vacuum of the holding tool may then be released and\or reversed to eject the part or to transfer it to one of a family of such tools, described below.

Vacuum Tooling

This vacuum tooling is similar in concept to the generic vacuum pads commonly used for part transfer, or the vacuum-plate holding tool used in the machining of flat metal plate stock, but is highly customized to the part being molded. The tool is a perforated vacuum pad whose shape, where it contacts the part, precisely matches that of the part and it is a compound of an elastomer layer permanently bonded to a rigid (polymer or other material) backing-plate, the perforations being internally connected, via tubes, to a manifold or void, which is connected to a vacuum and air source. The perforations are positioned according to the part and runner layout of the mold and a key\key-way system ensures accurate tool alignment and mating. The number, or density of the perforations may be minimized by grooving the tool surface at each perforation to extend the vacuum hold over a larger surface area. The vacuum-pad may be designed to precisely match the entire surface of the part or may be modified to selectively contact the part, depending on the transfer or holding requirements. Rather than cover and mate with the entire surface of the part, the pad may also be made in the form of sections which mate and attach to discreet sections of the part, in a similar way to currently used vacuum pads or suction cups, tool-to-part alignment being effected by an appropriate guidance system.

The vacuum-pad is, essentially, a modified copy of a flexible skin-mold bonded to a rigid backing-plate and is a negative representation of the positive part embedded in the opposite mold half, which is itself equivalent to the master mold used to produce the skin-mold. The tooling to produce the pad, therefore, may be derived from the skin-mold design file, from the skin-mold master production tool or from a part embedded in a skin-mold. The master skin-mold design file is modified with pin-type projections at each perforation location along with narrow ridges to produce grooves and any other required surface geometry modifications. A solid copy of the master tool may be similarly modified by inserting pins at appropriate points along with striping to form grooves and material to effect any other desired modifications. The tooling may also be derived from a part embedded in a mold half and such a method may be used to produce a pad for use in any molding process using any type of molds and regardless of the size or geometry of the parts molded. An elastomer tool is first derived from a mold half with the molding fixed in place. From this a hard positive master is produced. This master is then modified as described above to produce a positive of the required negative, perforated vacuum tool. Tubes are attached to the pins and a layer of elastomer is applied and followed by the rigid backing-plate.

Pad design will depend on the operation to be carried out using the tool, whether simply part transfer or holding the part while an operation is carried out on it by manual or other means. For simple transfer, the pad may attach to the shallow draft, facing surfaces of the part only and the surface geometry of the elastomer skin may be simplified to avoid undercuts, steep draft and surface detail or anything that would impede direct mating with the molding while still ensuring a tight seal against the molding and a firm hold. Holding requirements for any post-processing operation will dictate the areal extent of pad-to-part mating and may vary from complete surface contact for a general operation to localized contact providing an adequate hold for an operation at a particular point on the part.

As well as assisting in de-molding, the tool can be used to transfer the part to a conveyor etc., or may be used to transfer the molding to an opposite holding tool produced from the other mold half. Such a double holding tool may be used to clamp the part for a particular operation and allow it to be successively transferred. In this way, control may be maintained on the part for any number of post-processing operations up to, and including, assembly or packaging. Part and sprue\runner perforations may be separately ganged to different vacuum sources to allow ejection of the waste and retention of the parts. Individual parts or part groups may be manipulated in the same way. Such tools may be used with specialty-designed post-processing equipment to carry out many typical post-molding operations common in the plastics manufacturing industry. Using modified designs, or copies, of the polymer master-tooling, a family of special-purpose holding, clamping and transfer tooling may be derived and used in conjunction with specially-designed processing equipment to allow sprue\runner removal, flash removal, drilling\machining, painting and finishing operations as well as automated assembly to be carried out. Clamping alignment is ensured by the key system, the hardness of the elastomer and the pressure used being suited to the generally low stresses involved in plastics machining. Both the process and clamping tooling can be used in various ways, the following being one such.

The process tooling may be fixed upon an horizontal platen with one half of the clamping tool mounted above. Process tooling may take the form of multiple mini gate-cutting saws, drills or other machining tools, paint sprayers etc., fixed in position, or flash-trimmers or other tools set to follow a toolpath. One clamping tool half is fixed to the platen, has openings through it for process tool access, and is allowed limited vertical movement downward against spring-loading. The molding is brought down by the transfer tool which also acts as the second clamp half. The clamps mate, the lower clamp vacuum-bonds to the molding and the transfer tooling depresses the assembly onto the process tooling, automatically activating such tooling. The upper clamp is fully closed with recess cut-outs for tool clearance. By enclosing the sides between the clamping tools and platen the operation can take place in a closed environment and any chips or over-spray etc., may be removed by vacuum, augmented by air fed through the recesses of the upper clamp. When the operation is complete, the clamping assembly elevates and the transfer tool releases the molding to the fixed clamp and returns for the next molding. The next-in-line transfer tool mates with the fixed clamp, the vacuum-hold on the molding is transferred and the processed molding moved to the next-in-line process operation. Severed sprue and runner systems may be ejected in transit and\or parts may be turned over by an intermediate station.

For practical reasons, some operations may require their being carried out in two or more stages, particularly where there is inadequate room for all process tooling on the platen or where drilling or machining at an angle, as well as vertically, is required. The operation may be divided among multiple stations and either process tools or clamp assemblies may be fixed or move at an angle to the vertical. In certain cases it may be of benefit to simplify mold design and achieve the same end by post-processing, particularly with regard to the molding of holes in a part. Holes are usually formed by pins placed in the mold which are often delicate and easily damaged and may impede material flow during mold filling. The tools may also be adapted for use with robotics to allow part manipulation in three dimensions, particularly for assembly purposes.

Molding Applications

As detailed in the foregoing, the compound tooling system described herein provides an inexpensive alternative to conventional-type molds and has the potential for wide application to the production of plastics components. The tooling system may be used with thermoplastics and thermosets in both high pressure and low pressure molding processes, the pressure required being dependent, to a great extent, on the viscosity of the material being molded. The more fluid the material, or the more fluid the material can be made to be, the larger the component that may be molded. A mold is simply the negative shape of the object required and gives it only the property of shape. As long as the shape can be defined, held through filling and solidification cycles and the mold then broken down, any object of any size or shape can be molded. The low cost of the molds allows both small and large molds to be produced while the method of mold production allows such molds to be rapidly produced. The two major factors in mold cost and production time are size and intricacy of shape, a small intricate mold often costing more in time and money than a large simple shape. Size and shape also influence mold filling, material solidification and part de-molding and the compound tooling system, with its adaptability to various conventional and new filling methods, its conformal systems and part de-molding capabilities (particularly the flexible skin-molds) allows the practical and economical molding of parts ranging from small to very large with simple to highly intricate shapes.

In general, part shape can be divided into two classifications, regular or irregular and any simple part may consist of one or the other or a combination of both. A more complex part may consist of multiple regular or irregular sub-shapes or, again, be a combination of both. Parts may also be classified as solid or hollow and such hollow parts may be entirely closed or have one or more openings. Hollow parts may be also be produced with a cellular interior and may be termed cellular solids. Depending on part geometry, parts maybe described as semi-hollow and other parts (solid or hollow) may be symmetrical about a line or across a plane while their shape may be irregular in the third direction. After shape, all other qualities are derived from the material used in the object's production and such qualities may be modified by adding materials such as fillers or reinforcements, as well as coloring agents etc., to the molding material prior to filling the mold. In these cases, the material from which the object is made is essentially homogenous, plain or isotropically-modified, and easily molded with a suitable version of this tooling system.

An object's qualities may be locally and\or anisotropically modified by the placement of various items or materials, of a different composition to the molding material, in the mold prior to filling. Such items may be metal inserts to be embedded at certain locations in the object or may be reinforcing materials oriented in certain directions to produce a composite component. Composites are usually produced by combining the required items or materials in the mold with the molding material, it being the plastics matrix which binds everything together in the shape of the mold. Standard molding methods are used as well as methods designed specifically for the production of composites. Certain composites are produced by specialized processes such as co-molding and over-molding, winding etc. The compound tooling system may be used in various ways described previously and further adapted to the production of a variety of composite types.

Rigid Skin-molds

In general, compound molds using rigid skins follow conventional molding parameters in their application to both molding processes and the types of parts being molded. Low cost, ease of multiplication, large size and conformal systems are the advantages over conventional metal molds but part geometry, or shape, is similarly constrained by the necessity for draft to allow part de-molding. The conformal heating and cooling systems do, however, allow a greater degree of latitude with regard to part wall thickness and local geometry. Virtually any part shape that can be molded using a conventional mold may be molded using a rigid-skinned compound mold and with few apparent practical or theoretical limits on part size. The replaceable skin-mold itself is produced using similarly inexpensive molds and has a life-span that depends to a great extent on both the physical and chemical characteristics of the material being molded. The physical nature of the material, particularly its viscosity and abrasive qualities, will have a wearing effect on the skin-mold during filling, which will be further influenced by molding temperature and pressure. The chemical composition of the material is important, particularly in the case of thermosets, as the reacting constituents may have an erosive effect on the skin-mold during the curing cycle and may bond to it unless release agents or barrier coatings are used. Molding of thermoplastics (due to their non-cross-linking nature) will cause little or no chemical damage to the skin-mold and its life-span will generally be determined by the extent of abrasive wear only.

Flexible Skin-molds

In general, compound molds using flexible skins are, by their very nature, hot as bound to conventional molding parameters as are rigid-skinned compound or conventional solid metal or polymer molds. The advantage of flexible skins is more apparent in their de-molding capabilities than in the actual molding and solidification phases of the molding cycle where they are held, to define the part shape, essentially rigid by the vacuum bond. The ability to de-mold, and therefore allow the molding of, parts with undercuts and intricate detail is their primary advantage. Their low cost, ease of production etc., are comparable to the rigid skins while the flexibility eases de-molding of very large parts. The life-span of the flexible skin-mold, whether it be an elastomer or flexible polymer, depends, like the rigid skins, on the physical and chemical characteristics of the material molded. In general, the flexible skin-mold is not as durable but skin replacement is much simpler. Whether molding thermoplastics or thermosets, abrasion during mold filling will be a factor and the extent of wear will depend on the amount of hard fillers etc., in the material. While abrasion resistance varies among skin-mold materials, most such candidate compounds are susceptible to chemical attack by curing thermosets which is usually exacerbated by heat and, in general, will tend to wear out the mold before abrasive wear becomes significant. The cure time of the thermoset is also a factor, in that the longer the cure time, the greater the erosion per cycle and the lower the number of moldings any skin-mold will produce. The use of release agents or barrier coats with flexible skin-molds is a general necessity to extend mold life and, in general, a certain number of moldings may be expected from a certain type of skin-mold when molding a certain type of thermoset. Molding of thermoplastics will result in little or no chemical erosion, heat and abrasive wear being the main considerations, resulting in longer mold life.

General Molding

The greater part of plastics molding is devoted to the production of objects composed of an homogenous plastics material. By any of a number of molding processes, the empty mold is filled with a fluid plastics material which hardens to form the object. This object has the shape given to it by the mold and its shape is designed to contribute as much as possible to the object's function and aesthetic appeal based on the material to be used in its manufacture. All remaining required properties, or qualities, such as color, strength, flexibility, hardness etc., must be given to that shape by the material of which it is composed. Plastic objects, therefore, like all objects, have properties based on a combination of their shape and material composition and changes to one or both will alter these properties generally, locally or directionally. Changing the properties generally, of any part of given shape, may be accomplished by changing the molding material, ie. outside of the mold, while local or oriented changes may be made by placing materials inside the mold prior to filling, or by adding to the object after molding.

One of the most important properties of any object is its strength and the most important family of additive materials are reinforcements which are utilized to increase the strength of the object. Plastics objects which have been reinforced by any of a number of methods are referred to collectively as reinforced plastics. Reinforcing materials may be combined with the molding material prior to molding, placed in the mold prior to filling or added to the object after molding. Most standard molding methods may be used to produce certain types of reinforced plastics items and a number of specialized processes have also been developed solely for the production of such components. Because of their advantages of strength and light weight, an increasingly important application of molding, therefore is to the manufacture of reinforced plastics components. Both plain (unreinforced) and reinforced plastics components may be molded with or without inserts. A number of specialized molding processes are used to broaden both the application of molding generally and to produce more complex plain or reinforced plastics components Insert Molding Inserts of metal or other materials comprising pins, plates, grommets, bushings etc., may be locally molded into parts. These items may be designed to assist in the function, assembly or aesthetic appeal of the object. The inserts are placed in the mold which is designed to hold them in position for the molding operation. Processes used are generally lower pressure to ensure little chance of disturbance as the material fills the mold. When using rigid skin-molds, conventional mold parameters apply, whereas flexible skin-molds have certain advantages. The flexible skin-mold is well suited, particularly in low pressure applications, as it allows an overly-tight fit to be provided on these insert parts, preventing leakage around the insert and also allowing inserts with undercuts to be molded-in. Both internally and externally threaded, or undercut, inserts may be molded into the part as the elastomer will strip over the threads or projections during de-molding. Items with severe undercuts such as hooks may be molded-in by using intentional flash in mold design to allow the mold to strip over the hook. Separate elastomer mold sections or sockets may be used to hold more complex inserts, and be removed from the part after de-molding.

Co-molding

Co-molding is a specialized technique where one or more separately produced items may be installed in the mold and the mold filled, incorporating the component into the final product or bonding the components together. In this case, the installed component is similar to an insert and the mold essentially acts as an assembly jig. Such components may be composed of any material different to the molding material, thereby producing a composite, or an item may be composed of the same material, the technique being used to produce a component of a complexity beyond the capabilities of a single molding operation. Both plain and reinforced plastics items with inserts, if required, may be produced, and the technique may be extended to multiple sequential molding operations. The mold may be designed such that the molding material partially, or fully, embeds the components in the matrix, or fills only the space between the components. Such components to be co-molded may include molded-on spacer bosses, alignment guides or interlocking features to ensure proper alignment and joint spacing.

Over-molding

Over-molding is a technique generally similar to co-molding in that one, or more, items is installed in the mold prior to filling. Components may be partly over-molded in a similar way to current over-molding practices where a portion of the item is held by the mold and the remainder embedded in the molding material. Components may be completely over-molded by first placing the part in a pre-mold, which is used to mold spacer-elements, ridges or bosses, composed of the final molding material, onto the piece to hold it in the correct position in the final mold. Spacer-elements hold the part a distance away from the mold walls and are located so as not to interfere with mold filling. The component is thus completely embedded, or over-molded, in the molding resin. In molding operations such as these, the difference in skin-mold relief between pre-mold and final mold may be negligible so that both may be used with identical backing-molds. Two or more components may be assembled and then incorporated into the final object by this method, in a similar way to co-molding. Again, this method may be used with plain or reinforced plastics as well as inserts to produce highly complex items not possible to produce by one-step molding.

Molding Plain Plastics

Plain plastics are here considered to be those which do not include reinforcing materials but, in addition to the plastics material itself, may contain fillers, colorants, anti-oxidants etc., or any other agents added to the polymer to change or improve certain properties. Plastics molding materials are formulated according to the qualities desired in any object of a particular shape. In typical molding such as this, using homogenous material, and any molding or casting process, the mold donates only shape to the object. As far as part geometry is concerned, the rigid skin-mold must observe convention while the flexible skin-mold has greater latitude, and more when used with foam-layered backing-molds. Part size is essentially limited only by molding practicalities while strength requirements dictate the thickness of the object. As stated, shape is classified as regular or irregular and solid or hollow, these being the extremes within which most shapes fall.

Sheet Molding

One of the simplest types of part to produce is a flat sheet and the mold to produce such a part will consist of a simple, single-cavity mold. In this application, thin sheet thickness may be defined by the skin-mold halves by thickening one or both skins appropriately around the cavity and the backing-molds may simply be identical flat rigid backing-plates which may then be used for a range of sheet thicknesses. Above a certain thickness, dictated by economics, the backing-mold may be made to conform to the cavity shape in the normal fashion described for the system. Sheet size is limited only by practical equipment limitations or the size of the pressure-vessel or autoclave, if used. Thickness may be held very accurately over the entire surface of the sheet and additional bracing used for mold stability as sheet size increases. Sheets may be molded or cast using thermosets or thermoplastics and some advantages of these methods are the ability to mold the sheet to final size, mold in surface texture or other features, such as holes or inserts, thereby obviating the need for many post-molding operations. When using flexible skin-molds, no draft angle is necessary and sheets can be molded with square edges or, by off-setting the parting line, with shallow tongue-and-groove or over-lap edges for sheet joining.

For thinner sheets, a single large mold may be used to produce a single large sheet or any number of smaller sheets using these identical flat backing-plates. Such a method eliminates the labor involved in cutting conventionally-made large sheets to the required size and the attendant waste in the form of scrap. The sprue and runner waste from the molding operation is minimized and may be recycled directly if thermoplastic. As thickness increases, one or both backing-molds may be modified to conform to the geometry of the cavities, as described above, and any required features may be molded into the parts. A single mold may be used to produce multiple identical parts or all the parts required for an assembly in an assembly-ready condition. Both the backing-molds and plates are designed to be rectangular, for practical purposes, but other shapes may be used. Any regular or irregular shape of sheet may be molded in a rectangular mold and the skin-mold may cover the entire surface or take the form of an insert in the backing-mold, defining the required shape with an adequate margin for sealing the cavity. The amount of skin-mold material used is minimized and, in the case of the flexible skin-molds, the mating surfaces of the backing-molds act as compression limiters, precisely defining sheet thickness.

Thin-walled Part Molding

While sheet materials, being flat and thin, are essentially two-dimensional in nature, any thin-walled part that is other than flat is three-dimensional in nature. Such parts may take any geometry from a simple curved sheet up to, and including, a completely closed hollow object. In the category discussed here, the parts are open and the general geometry of any thin-walled part can be described as varying from an uneven sheet to an open hollow. These parts are moldable by simple direct-draw molding using two-part molds. Parts with shallow draft are easily molded using both types of skin-molds and the control on solidification donated by the conformal heating and cooling systems helps in the elimination of stresses relating to changes in geometry allowing sharper changes in both thickness and orientation of part elements.

Two-part conventional molds have limits with regard to draft and depth of draw. Draft is required for mold-part separation and depth of draw has limits beyond which it is more practical to produce the object by a specialized molding process. Using conventional two-part molds and molding methods, therefore, the side walls of any open or semi-hollow object cannot be molded parallel to one another. These restrictions also apply to rigid-skinned compound molds. Flexible skin-molds may, however be used to produce such objects but de-molding the part will involve complete separation of the skin-mold from the backing-mold and hand-peeling of the skins from the part. One further advantage of this method is that it allows detail to be molded on or into the parallel walls of the object as well as inserts etc. Such detail and inserts may be molded into both the interior and exterior walls of the part up to limits allowed by the thickness of the skin-mold as well as the geometry of the backing-mold. For larger objects involving very deep or side-draws, multi-part molds may be used and the exterior elements disassembled for de-molding. This also allows high-relief elements to be molded onto the outside of the part.

The use of foam-layered backing-molds allows the compound mold to create its own draft for de-molding purposes and gives it the ability to mold parallel-walled shallow and deep-draw semi-hollow parts using relatively simple direct-draw two-part molds. Surface detail etc., may be molded into or onto both the interior and exterior walls of the part up to the limits allowed by the extent of collapse designed into the foam layer. Penetrations through the walls may be molded in the same way, the foam layer essentially acting as a built-in side-draw. While the collapse of the foam layer may be designed to be uniform over the surfaces of both mold halves, being effected by a vacuum source which acts on the entire foam layer, the foam layer may also be divided into a number of individual cells or local cells within the general field. Certain sections of the foam layer may then be designed to collapse differentially to accommodate larger projections as well as undercuts or penetrations through the wall with or without a surrounding stub or flange. This method may also be used in the production of open-ended hollow objects such as pipes or square and rectangular tubes etc., where the inside of the object is defined by a collapsible core and the exterior by a standard two-part compound mold. Internal detail or local geometry modifications may be molded into the part to facilitate assembly or for any other purpose. The foam layer may also be mounted onto a jointed and stiffly-flexible spine to allow molding of curved sections.

Low Relief Part Molding

These parts are differentiated from thin-walled parts in that part wall thickness is irregular and both sides of the (generally) flat part may have variable relief. Simple flat backing-molds as described for sheet production may also be used to produce these parts as such backing-molds may accommodate a range of part sizes and thicknesses and the additional amount of skin-mold material used in the molds may be economically negligible compared to the cost of producing a custom backing-mold. However, where precisely conformal heating and cooling systems are required, the actual geometry of the part will define the limits of this application and conforming backing-molds will be necessary beyond these limits. The silicone elastomers used in the proto-type tooling have the ability to replicate a high surface polish and parts such as lenses, using a suitable clear resin, may be molded with the same surface quality as the master mold.

Thicker Part Molding

Solid, bulky and thick-walled parts are often difficult to mold, particularly as part size increases, and many molding processes are unsuitable due to the high shrinkage attending both the process and the material being molded. Control on the heating and especially the cooling is critical to successful molding and techniques outlined previously in countering or making up the shrinkage loss greatly facilitates the molding of these parts. The necessity for a minimum draft angle often precludes the use of molding in the production of components which are required to fit precisely and when used, such parts often require post-molding machining operations. Rigid skin-molds are conventionally constrained but do have the advantages donated by the highly conformal systems. The flexible skin-molds have fewer such constraints and the foam-layered backing-molds, provided adequate stability can be maintained. the fewest of all. Solid parts with high and low relief and up to a large size may be molded by various methods and from a variety of materials using the compound tooling system. Parts such as gears, mechanical components, wheels etc. may be molded using suitable thermoplastics or thermoset resins. Where precise part geometry is required and where draw is not excessively deep, parts may be molded with no draft angles and parting lines may be off-set to non-critical surfaces. Gear teeth, for example, may be molded true with the parting line off-set to the side of the gear wheel. The flexible skin-mold will easily flex over the slight undercut. Wheels and various other mechanical components may be molded accurately in a similar way. Pins, axle bushings etc. may be pre-inserted in the mold and molded into the components.

Panel Molding

The molding and post-production tooling may be used to produce various types of panels, the simplest being flat panels, of the conventional type, which are composed of plain or textured sheet face-layers with a core material sandwiched between them. One or both panel surfaces may also be contoured and the core materials may be foamed or cellular plastics. The post-production vacuum tooling may be used for assembly and may be modified to act as a mold for the injection of the core material. Thicker panels may also be solid with one or both surfaces contoured, either decoratively or with patterns of ridges for reinforcement. Flat or contoured panels with multiple semi-hollows defined by ridges on the reverse side may be molded and joined to sheets or to each other to produce hollow cellular panels. The flat panels may be produced using identical molds whereas contoured panels may be produced using mirror-image molds.

The panel core of ridges and hollows defining the cells may be produced as a separate layer and sandwiched between two face layers. Panels of various thicknesses may be produced by the assembly of a varying number of such cellular layers between the face layers. The ridges which define the cells may be molded continuous to produce a closed-cell structure or notched or discontinuous to produce an open-celled structure, allowing the cells to be post-filled with foam or other material. The flexible skin-mold, given the ability of the elastomer to handle undercuts, allows a certain amount of latitude in panel geometry and arced or angular panels with a regular cell-structure may be produced. Panels may also be produced by embedding hollow plastics or glass spheres in a matrix resin between the face layers. Such a cellular core will conform to any panel geometry and the transfer tooling can, again, be modified and used to hold the face layers while the core material is injected pre-mixed or the cavity is filled with spheres followed by the injection of the matrix resin.

Panels of various geometries may be molded using a standard cell system. Semi-hollow parts may be assembled together to form individual generic-type cells either closed or with open necks. Such parts may be molded with external spacing bosses and stacked together in a mold to produce the hollows of the panel. Cells with interconnecting necks may be post-filled by foam injection. Such cells may be arranged in the mold in single or in multiple layers. These generic cells can be designed to conform to a wide variety of panel geometries and separate face-layers may or may not be used. The cells may be stacked and over-molded between the two face layers held in a modified transfer tool or the cell stacks may be over-molded within the panel mold with the cell wall and spacing bosses together defining the thickness of the face layers. The spacing bosses also define the space between the cell walls and the cells themselves, therefore, negatively define the internal structure of the panel. With the closed-cell type, the cell walls must be strong enough to withstand the molding pressure\vacuum and post-pressure, if used. In this case, the cell walls may be molded thicker and with reinforcing ribs and the cells may be stacked closer together in the mold. With the open cell type, the cell walls may be molded thinner and the cells connected to the vacuum\pressure sources or external ambient pressure by extending one or more cell neck through the mold perimeter.

Hollow and Cellular Part Molding

While hollow parts of a range of certain limited geometries may be produced by speciality molding processes such as rotational molding or slush-casting, any hollow part of any geometry can be produced by the assembly of two or more quasi-hollow parts. This compound tooling system allows the economic production of virtually any shape of quasi-hollow part and, unlike typical processes used to mold hollow objects, the approach allows detail to be molded into both the inside and outside of the resultant hollow assembly. Any three-dimensional part of virtually any size or geometry may be thus produced within practical limits. Such parts may be produced fully closed or with openings to allow their filling with foaming agents etc. The strength of the part will depend primarily on its geometry and wall thickness, and may have reinforcing ridges molded onto either its inside or outside surface.

The actual strength of the part may be heavily modified by foam or cellular filler material such as described above for panel molding. Foam or sphere\matrix cellular plastics will conform to virtually any part geometry and will isotropically enhance the part. Shallow parts may be molded with mating ridges and simply joined together to produce the part. Cell-defining layers may be assembled to, and between, the surface-defining parts or may form a core with spacing bosses which is over-molded to produce the part. In the same way, individual cells may be assembled between mating parts or assembled in a mold and also over-molded to produce the part. Cell, or cell-layer, design may be modified to allow the selectively heavier placement of matrix resin so as to mold in thicker reinforcing sections, such as ribs, in the part, effectively dividing the cellular core into a number of large cells.

These methods may be used to mold cellular hollow objects of widely varying geometries and sizes with complex internal structures. The geometry of the cell, which defines the geometry of the solid material between and over the cells, can contribute greatly to the structural strength of a component. A variety of regular or irregular polygonal cell shapes can be employed, such as pyramidal or octahedral, which can be used to selectively and anisotropically strengthen the part. Regular shapes such as beams, columns, trusses, etc. can be built up of a number of regular cells or cell-layers. Irregular shapes can be built up entirely of customized cells or of any number of standard cells of various types in conjunction with non-standard cells, as necessary. A variety of regular and irregular hollow objects with cellular walls may be produced by assembling the cells only, in the mold or by assembling the cells over an interior form, followed by an exterior form and\or resin injection. By extension, multiple-walled objects may be similarly produced where the cells are arranged in layers and define solid layers between them and parallel to the object's surface. The spaces between the cells are used to define the strength across the plane of the wall of the object while the layers parallel to the surface add in-plane strength to the object's wall. By interconnecting the cells, as described previously, they may be post-filled with insulating foam or self-sealing material etc., while those with multiple layers may have different layers post-filled with different materials for different purposes.

Strong, lightweight, double- or multiple-walled pipes and tubes of various cross-section as well as storage tanks, boat hulls, boxes, etc., may be produced by this method and all such objects are essentially panels with a complex shape. For simple or complex semi-hollow objects composed of cellular walls where wall parallelism, with or without surface detail, is required, the foam-layered backing-mold may be used, as described above for solid-walled objects. In certain cases, the exterior may have positive draft and definition of the interior only may require the use of the foam-layered mold, or vice-versa. The interior of a large open hollow object may be sub-divided into straight-walled sections by the use of multiple foam-layered backing molds or mold-sections mounted to a large standard backing-plate. The cells are stacked in the spaces between the mold sections defining the walls, the mold is closed and the remaining space filled with the molding material to produce complex cellular-walled objects up to a very large size.

The relatively low cost of the tooling used in the process in combination with automated assembly techniques may make it economically feasible to produce a wide variety of hollow or cellular objects with application to numerous industries. Any mold is essentially the external and negative definition of a required shape, a hollow from which the solid positive is produced. The use of pre-made cells or cellular cores placed within a mold and over-molded is an extension of this primary principle of molding. The cellular geometry and arrangement define, negatively, the internal structure of the part and may be designed to give any part any internal structure. Resin is injected to fill the space between the cells and between the cells and the mold walls. The part produced has an external form and wall over an integral interior structure. The process may be termed negative construction since the cellular assembly is placed in the mold and both together negatively define the required part. The part produced is a complex single part and the process is a substitute for assembly of individual components, the cost of the tooling being, theoretically, more than off-set by the efficiency of the process and structurally integral nature of the part.

Reinforced Plastics

Reinforced plastics are generally defined as those materials of a plastics composition in which reinforcements have been embedded. The reinforcements are composed of a wide variety of materials, all with strength properties superior to those of the base plastics resin. Given that the reinforcing material differs in composition to the matrix, objects produced from reinforced plastics are composites of the plastics and reinforcements and, although any object composed of two or more intimately combined dissimilar materials of any composition are composite objects, the term has been generally understood as referring primarily to reinforced plastics. There is a variety of processes by which reinforced plastics objects are produced, including conventional molding methods as well as a number of special purpose molding and post-molding processes designed and developed specifically to produce plastics composites. The different methods may be classified according to the type, or physical form, of the reinforcements and the stage of the molding process at which they are combined with the plastics resin.

The reinforcing materials may be combined with the plastics resin prior to molding, and a number of different types of reinforced molding compounds are available. These consist of high viscosity bulk or sheet molding materials (thermoplastic and thermoset) the former reinforced with very short fibers, while the latter contains either much longer and\or often continuous fibers. These premixed molding compounds are usually molded using more conventional type molding processes. The components may also be combined in the mold during molding. The reinforcing material, consisting usually of fibrous sheet or mat, etc., is placed in the mold and the mold filled with liquid resin which itself may be reinforced with microscopic fibers. The reinforcement may also be combined with the resin and mechanically applied to a mandrel or object of the required shape. The reinforcing materials, with resin, are either sprayed, as chopped fibers, or wound, as continuous filaments or tapes, onto the former (which may be an open mold) or may consist of a pre-made part composed of plastics or other materials.

Regardless of the method used to produce the plastics composite, the usual combination is one of a reinforcing material embedded in a polymer matrix, the former providing strength and the latter shape and cohesion. While most reinforced plastics are produced either by molding or winding, composites may also be composed of layers of different materials bonded together and such types are often considered laminates. Plastics composites, therefore, may be produced by molding processes of various types (using open or closed molds), filament or tape winding onto a pre-made form, or substrate, and also by simple adhesive assembly of a plastics and a dissimilar material. Many processes involve a combination of methods, the lines between categories being rather indistinct. The compound tooling system, using both types of skin-mold, may be applied to the production of composites in a number of ways within each of these general categories and components may also be produced by a combination of methods. Except in the case of pre-mix molding, liquid thermoset resins form the matrix and methods using this tooling system may also differ from conventional processes in the way the resin and reinforcement are combined.

Molding Reinforced Plastics

Various molding methods are used to produce reinforced plastics components including conventional methods, with or without modifications, as well as specialized processes including co-molding and over-molding. One, two and multi-part molds may be used and the compound tooling system may be used for molding as well as for various support processes. While some special pre-mixed molding compounds are used for certain conventional-type molding processes, liquid resins, both ambient and high-temperature curing, are used for the majority of composites production methods and the compound molds, especially those using flexible skin-molds are well suited to their use, particularly as mold size increases.

Reinforced Bulk Molding Compounds:

These compounds generally consist of very high viscosity putty or dough-like materials containing very short fibers mixed with the base plastics resin which also contains fillers as well as other ingredients. Both thermoplastic and thermo-setting types are used and the compounds are usually molded by conventional processes as they differ little from plain plastics. The compound tooling system may be used to mold these materials in the same ways as described previously for plain plastics taking temperature, viscosity and pressure considerations into account. Processes which may be used include injection, compression and transfer molding and the objects produced have isotropically enhanced strength characteristics compared to the same objects produced from plain plastics. Some redesign of the mold may be required to facilitate flow as material viscosity will be higher for any given temperature and higher molding pressures may also be required. As described for plain plastics, the high pressures typical of these molding processes may preclude the use of flexible skin-molds in many applications unless viscosity can be lowered by increased temperatures and\or such pressures are lowered or relieved prior to solidification.

Reinforced Sheet Molding Compounds

These materials are similar to bulk molding compounds but are produced in sheet form and, for this reason, contain much longer fibers and usually at a higher density. The reinforcing fibers may be chopped and randomly oriented or continuous and directionally oriented in two or more directions. All fibers, chopped or continuous, lie in the general plane of the sheet. Unlike bulk molding compounds where fiber orientation is entirely random, the general lie of the fibers in the plane of the sheet and their particular orientation results in anisotropic enhancement of the mechanical properties of the object produced. There are a number of types of sheet compounds formulated for specific applications, and all are generally designed for high volume production. Sheet molding compounds are processed using compression molding techniques and matched-die molds to produce both small and large thin and thick-walled objects. Although some sheet-type materials are formulated for lower pressure (compression-type) molding processes, compound molds using rigid skins are most suitable for molding these materials.

Reinforced Liquid Resins:

Reinforced liquid resins are defined here as plain or filled liquid resins with various types of fibers or whiskers added to them prior to molding. The fibers are usually of chopped glass or carbon but plastics fibers as well as metallic and crystalline whiskers are also used. Fibers and whiskers are generally very fine to microscopic and, like fillers, increase the viscosity of the base resin to which they are added. The viscosity and flow characteristics of the modified resins will be major factors in mold design and the addition of fibers etc., to the resin will result in poorer flow characteristics and may require higher molding pressures. Increasing the diameter of the sprue\runner system elements as well as the number and size of gates will assist in the molding of these resins. Both flexible and rigid-skinned molds may be used to process these materials, using essentially the same methods as described previously for molding or casting unreinforced liquid resins. Reinforced resins may be used in any suitable molding process, modified as necessary, to produce the various types and shapes of parts as described previously for plain plastics, the parts produced being isotropically-enhanced, simple homogenous composites of reinforcing fibers in a polymer matrix. The increased strength donated by the reinforcements, along with the volume of the reinforcing materials themselves, results in a reduction both in the volume of plastics and the total material volume required to produce a part of given mechanical properties and also allows larger parts of the same geometry to be produced.

Liquid Resin Molding

In processes where the reinforcing materials are combined with the plastics matrix in the mold, the reinforcements are first placed in the mold and the mold subsequently filled with the plastics resin. The reinforcing materials usually consist of fibrous sheet or mat materials which are composed of chopped strands or continuous fibers woven together in various patterns. These materials are usually in the form of continuous layers and multiple sheets are routinely used. To fill the interstices between the fibers and fully wet-out the materials, low viscosity, thermosetting liquid resins are invariably used in the relevant closed-mold processes. In processes where the reinforcing material is applied to an open mold, form or mandrel, either by hand or spraying of chopped fibers or by filament or tape winding, liquid resins are also used and are combined with the reinforcements immediately before, during or after the application of the material.

In all processes, the important considerations are the elimination of voids and thorough embedment of the reinforcements in the matrix. In many operations, post-molding consolidation of the combined materials is required. The most common method of effecting consolidation is to apply pressure to the combined reinforcements and resin. The pressure crushes any voids out of existence and ensures thorough wet-out of the fibers by the matrix resin. The pressure is applied either directly to the material in the mold or by placing the filled mold in a pressure vessel, these procedures having been described previously for plain plastics molding. Many processes have been developed for the production of reinforced plastics components using both open and closed molds and the compound tooling system may be used in many of these, while also allowing new, or at least novel, processes to be developed based on the properties of the compound molds.

Open-Mold Processes

Open molds are those molds whose surface remains accessible throughout the molding process. Molds may be male or female and consist of one or more pieces. Male molds are often made in one piece and positive draft is necessary for de-molding. Female molds, especially large ones, are often made in two pieces to ease de-molding and also allow side draws or recesses to be designed into the part. Female molds often include more complex geometry with undercuts etc., and such molds are often designed in sections to be assembled and disassembled. Open molds are usually used to produce large parts and the molds are conventionally produced by hand using a variety of materials. The molds are inexpensive relative to the cost of a comparable metal mold but still labor intensive and time consuming to produce. The molding processes in which these molds are used are also slow and time consuming, but the molds are, however, well suited to the production of low numbers of large objects and can be used to produce large numbers of small or large objects also. The compound tooling system offers the advantage of faster mold production with no (theoretically) mold size limitation. The inclusion of a conformal heating\cooling system may allow the use of a wider selection of resins as well as speeding up the production rate.

Hand or Spray Lay-up

In hand lay-up applications, resin and layers of reinforcements are alternately applied by hand over a gel-coat on the mold surface, being subsequently rolled out to densify the materials. The reinforcements are usually in sheet form and cut to fit or tailored to conform closely to the mold surface. As each sheet is placed it is soaked in resin and the mixture rolled out or otherwise tooled to embed the fibers in the matrix resin. Successive layers are added and certain areas may receive extra material while inserts, plates or other materials may also be incorporated into the part. In spray lay-up operations, the reinforcements, in the form of chopped strands are sprayed onto the mold surface along with the resin, using spray equipment which pre-mixes the materials. The materials are then rolled out as in hand lay-up operations. Because the continuous fibers of the sheet materials are stronger than short chopped fibers, the two processes are often alternated layer by layer. When densification is complete, the resin is allowed to cure, usually in ambient conditions but sometimes in an oven.

Compound molds, using either rigid or flexible skins, as well as the foam-layered backing-mold may be used in lay-up type processes. The ease of mold design and rapidity of production are advantages but probably more expensive than conventional methods. However, if demand were sufficient, the method of mold making can assure a highly accurate mold up to a very large size and composed of any number of precisely-fitting parts. Parts may be keyed to each other and designed to fasten together easily. Skin-molds may be single-piece or reflect the sectionality of the mold, and may contain conformal heating\cooling systems to increase the production rate, which ease of duplication also facilitates. The foam-layered backing-mold is particularly suited to male mold production as de-molding draft can be created and parts with internal surface finish as well undercuts and detail up to the limit of foam collapse may be molded. The use of a harder elastomer rather than a rigid skin will, in general, facilitate de-molding as part size increases.

Semi-Open Mold Processes

These processes are essentially similar to hand or spray lay-up in open molds, but with an additional pressurization operation and some variation in reinforcement and resin type. Materials are laid up in the mold either as sheet fabric etc., or by spray and in many processes the sheets are pre-impregnated with resin (pre-pregs) prior to lay-up in the mold. Unlike open-mold operations described above, the materials are consolidated by pressure after lay-up is complete. A flexible membrane, or bag, which conforms to the shape of the mold is used to enclose the materials and is sealed around the perimeter of the mold, thus closing the mold, after a fashion, and hence the term semi-open mold. Pressure is then applied to the membrane to force it against the materials and effect consolidation. Heat is often used in the cure process and thus a much wider variety of resins and reinforcements is used compared to open-mold operations. There are two processes in current use, using either vacuum or pressure to cause the membrane to effect consolidation.

Vacuum Bag Molding

The open mold itself is similar to that described above and a rigid or flexible skin-mold may be used. There is, however, little difference between the flexible skin-mold and the flexible membrane required for the process. In this case, the key\key-way system used to align the skin-mold with the backing-mold may be eliminated and a second skin-mold may be used to act as the vacuum bag. By designing the skin-mold to have an even thickness and its reverse surface the required finish, it will be more or less perfectly shaped to fit, assuming a constant wall thickness. The reinforcements, impregnated with resin, are laid up on the mold surface and the second skin-mold is placed over them and sealed to the mold at the perimeter. A vacuum is then drawn from between the skin-molds, forcing the 'bag' against the surface of the material and consolidating it, a breather ply being used between the material and the bag to facilitate vacuum evacuation of air. Pressure will be applied evenly over the surface of the material as the skin-mold conforms to the required shape and a good finish may be applied to both part surfaces. When surface degradation has set into both skin-molds, being identical, they may be interchanged.

Pressure Bag Molding

In this process, pressure (higher than atmospheric) is used to effect consolidation of the material. Two skin-molds are again used and the initial elements of the process are similar to the vacuum bag process described above. After evacuation of the bag\material interface, pressurized air is supplied to the reverse side of the skin-mold (or pressure-bag) to increase the compressive forces on the material. For female molds, this may be accomplished by covering and sealing the mold opening and pumping air into the void. For male molds, a box may be used to create a void around the mold which is then pressurized. Since the system may be based on standardized mold sizes and backing-plates, such covers or boxes may also be produced as standards to be used with the standard backing-plates. Alternatively, and for higher pressures, both types of mold may be pressurized by enclosing the mold within a pressure-vessel or autoclave. As with vacuum-bag molding, pressure is evenly applied over the mold surface and skin-molds are interchangeable.

Closed-Mold Processes:

Resin Transfer and Injection Molding

These processes are exactly the same as described previously for plain plastics molding and are simply ways of filling a closed mold in which reinforcements have already been placed. Similar methods of mold filling, part curing and de-molding may be applied to the production of plastics composites. As with all conventional methods, dry reinforcements in the form of fabrics, mats, or fiber pre-forms etc., are installed in the mold, the mold closed, and plain or reinforced resin injected to fill the mold and wet-out the fibers to produce the composite component. Both types of compound mold may be used, each with their same respective qualities and capabilities and post-pressurization, curing and part removal processes are the same as for plain plastics. To facilitate the process, particularly for complex molds, pre-forms of fabrics, mats or of fibers and binder may be first formed to the required shape in a forming tool derived from the master mold, and then placed in the mold. This forming tool may consist of a modified mold designed to soak the reinforcements in binder, form to shape and remove the excess binder. The excess may be removed by vacuum operating through perforations in one tool half, after which the binder may be caused to set to the required preform shape. The tool may also incorporate a trimming system and the second tool half may be a vacuum transfer tool. When formed and trimmed, the shape of the set pre-form is maintained by the vacuum until placed in the mold by the transfer tool. Any number of pre-form layers may be placed successively in the mold.

Because the reinforcements are naturally in contact with the mold surfaces in many places and, due to part geometry, often pressed tightly against one or the other mold half, the reinforcing fibers often register or protrude at the part surface.

Apart from impairing the aesthetic appeal of the part, exposure of the fibers often leads to their degradation from moisture uptake or abrasion. In cases where a higher quality surface is required on one or both part surfaces and embedment of the reinforcing is essential, sub- or pre-parts may be first produced in a pre-mold which forms the reinforcement to the required shape and molds the component with a slightly undersize thickness. The pre-part surface incorporates molded-on spacer ridges or bosses, the height of which define the required thickness of the surface layer(s). The pre-part is then transferred (by vacuum tool) to a final mold and over-molded, the spacers holding the pre-form away from the mold walls. By over-molding with the same matrix resin, full compatibility and adhesion is ensured. This multi-stage method may be used to ensure that the reinforcement fibers are fully embedded beneath a surface layer of any required and easily defined thickness. The difference in skin-mold relief may be so slight as to allow the use of identical backing-molds for both pre- and final molds. The process may be used to more efficiently achieve the same aim as various post-applied reinforcing methods. A variation on this process and a reverse of post-applied reinforcing is one where the reinforced pre-part is first molded with undersized thickness but without bosses and subsequently transferred to a vacuum holding tool. This holding tool constitutes one half of the final mold, to which the pre-part is vacuum-bonded, leaving a space of the required layer thickness between it and the other mold half. This space is then filled with any suitable resin to apply the required surface layer to the part. The process may be repeated for the second part surface, as required.

As previously mentioned, the most critical factor in any molding process used to produce reinforced plastics is the elimination of voids by assuring full resin saturation of the fibers and their embedment in the matrix. The strength of any component also relates to the fiber density or resin-to-fiber ratio and, in general, the higher the fiber density, up to an optimum, the stronger the part up to its optimum strength. In transfer\injection processes, where the resin must infiltrate the fibers during filling, fiber density often impedes thorough filling and successful molding is often achievable only by reducing fiber density. While the closed mold process has major advantages over others in component production, the lack of access to the fiber\resin mix during and after the filling process disallows consolidation efforts to improve fiber density. Because the compound tooling system uses flexible skin-molds, a technique derived from vacuum\pressure bag methods may be used both to ease filling and effect consolidation.

To facilitate the infiltration of the resin through the fibers, one backing-mold half may be modified such that the mold cavity depth is held slightly greater than the required thickness of the part, thereby reducing compression on the fibers. When the mold is full, the vacuum bonding the skin-mold half to the modified backing mold may be reversed and compressed air used to apply pressure to the reinforcement\resin mix in a similar way to pressure-bag processing. The same, or similar, methodology may utilize the principles of vacuum-bag processing. When the mold is full, one skin-mold is released, but in this case, a vacuum is drawn from between the skin-molds. The fiber and resin volume may be measured to be such that the pressure would return the cavity to design thickness while effecting consolidation of the fibers and allowing for draw-off of any excess resin. The filled mold may also be plated in a pressure vessel with the fill and vent ports both closed (while allowing for excess resin draw-off) and the skin-mold vacuum-connect valve opened to allow the pressure to act on the rear face of the skin-mold only.

The foam-layered backing molds may be used by simple pressure manipulation to effect in-mold consolidation as described above for standard compound molds. One or both mold-half foam layers may be held slightly collapsed during resin injection to facilitate mold filling, which may be assisted by vacuum evacuation. Filling is followed by post-pressurization, during which the foam layer is over-pressurized. Combined with pressure-counter-pressure injection molding, the initial collapse of the foam layer will allow easy access for the resin to infiltrate the fibers but the counteracting pressure will, at the same time, prevent the resin from race-tracking to the mold outlets. When the mold is full the foam layer is pressurized in excess of the counter-pressure and causes consolidation of the materials, the excess resin being drawn off as necessary.

In general, the compound tooling system may be used to produce composite components, using the transfer and injection molding methods described above and as described previously for plain plastics. The techniques used to assist in void elimination, including vacuum-evacuation and post-pressurization are practices currently used in resin transfer molding using conventional metal and polymer molds. The pressure-counter-pressure filling process may also be effective at ensuring void elimination by forcing the resin into all interstices between fibers as the resin fills the mold. Pressure applied during or after mold filling is a virtual necessity to ensure full fiber wet-out and allow transfer molding wide application to the production of reinforced plastics.

It is generally accepted that one of the most efficient molding process is injection molding of thermoplastics and any process which simulates it will also be efficient. Liquid resin transfer or injection molding is a very similar process, being essentially a low-pressure version. The use of liquid resin allows the use of low pressure to easily fill both complex and large molds and its low viscosity makes it suitable for reinforced plastics molding. The low cost of the compound tooling system and its application to liquid resin transfer molding allows the efficient production of reinforced plastics components much stronger and, therefore, up to a size much larger than as described for unreinforced plastics previously. The same range of geometrical part types may be produced, manipulated and post-processed in the same way using the post-production vacuum-tooling described in the relevant sections. Liquid resin transfer molding utilizing the compound tooling system is also aptly suited to the application of co-molding and over-molding techniques to the production of complex solid and hollow plastics composites.

Composite solid and hollow objects, cellular panels etc., may be produced using transfer molding techniques as described for plain plastics where sequential molding as well as co- and over-molding techniques are used. Reinforced plastics, or composite, cells may be stacked and sandwiched between layers of fabric, or pre-molded pre-forms, in a final mold and over-molded to produce a complex cellular composite. The geometry of the cells will define the intra-cellular structure of the composite and may be designed to allow the further placement of various plain or composite structural elements or preforms between cells, the whole then being embedded in the matrix resin. Highly complex, structurally integrated, cellular composite components may thus be produced. In the production of molded preforms or other sub- or pre-parts which are to be subsequently co-molded or over-molded, mold production is simplified in that these molds do not require the usual surface post-finishing. Master molds made by rapid proto-typing methods may be used directly while those produced by machining may be used without finishing as the irregular micro-textured surfaces will contribute to improved resin bonding.

Rotational Molding

This method may be used to produce both open and closed hollow objects such as pipes and tanks etc. Reinforced resins, containing micro-fibers as defined above, or resins mixed with longer chopped fibers are placed in the mold, the mold closed and rotated. The materials may also be injected into a closed mold and the flexible skin-molds are particularly useful here as the injection port may consist of a self-sealing valve similar to the live gate. As the mold is rotated, centrifugal force causes the material to be distributed over the surface of the mold and, by forcing the resin and reinforcements against the mold walls, ensures full fiber wet-out and consolidation. Multi-axis rotation is generally required to produce fully closed hollow objects to ensure material distribution over all surfaces and irregularly-shaped objects, within limits, may be produced by this method. The different axes of rotation can be programmed to rotate at different speeds so as to distribute the material in the optimum fashion relative to the geometry of the part. A variation on this process may utilize an inner mandrel comprising a foam-layered core with flexible skin-mold. The foam layer is maintained collapsed until material distribution is complete, whereupon it is expanded to aid in consolidation and apply detail to the inner surface of the object.

Application Processes

In these methods, the reinforcing material is applied by conventional hand or spray lay-up or by filament winding or tape-laying techniques. The combination of resin and reinforcements is either applied to a form or mandrel or to a previously-made part. The form or mandrel, which may be solid, collapsible or soluble is usually removed after molding but may remain part of the finished object. The previously-made part to which the reinforcements are applied, which may be composed of plastics or other materials, always remains part of the finished object. Hand or spray lay-up methods are used only for reinforcing previously-made parts while filament winding and tape-laying are used with both previously-made parts and removable forms or mandrels.

Rigidized Reinforcement

This process is one of a number of similar processes currently used in plastics composite production where a thin-walled rigid shell-type part is first produced and subsequently reinforced by various means. The rigid part may be produced by thermoforming, resin injection or transfer molding or other means and the compound tooling is well-suited to production of such pre-parts. The pre-part may be then held in one half of the mold used to make it or transferred to a vacuum holding tool and reinforcement applied by hand or spray lay-up. The material is consolidated by roll-out to produce the finished-part. The transfer tool may act as a mold half to hold the part for consolidation by vacuum or pressure-bag methods, with one of the skin-molds used to produce the part acting as the bag. Alternatively, a second mold half may be used which is put into place immediately after the reinforcing has been applied. Due to the erosive nature of curing resin, any vacuum transfer tool must be modified such that the perimeter section, which may be in contact with curing resin, is replaceable. Should a part with two high-quality surfaces be required, the reinforcing material may be consolidated by sandwiching it between two mating rigid parts held by opposite transfer tools, suitably modified. These tool\molds are pressed or clamped together and transferred to a pressure-vessel or autoclave to ensure void elimination in the resin matrix.

Filament Winding

In this application process, the reinforcing is applied in the form of continuous filaments or tapes and, because continuous filaments are much stronger than short ones, the parts produced are comparably stronger. Fibers are either wetted with resin immediately prior to application or pre-impregnated fibers are wound dry and cured by some agent after application. The process is restricted to parts that have, or can be given, an axis of rotation, the limiting factor being that the part surface must have positive curvature with respect to the filament winding direction. Open or closed hollow parts with a regular or irregular circular cross-section are most suitable for winding but shapes with angular and irregular cross-section may also be wound. Most winding machines have freedom of movement in multiple directions and the winding heads themselves are capable of multi-axis rotation. The machines are programmable and co-ordinated movement of machine and head enables the application of the reinforcing filaments or tapes in complex patterns suited to the strength requirements of the object.

Open-ended hollow composites are currently produced by filament or tape winding over a mandrel, or form, which is removed after the resin has cured. Open hollow objects with narrow necks or complex shapes are produced using a sacrificial mandrel which is dissolved or melted after curing. In many cases, the mandrel itself consists of a pre-made open or closed hollow part which becomes part of the composite. A solid form is often reinforced by filament-winding or tape-laying to produce a strong three-dimensional object. Such forms or cores are often molded of light-weight, usually cellular plastics, materials, depending on the application. High strength solid cores, often composed of reinforced plastics themselves, may also be further reinforced by winding to produce very strong solid objects. The compound tooling system may be applied in various ways to produce reinforced or unreinforced solid cores or forms or closed or open hollow or cellular mandrels for conventional filament winding applications as well as new applications made possible by the molding capabilities of this tooling system.

Since any hollow object can be produced by the assembly of two or more parts, simple or complex, open or closed, hollow mandrels suitable for filament or tape winding may be produced by any suitable molding method. One-part uni-axis forms for pipes, tanks, pressure-vessels etc., where internal surface finish is not critical, may be produced by rotational molding methods. For open-ended mandrels where internal surface detail or finish is required, then a collapsible foam-layered mold core may be used and the part produced by transfer or other methods. Non-axial, or otherwise irregular, hollow forms may be produced by molding two or more parts by any suitable means followed by their assembly. Hollow structural shapes of square, rectangular or any other regular cross-section may be so produced and these parts may also be produced by foam-layered core molding. All form types may be made stronger by their being molded of composites. For parts not required to be hollow, where the object desired is a strong three-dimensional part, the mandrel, regardless of shape, may be made stronger by adding an internal structure. This internal structure may be composed of cellular layers or stacks, as described previously for plain plastics, the cells being also made of composite materials. Such internal structure may include differently oriented reinforcing elements, composed of various material types placed between cell layers or groups of cells and designed to enhance the strength of the mandrel in particular directions in co-ordination with the winding pattern.

Hollow or cellular structural parts, such as beams, etc., may be wound in a truss or lattice pattern as well as axially and longitudinally. The different winding patterns may be applied in alternating layers or sequentially to best integrate their reinforcing qualities. Solid, reinforced or unreinforced, cores of various types of profile shapes, may be longitudinally wound in discrete lengths to produce items currently made by pultrusion methods. Composite H- and I-beams or U-channels may be produced by longitudinally winding a core produced by transfer molding or other means. Since these parts have negative curvature in cross-section, diagonal winding is not possible. The compound tooling system, however, may be used to produce cores with molded-on hubs, in any required pattern, around which the filaments may be wound. The flexible skin-mold allows such hubs to be molded with a negative taper or with undercut heads designed to securely trap the filaments during winding. These hubs, which may also consist of molded-in inserts, are each located where a change in winding direction is required to produce the desired pattern.

Solid and Hollow Core Hub-Winding

The hub-winding technique was designed to overcome some limitations of the standard filament-winding process which requires that the mandrel have a rotatable shape and 'windable' geometry. Because the filaments or tapes are laid down under tension, changes in the direction of winding are constrained by mandrel geometry which must maintain the tension or the fibers may slip laterally. This is easily accomplished for simple shapes such as cylinders, spheres etc., while for more complex shapes the winding equipment can be programmed to lay the filaments in the optimum patterns to suit such shapes. Although many different standard winding patterns are used, these are generally used with standard types of mandrel geometries, and hence the range of parts which can be produced by filament winding is limited, mainly because sudden and sharp changes in the winding direction are not possible. Typical parts produced are open- or closed-ended cylinders, such as pipes or tanks, hollow cones, such as rocket fairings, or long parts with non-circular but positively curved regular or irregular cross-section, such as helicopter blades or aircraft wings and other aerospace parts.

Parts with negatively curved surfaces, penetrations in the winding field or sharp changes in geometry cannot be produced by filament winding nor can sections of a part be reinforced by winding. As stated previously, the great advantage of filament winding is the very high strength contributed by the continuous nature of the fibers and the hub-winding technique, by allowing sharp changes in winding direction seeks to facilitate a wider application of the process. One of the primary applications is in negotiating penetrations through parts which heretofore would not allow their being produced by filament winding. The mandrel, or pre-part, to produce the item is first molded to include the penetration which has a hub pattern molded around the opening in the form of concentric rings of hubs. As the winding proceeds and the winding head reaches a hub, the filament is hooked around the hub and turned to wind along one of the hub rings. When the head reaches the corresponding, or directionally in-line, hub on the other side of the penetration, it hooks around the hub and continues on its winding way. To reinforce the penetration further the winding head may make a complete loop around the ring of hubs before turning to continue the general winding operation. The width of the hub ring is determined by the required zone of reinforcement around the opening. A second winder may be used at the penetration to work in concert with the main winder and the hub pattern to weave the zone of extra reinforcement. Any flat or positively curved part than can be molded with surface hubs can be selectively reinforced by this means, regardless of the primary method of part reinforcement, if any.

Composite structural profile shapes, such as H-beams and U-channels etc., are currently produced by pultrusion methods where the continuous fibers are arranged parallel to the length of the object. While this results in a structural member with high strength in tension, the object's strength in other directions is relatively low and its compressive strength depends for the most part on the matrix composition. Diagonal winding, which would increase the bending resistance, is not possible due to the negative curvature inherent in its shape. However, diagonal winding of each element of the profile is possible by winding over hubs molded onto each surface. For any solid profile shape, the hubs may be arranged on both the web and flanges in any desired pattern and allow both diagonal and longitudinal winding patterns. For straight lengths, the pattern of hubs will be simple, since longitudinal winding requires hubs only at the ends, and opposing, or off-set, lines of hubs at the edges of each profile surface will allow diagonal or lattice patterns to be wound. In the production of the solid core, the mold ejector pins will be located opposite each hub of the web and along the edge of the flange to ensure that the flexible skin-mold strips over the undercut of each hub. To produce the solid cores, which may themselves be reinforced, the transfer molding process is well suited. For cores with narrow flanges, two-part molds may be used with the flange hubs tapered away to ease de-molding, while the undercut will face the de-mold direction. For wider flanges, multi-part molds may be necessary. Currently-used winding equipment may be modified for use in this hub-winding process.

Curved or angular sections, including closed loops, will require a more complicated hub pattern as additional hubs are required to allow longitudinal winding. For any such profile shape, a core is easily molded with directional change in the plane of the web or the plane of the flanges. Regularly-spaced lines of hubs across the appropriate faces will force the longitudinal fibers to conform to the required shape and may be positioned on the diagonal so as not to interfere with the diagonal winding pattern. Change of direction in one plane, such as the web, will result in negative curvature in the other plane, in this case, the outside of one flange. If the curvature is low, this may not affect the diagonal winding as the hub undercuts may be redesigned to suit but the longitudinal winding must be applied to the inside of the flange, where curvature is positive and such may necessitate minor modifications to the core design. In the case where the direction change is in the plane of the flanges, all longitudinal winding is applied to one side of the web, while diagonal winding may be applied to one or both, if curvature is low enough. In this case the web of the core may be molded somewhat off-center with regard to the flanges to ensure that the reinforcement remains central.

Profile shapes are the building blocks of most structures and are usually cut to length and assembled to form the required framework or structure, many types of which are designed to be incorporated into larger structures. Many such sub-structural members are constructed of smaller elements to reduce weight, such as open trusses or lattice beams etc., which have a high strength to weight ratio. Complex structural shapes such as straight and arched trusses, lattices, etc., and other open-webbed structures may be molded in core form with hub patterns that allow the shape to be filament wound along with any flanges as described above. Structural shapes with open or closed webs, with variable cross-section as well as variable orientation may be produced in core form with suitable hub patterns to allow them to be filament wound in the required reinforcing patterns. Filament wound parts may be over-molded to provide a layer of material over the fibers or for aesthetic reasons. The molded-on hubs may further serve as spacers in the final mold to hold the wound core for over-molding and, because the winding process here does not tend to force the fibers against the core, some additional consolidation measures may also be required before or during final molding. Over-molding may also be used for any other type of filament wound core or form, solid, hollow or cellular, to fully embed the wound reinforcements in the matrix resin and beneath a surface layer and may also be used to post-apply a surface finish, pattern or architectural decoration to the reinforced plastics component.

Cores for hub-winding, as described above, may be produced to form structural elements or reinforcements for various composite components of a more three-dimensional nature. Cores may be molded and wound with the required strength characteristics and placed within the mold with cells or cell-stacks and over-molded to produce the finished composite or an intermediate composite core to which further reinforcement may be applied. Wound, or otherwise reinforced cells, or multi-cellular units used with the wound structural elements will produce a comparably stronger composite when over-molded as described previously. Such an assembly may constitute a still larger cell and itself be reinforced by winding, before being incorporated and over-molded with other such cells and structural elements into a still larger final assembly. The final assembly itself may be over-molded to provide a surface layer or finish. In this way, complex structurally integrated large composite components of a wide variety of geometries may be produced. These components may be fully closed or open-ended. Single or double open-ended components may be produced by assembling the wound cores and cells over and inner wound form, over-molding and subsequently filament winding the newly-molded composite core which, again, may itself be subsequently over-molded to apply surface detail or finish.

Filament winding, in general, is a two step process, the first step being the production of the form or mandrel onto which the fibers are laid or wound. The main advantage the compound tooling system has with regard to filament winding is its versatility in the production of cores and mandrels, particularly hollow and cellular forms and solid cores for hub-winding. Combining the components together with over-molding, both general and focused, or oriented, reinforcement of a wide variety of part geometries, both regular and irregular is possible. Most filament winding is carried out using fibers pre-soaked in resin immediately before use, but dry, pre-impregnated fibers, or fiber bundles, are also used. In the processes outlined above, wet winding may be most appropriate for some but dry winding may be used. In those situations where the winding is over a flat surface or point-to-point when winding over hubs, dry unimpregnated fibers may be more suitable. Because of the lack of part curvature and hence lateral pressure, the fibers may require further consolidation which may be carried out in conjunction with resin infiltration in a foam-layered or modified backing-mold to allow post-filling pressure to be applied. This process may be considered as lay-up by winding followed by impregnation in a transfer molding process.

Assembly

In composite production by assembly, dissimilar materials are joined by various means to produce the composite. In plastics composites, at least one material is a polymer and the usual assembly techniques used are adhesion or some form of co-molding or over-molding which have been described previously in various sections. The applications of the compound tooling to such processes have also been detailed. One of the primary advantages the compound molds have are their relatively low cost compared to metal molds and this low cost greatly facilitates their taking advantage of the techniques of co-molding and over-molding. The mold essentially acts as an assembly jig, holding each pre-molded and reinforced part in its correct relative position and also controlling the placement of the adhesive, the most compatible presumably being the liquid resin from which the constituent parts themselves were pre-molded Adhesion:

Adhesive bonding is primarily used to produce laminate-type composites composed of layers of different materials bonded together to produce solid laminates, or surface layers bonded to a core material to produce panel-type composites. In either case, the compound tooling system may be used to produce the individual layers and effect their bonding to themselves and to other materials using transfer tooling. Laminated sheets composed of reinforced plastics layers bonded to a variety of face layers may be produced or panels may be assembled by sandwiching a cellular plastics core between metal, or other, face layers. The vacuum transfer tooling may be used in conjunction with the adhesive-dispensing equipment to hold the part for application by various means or may be used to dip the part in the adhesive. The transfer tooling may then be used to assemble the various components together to produce a three-dimensional composite and may also be used to transfer components to a mold for assembly by co-molding or over-molding.

Co-Molding

Assembly by co-molding has been described previously for components, either of plain or reinforced plastics, produced using the compound tooling system. Co-molding may also be used in combination with components produced by other means and made of different materials such as metals, ceramics or other thermoplastics, etc. The individual parts may be transferred into the mold and positioned by transfer tooling. The mold is designed to hold the components in their correct relative positions to allow their assembly together by injection of the appropriate resin. In co-molding, as it is defined here, the spaces between parts, constituting the joints, are filled with the resin to effect assembly of the parts, the mold constituting an assembly jig. Co-molding may also be used in multiple steps to produce a component not possible to produce in one or two steps and any number of components may be co-molded together in the mold to produce the part. Co-molding is similar in practice and effect to over-molding but the primary object of co-molding is the assembly of two or more parts while for over-molding it is generally a new part.

Over-Molding

Two or more components may be assembled by over-molding by which the parts are fully embedded in a plastics matrix and the resulting part is more than the sum of its constituents. The process may require two molding operations, a pre-molding step, which is similar in effect to co-molding and bonds the constituents together while adding spacer bosses to the surface of the part. These hold the composite in position in the final mold for complete embedment by a final over-molding step. Over-molding may also be accomplished by assembling the constituents sub-parts between two pre-made, thin-walled pre-parts, held in transfer tools, and injecting resin to fill the spaces between the sub-parts and between the sub-parts and the forms. The forms are previously molded as surface layers of the final part and may be composed of a different resin more suited to the part's end-use. The forms may also include internal sub-part alignment and assembly guides as well as spacers to ensure complete resin embedment. Since any mold negatively defines the shape of the object, co-molding and over-molding may also be termed negative construction.

Negative Manufacture and Construction

While the natural world may provide many ready-to-use materials, it supplies very few, if any, of what could be considered ready-to-use objects. Regardless of the source of any materials used to produce a part, a part or object designated for a particular purpose will require some form of manufacturing process to convert it from its raw material to its useful shape and imbue it with the qualities required for it to perform its designated function. While there are innumerable ways in which useful objects are produced, all methods generally fall into one of two categories which may be classified as positive or negative.

In positive manufacturing, the process begins with a solid object, a positive, of a certain size and shape and composed of the appropriate artificial or natural material. This initial object is such that the size and shape limits of the required final part are within the size and shape limits defined by the initial piece of raw material. It merely remains to remove the unwanted excess material to produce the required part and this may be achieved by hand-carving or machining etc. The process is here termed positive manufacture because a real object is being actively worked on to define the shape. A part may also be produced positively by assembling a number of pre-made individual parts together and again, since real parts are here being worked with, the process is here termed positive construction. The process, in either case, normally begins with solid raw material whose shape has only a general relation to the final part and moves progressively closer, by shaping or assembly, to the final part.

Negative processes, on the other hand, begin with a quantity of empty space or a mirror image, a negative, in the shape of the desired final part. This shape is defined by a mold, and all methods of negative manufacturing utilize molds of one type or another to enclose and\or strictly define the shape of the required object. All open molds are essentially three-dimensional mirror images of one side of the part and by one process or another, the surface geometry and finish of the mold is transferred to the object. A closed mold consisting of two or more parts completely defines the object, each part of the mold transferring its negative image to the abutting surface of the solid positive part produced. Negative manufacturing obviously necessitates the preliminary step of mold production which is an up-front cost not normally associated with positive methods. While any mold and molding process may be used to negatively manufacture a single object, the techniques of insert and especially co-molding and over-molding may be used to effect negative construction, as described previously. Many positive processes use jigs to hold parts for positive assembly techniques and the molds used in co- and over-molding perform a similar function.

The major difference between the two types of methods is cost in relation to the number of parts required or produced. If only one or a few parts are needed, the cost of mold production may not be justified. If many parts are needed, molding is the most efficient method, except for parts which must, of necessity, be produced by other means using other materials, such as metal parts produced by machining or welding etc. Size is also a constraint on molding as large parts require large, usually expensive, molds and positive methods may be the only option. The lower cost of the compound molds and the ease of larger mold production may allow this system to be used economically in place of positive methods for many applications, as outlined throughout the foregoing, and not heretofore economically or practically feasible. Where large complex objects, with internal cavities and structure and including various components etc., are required, positive methods are currently the only economically feasible means of their production. The lower cost of compound molds allows the production of molds to define, negatively, both the external and internal shape of the object and to separately mold any structural elements included. This allows a much greater application of molding, with the attendant economic advantages of both negative manufacture and in-mold negative construction, to various industries not previously amenable to the use of plastics, either reinforced and unreinforced.

Self-Adhesive Component Assembly System

In most molding processes, and using most molding materials, release agents are required to prevent the molding material from sticking to the mold, whereas these same adhesive qualities are of the utmost importance in the production of reinforced plastics. All plastics materials, both thermoplastics and thermosets, have some degree of adhesive capability and many are used for such purposes. Thermosetting materials, particularly the epoxies, are among the best adhesives available while thermoplastics enjoy widespread use as hot-melt adhesives which are also highly efficient. Components may be permanently assembled using the irreversible thermosets, but if a joint can be re-heated, then components may be reversibly bonded using a thermoplastic. Use of thermoplastic hot-melt systems are constrained by the necessity for part joining within the melt-window of the material and dispenser used and, due to relatively rapid solidification, joint size is generally restricted and the system suited to smaller parts.

If the surfaces to be joined can be maintained adequately hot, then the adhesive applied to one or both may be maintained in a melted state until the parts are joined, whereupon the joint is allowed to cool and the adhesive solidifies. By molding-in electrical heating elements at the joint surface of a component, with an accessible power connection, any joint of any size or complexity may be heated, and thus thermoplastic (hot-melt) adhesives may be used to reversibly assemble the components. The adhesive may be applied to the cold joint, immediately after molding, and allowed to solidify, to be re-melted prior to assembly, or it may be applied to the heated joint at the assembly stage, though this necessitates dispensing equipment in addition to the joint heating equipment. Either way, self-adhesive, ready to reversibly assemble components of large size and essentially any geometry may be produced. The joint may also incorporate a number of molded-in threaded inserts to allow the use of screws to pull the joint closed and a complementary system to allow the use of jacking screws to push the re-melted joint open.

The use of this assembly system is facilitated by the low cost of the compound tooling in that the heating elements may be formed to shape using a tool derived from the master mold and frames to hold the element in position may also be easily produced. The system has a number of applications other than component assembly and its reversibility may be utilized in the molding and post-molding processes also. By embedding a system in a mold mating surface, a mold may be held and sealed for the cycle and a similar application may be made to pressure vessels.

Conclusion

The compound tooling system described herein was designed based on a prototype mold system which consists of two thin slab-shaped elastomer matching mold-halves supported by, and sandwiched between, two rigid backing-molds, or plates. The elastomer mold halves were produced by the process of clay-embedment of master patterns, followed by sequential pouring of activated elastomer against the embedded parts and against the parts embedded in the solidified first mold half. A two-part matching mold was produced in a manner typical of the way in which many molds used for casting and other processes are produced. The molds were designed for use in a liquid resin transfer molding process to combine the low cost molds typical of casting with the higher efficiencies typical of molding. The low up-front cost of the molds is off-set by their impermanence but their ability to out-perform conventional molds in certain applications allows higher quality parts to be produced, parts that would be very expensive and often impossible to produce using conventional metal molds.

The proto-type system was developed to produce small plastics parts to be assembled into models of various subjects, aircraft, vehicles, buildings etc., or any small-scale representation of a real-world, full-size equivalent. Models are built for many reasons, informational, educational, display etc., and modeling subjects are drawn from virtually every field of human endeavor, past, present and future. In general, subjects divide into a variety of categories such as transportation, technological, industrial, engineering or architectural and both working, as well as static models are built. The scale of any model is its size relation to that which it represents and the larger the scale, the closer in size the model and its subject become, until at equal size, the model is termed a replica. A replica is an accurate representation of the subject which is made to appear identical to it in every way but which, unlike an authentic reproduction of the subject, may be composed of parts and materials differing from the original. The replica, therefore can take as many short-cuts as possible to achieve the same essential end and the best way to reduce the cost of anything is to reduce the number of parts comprising it, a practice to which molding is very well suited. While the tooling system, or mold, can only give the quality of shape to the part, the molding material, reinforcements, inserts, etc., can be used to give various other desired qualities to the component to make it equivalent or superior in some way to the part, or group of parts, it may replace. If the replica is identical in form, function and quality to the subject, then, regardless of the methods of part manufacture and construction, there is no practical difference between them.

For the small-scale models for which the proto-type tooling was developed, the elastomer molds give the correct shape, up to a certain size, and the molding material used gives adequate strength to the parts. The compound tooling system of shape-defining elastomer vacuum-bonded to shape-maintaining backing-mold\plate is capable of molding parts with few limits on size and with few geometrical constraints on part design while the rigid-skinned mold is an economical alternative to conventional molds with similarly few restrictions on size. The system, therefore, represents both a scaling-up of the proto-type's molding capabilities and a broadening of both its application and the application of molding in general. The system may be used to produce parts by various molding and casting processes and may be used to mold parts as single pieces which are currently produced as multiple pieces as well as molding large parts heretofore uneconomical or impractical to produce. While plastics parts have strength limitations in comparison to similar parts made of other materials such as metal or wood, particularly as part size increases, certain techniques may be used to compensate and allow substitution by plastics. Reinforcements may be added to increase strength and facilitate increase in size while molding allows complex and strength-enhancing geometry to be given to a part, resulting in a part functionally equivalent to the part it replaces but of lighter weight and corrosion-resistant among other desirable qualities.

Plain and reinforced plastics, or composite, components of various types, both solid and hollow as well as cellular, can be manufactured and thereby parts may be given various desired qualities within practical limits. One primary advantage molding has over other manufacturing methods is the ability to rapidly mass-produce objects with complex shape and having compound curvature as well as surface detail and penetrations etc. Ready-to-use or assembly-ready parts are thus produced in one step and usually requiring few post-production operations. The low cost of this compound tooling allows the inexpensive production of secondary sub-parts which can be assembled by co-molding or over-molding in final molds to produce parts with internal structure. Hollow parts are used to define the required hollow spaces within the part, while at the same time negatively defining the required solid structure, the resulting spaces between these hollow parts being the structural elements. Structural components may then be placed in these spaces and the complete assembly is over-molded to produce a complex structurally-integrated part. Structural elements may consist of reinforced plastics produced using molding or other processes, and may also be made of various other materials. The production of these complex parts may be assisted by automation using the vacuum transfer\holding tooling.

Like the prototype molds, the compound molds are relatively inexpensive and easily and rapidly produced and are particularly suited to production using various types of computer-aided technology. While the master molds are permanent, the production molds are, as in some casting processes, impermanent and require periodic replacement, necessitating a secondary production system. Molding processes may be divided into high and low pressure types which involve high and low viscosity materials respectively. The rigid-skinned molds, being similar to conventional types are more suited to the high pressure-high viscosity processes while the flexible-skinned are more suited to the low pressure-low viscosity type processes. Because the flexible-skinned mold is sealed by compression of the mold material, positive mold closure is more easily achieved and less precision is required at the matching face. This is a major advantage of the mold and allows the mold to take advantage of the ease with which low viscosity liquid resins can be made to fill large and intricate molds and especially those containing reinforcing materials. This, when allied with the relatively inexpensive process equipment typical of the liquid resin molding processes in general, translates to a lower up-front capital cost compared to conventional molding processes but has the ongoing replacement-mold production costs. However, the low mold and equipment costs mean that short production runs are more economical while any length of production run is possible. The rigid-skinned molds allow high-pressure molding processes to be used for shorter production runs while also allowing any length of production run and the system, in general, fills much of the major gap between the low mold cost of casting and the high efficiency of molding.

The invention claimed is:
1. A mold unit that comprises:
(a) a pre-fabricated, re-usable and impermeable skin-mold having a rear surface and having a structurally contoured front surface that comprises at least a portion of the interior surface of a fillable mold and precisely defines detailed structures of said interior surface, such as cavities, runners, and/or mold alignment guides;

(b) a backing-mold having a rear surface and having a front surface shaped to mate with the rear surface of said skin-mold;

(c) vacuum means for bonding the rear surface of said skin-mold to the front surface of said backing-mold; and (d) a rigid backing-plate having a front surface shaped to mate with the rear surface of the backing-mold.

2. The mold unit of claim 1 further comprising clamping means carried by said backing-plate for clamping said mold unit together with at least one other mold unit to form a closed mold.

3. The mold unit of claim 1 wherein said vacuum means for bonding said skin-mold to said backing-mold comprises an array of fine grooves disposed about the front surface of said backing-mold and means for connecting said array to a vacuum source.

4. The mold unit of claim 1 wherein said vacuum means for bonding said skin-mold to said backing-mold comprises a matrix of perforations disposed over at least a portion of the front surface of said backing-mold and manifold means connecting said matrix of perforations to a vacuum source.

5. The mold unit of claim 1 wherein the front surface of the backing-mold comprises keyway means, and the rear surface of the skin-mold comprises protruding key means for interlocking and sealingly mating with said keyway means of the backing-mold.

6. The mold unit of claim 5 wherein said keyway means is disposed about the perimeter of the front surface of the backing-mold.

7. The mold unit of claim 6 wherein said keyway means comprises a continuous keyway channel about the perimeter of said backing-mold, and at least one narrow groove disposed along the length of said continuous keyway channel and connected to a first vacuum source comprised in said vacuum means.

8. The mold unit of claim 7 wherein the front surface of said backing-mold within the interior space bounded by said keyway channel comprises a plurality of aperture means having access to a second vacuum source comprised in said vacuum means.

9. The mold unit of claim 8 wherein said second vacuum source is reversible and permits the selective application of air pressure to said interior space disposed within and excluding the perimeter of said skin-mold.

10. The mold unit of claim 1 comprising a rigid skin-mold.

11. The mold unit of claim 10 wherein said skin mold is made of a rigid polymer material.

12. The mold unit of claim 1 comprising a flexible skin-mold.

13. The mold unit of claim 1 wherein said skin-mold is made of an elastomer material.

14. The mold unit of claim 1 wherein said backing-mold has a substantially flat front surface adapted to support a skin-mold having a substantially flat rear surface and a contoured front surface.

15. The mold unit of claim 1 wherein the backing-mold has a front surface having a portion that generally but not precisely defines the negative shape of at least a portion of an object to be molded.

16. The mold unit of claim 1 wherein the backing-mold has a front surface having a portion that closely defines the negative shape of at least a portion of an object to be molded.

17. The mold unit of claim 1 wherein said backing-mold comprises heating means for heating mold material placed within said fillable mold.

18. The mold unit of claim 1 wherein said backing-mold comprises conduits for conducting a heat transferring fluid.

19. The mold unit of claim 1 wherein said backing-mold is comprised of a bonded assembly of separable sections.

20. The mold unit of claim 1 wherein said backing-plate is comprised of a bonded assembly of separable sections.

21. The mold unit of claim 1 wherein said backing-mold comprises a sealed layer made of an open-celled flexible foam material.

22. The mold unit of claim 21 wherein said sealed layer of flexible foam material comprises an impermeable flexible skin forming the front surface of said backing mold.

23. The mold unit of claim 22 wherein said impermeable flexible skin comprises groove means for vacuum bonding the mold unit skin-mold to the mold unit backing-mold.

24. The mold unit of claim 21 wherein said backing-mold further comprises a rigid layer adjacent to said sealed layer of flexible foam and incorporating channels adapted to connect air and vacuum sources to the interior of said sealed layer and thereby selectively compressing and expanding the volume of said sealed layer.

25. A compound mold comprising two complementary and opposing mold halves sealable at a parting line, each of which mold halves comprises:

(a) a pre-fabricated, re-usable and impermeable skin-mold having a rear surface and having a structurally contoured front surface that comprises at least a portion of the interior surface of a fillable mold and precisely defines detailed structures of said interior surface, such as cavities, runners, and/or mold alignment guides;

(b) a backing-mold having a rear surface and having a front surface shaped to mate with the rear surface of said skin-mold;

(c) vacuum means for bonding the rear surface of said skin-mold to the front surface of said backing-mold; and (d) a rigid backing-plate having a front surface shaped to mate with the rear surface of the backing-mold.

26. The compound mold of claim 25 further comprising clamping means for releasably clamping said two mold halves together to form a closed and fillable mold comprising a mold cavity defined collectively by the front surfaces of said skin-molds.

27. The compound mold of claim 26 wherein said clamping means are carried on said backing-plates.

28. The compound mold of claim 25 wherein the front surface of the skin-mold on each mold half comprises a mating surface shaped to sealingly mate with a complementary mating surface on the front surface of the skin-mold on the opposing mold half.

29. The compound mold of claim 28 wherein each of said mating surfaces comprises key/keyway means for interlocking and mating with complementary key/keyway means on the other of said mating surfaces.

30. The compound mold of claim 29 wherein the said key/keyway means on said mating surfaces of the skin-molds collectively form a perimeter seal disposed about the perimeter of the skin-molds.

31. The compound mold of claim 30 wherein additional key/keyway components are disposed on said mating surfaces of the skin-molds and collectively effect a seal said two mold halves against positive or negative pressure differentials between the interior and the exterior of said compound mold.

32. The compound mold of claim 31 further comprising means for maintaining mold cavity alignment of said two mold halves.

33. The compound mold of claim 32 wherein said means for maintaining mold cavity alignment comprises a key/keyway system disposed at complementary positions on the front surfaces of said skin-molds.

34. A mold unit that comprises:
(a) a pre-fabricated, re-usable and impermeable skin-mold having a rear surface and having a structurally contoured front surface that comprises at least a portion of the interior surface of a fillable mold and precisely defines detailed structures of said interior surface, such as cavities, runners, and/or mold alignment guides;
(b) a backing-mold having a front surface shaped to mate with the rear surface of said skin-mold; and
(c) vacuum means for bonding the rear surface of said skin-mold to the front surface of said backing-mold.

35. A compound mold comprising two complementary and opposing mold halves sealable at a parting line, each of which mold halves comprises:
(a) a pre-fabricated, re-usable and impermeable skin-mold having a rear surface and having a structurally contoured front surface that comprises at least a portion of the interior surface of a fillable mold and precisely defines detailed structures of said interior surface, such as cavities, runners, and/or mold alignment guides;
(b) a backing-mold having a front surface shaped to mate with the rear surface of said skin-mold; and
(c) vacuum means for bonding the rear surface of said skin-mold to the front surface of said backing-mold.

\* \* \* \* \*